United States Patent
Hatta et al.

(10) Patent No.: US 9,947,964 B2
(45) Date of Patent: Apr. 17, 2018

(54) BATTERY, BATTERY PACK, ELECTRONIC EQUIPMENT, ELECTRIC VEHICLE, POWER STORAGE DEVICE, AND POWER SYSTEM

(71) Applicant: Sony Corporation, Tokyo (JP)

(72) Inventors: Kazuhito Hatta, Fukushima (JP); Nobuaki Shimosaka, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/128,315

(22) PCT Filed: Mar. 10, 2015

(86) PCT No.: PCT/JP2015/001285
§ 371 (c)(1),
(2) Date: Sep. 22, 2016

(87) PCT Pub. No.: WO2015/166621
PCT Pub. Date: Nov. 5, 2015

(65) Prior Publication Data
US 2017/0110760 A1    Apr. 20, 2017

(30) Foreign Application Priority Data
May 2, 2014    (JP) ................................. 2014-094932

(51) Int. Cl.
*B60L 11/00*    (2006.01)
*H01M 10/0565*    (2010.01)
(Continued)

(52) U.S. Cl.
CPC ........... *H01M 10/0565* (2013.01); *B60K 6/28* (2013.01); *B60K 6/46* (2013.01); *B60L 11/1803* (2013.01);
(Continued)

(58) Field of Classification Search
CPC ............ H01M 10/0565; H01M 2/162; H01M 2/1653; H01M 2004/028; H01M 10/0563;
(Continued)

(56) References Cited

U.S. PATENT DOCUMENTS

2006/0127772 A1    6/2006 Ota et al.
2006/0240290 A1    10/2006 Holman et al.
(Continued)

FOREIGN PATENT DOCUMENTS

JP    2006-120517 A    5/2006
JP    2007-141777 A    6/2007
(Continued)

OTHER PUBLICATIONS

International Search Report (with English translation) dated Jun. 16, 2015 in corresponding international application No. PCT/JP2015/001285 (5 pages).
(Continued)

*Primary Examiner* — Gertrude Arthur Jeanglaude
(74) *Attorney, Agent, or Firm* — K&L Gates LLP

(57) ABSTRACT

A battery includes a positive electrode formed with a positive electrode active material layer containing a positive electrode active material at least on one side of a positive electrode current collector, a negative electrode formed with a negative electrode active material layer containing a negative electrode active material at least on one side of a negative electrode current collector, a separator, and an electrolyte containing solid particles. The capacity area density (mAh/cm$^2$) of the negative electrode active material layer is equal to or higher than 2.2 mAh/cm$^2$ and equal to or lower than 10 mAh/cm$^2$, and the capacity area density (mAh/cm$^2$) of a gap in the negative electrode active material layer is equal to or higher than 5.9 mAh/cm$^2$ and equal to or lower than 67 mAh/cm$^2$.

35 Claims, 10 Drawing Sheets

(51) Int. Cl.

| | | |
|---|---|---|
| *H01M 2/16* | (2006.01) | |
| *H01M 4/131* | (2010.01) | |
| *H01M 4/525* | (2010.01) | |
| *H01M 4/62* | (2006.01) | |
| *H01M 4/66* | (2006.01) | |
| *H01M 4/133* | (2010.01) | |
| *H01M 10/0525* | (2010.01) | |
| *H01M 10/46* | (2006.01) | |
| *H01M 10/0587* | (2010.01) | |
| *B60L 11/18* | (2006.01) | |
| *B60K 6/46* | (2007.10) | |
| *B60W 20/13* | (2016.01) | |
| *B60K 6/28* | (2007.10) | |
| *H01M 4/02* | (2006.01) | |
| *H01M 4/1391* | (2010.01) | |
| *H01M 4/04* | (2006.01) | |
| *H01M 4/1393* | (2010.01) | |

(52) U.S. Cl.
CPC ....... *B60L 11/1805* (2013.01); *B60L 11/1851* (2013.01); *B60W 20/13* (2016.01); *H01M 2/162* (2013.01); *H01M 2/1653* (2013.01); *H01M 4/131* (2013.01); *H01M 4/133* (2013.01); *H01M 4/525* (2013.01); *H01M 4/623* (2013.01); *H01M 4/625* (2013.01); *H01M 4/661* (2013.01); *H01M 10/0525* (2013.01); *H01M 10/0587* (2013.01); *H01M 10/46* (2013.01); *B60L 11/1818* (2013.01); *B60L 11/1859* (2013.01); *B60L 11/1861* (2013.01); *B60L 11/1864* (2013.01); *B60L 11/1872* (2013.01); *B60L 2210/40* (2013.01); *B60L 2240/42* (2013.01); *B60L 2240/441* (2013.01); *B60L 2240/54* (2013.01); *B60W 2510/242* (2013.01); *B60W 2710/0644* (2013.01); *B60W 2710/08* (2013.01); *B60Y 2200/91* (2013.01); *B60Y 2200/92* (2013.01); *B60Y 2300/91* (2013.01); *B60Y 2400/112* (2013.01); *H01M 4/0404* (2013.01); *H01M 4/0435* (2013.01); *H01M 4/1391* (2013.01); *H01M 4/1393* (2013.01); *H01M 2004/021* (2013.01); *H01M 2004/027* (2013.01); *H01M 2004/028* (2013.01); *H01M 2220/20* (2013.01); *H01M 2220/30* (2013.01); *H01M 2300/0037* (2013.01); *H01M 2300/0085* (2013.01); *Y10S 903/907* (2013.01); *Y10S 903/93* (2013.01)

(58) Field of Classification Search
CPC . B60W 20/13; B60K 6/28; B60K 6/46; B60L 11/1803; B60L 11/1805; B60L 11/1851
USPC .................................. 701/22, 36; 180/65.265
See application file for complete search history.

(56) References Cited

U.S. PATENT DOCUMENTS

| | | | |
|---|---|---|---|
| 2007/0166610 A1* | 7/2007 | Nakashima | H01M 4/13 429/128 |
| 2011/0111294 A1* | 5/2011 | Lopez | H01M 4/134 429/217 |
| 2011/0278170 A1* | 11/2011 | Chiang | G02F 1/1523 204/483 |
| 2011/0287304 A1 | 11/2011 | Zinck et al. | |
| 2014/0227562 A1 | 8/2014 | Kamizori et al. | |
| 2014/0356695 A1* | 12/2014 | Abe | H01M 4/131 429/163 |

FOREIGN PATENT DOCUMENTS

| | | |
|---|---|---|
| JP | 2007-157584 A | 6/2007 |
| JP | 2008-503049 A | 1/2008 |
| JP | 4594269 B2 | 12/2010 |
| JP | 4984339 B2 | 7/2012 |
| JP | 2013-519968 A | 5/2013 |
| WO | 2013/038939 A1 | 3/2015 |

OTHER PUBLICATIONS

Written Opinion dated Jun. 16, 2015 in corresponding international application No. PCT/JP2015/001285 (4 pages).

* cited by examiner

BATTERY, BATTERY PACK, ELECTRONIC EQUIPMENT, ELECTRIC VEHICLE, POWER STORAGE DEVICE, AND POWER SYSTEM

CROSS-REFERENCE TO RELATED APPLICATIONS

The present application claims the benefit of International Application No. PCT/JP2015/001285, filed Mar. 10, 2015, which claims priority to Japanese Application No. 2014-094932, filed May 2, 2014, the entire contents of which are incorporated herein by reference.

TECHNICAL FIELD

The present technology relates to a battery, a battery pack, electronic equipment, an electric vehicle, a power storage device, and a power system.

BACKGROUND ART

In recent years, the electronic equipment typified by, e.g., mobile phones or mobile information terminal equipment have been broadly spread, and for such equipment, size reduction, weight reduction, and a longer life have been strongly demanded. With this demand, batteries, particularly lightweight compact secondary batteries being able to have a high energy density, have been developed as power sources.

Such secondary batteries are not limited to the above-described electronic equipment, and it has been recently considered that the secondary batteries are applied to various applications typified by electric tools such as electric drills, electric vehicles such as electric cars, and power storage systems such as power servers for residential use. High-output high-capacity secondary batteries have been developed as the above-described power sources.

Patent Documents 1 to 3 as described below disclose the techniques relating to secondary batteries.

CITATION LIST

Patent Document

Patent Document 1: Japanese Patent No. 4984339
Patent Document 2: Japanese Patent No. 4594269
Patent Document 3: Japanese Patent Application National Publication (Laid-Open) No. 2008-503049

SUMMARY OF THE INVENTION

Problems to be Solved by the Invention

It has been demanded for batteries to have a high energy density and excellent quick-charge cycle properties.

For this reason, the present technology is intended to provide a battery with a high energy density and excellent quick-charge cycle properties, a battery pack, electronic equipment, an electric vehicle, a power storage device, and a power system.

Solutions to Problems

To solve the above-described problem, the present technology is a battery including: a positive electrode formed with a positive electrode active material layer containing a positive electrode active material at least on one side of a positive electrode current collector; a negative electrode formed with a negative electrode active material layer containing a negative electrode active material at least on one side of a negative electrode current collector; a separator; and an electrolyte, wherein the electrolyte contains a solid particle, a capacity area density (mAh/cm$^2$) of the negative electrode active material layer is equal to or higher than 2.2 mAh/cm$^2$ and equal to or lower than 10 mAh/cm$^2$, and a capacity area density (mAh/cm$^2$) of a gap in the negative electrode active material layer is equal to or higher than 5.9 mAh/cm$^2$ and equal to or lower than 67 mAh/cm$^2$.

The battery pack, the electronic equipment, the electric vehicle, the power storage device, and the power system according to the present technology each include the above-described battery.

Effects of the Invention

According to the present technology, an effect of being able to obtain a high energy density and excellent quick-charge cycle properties can be provided.

Figure 1:
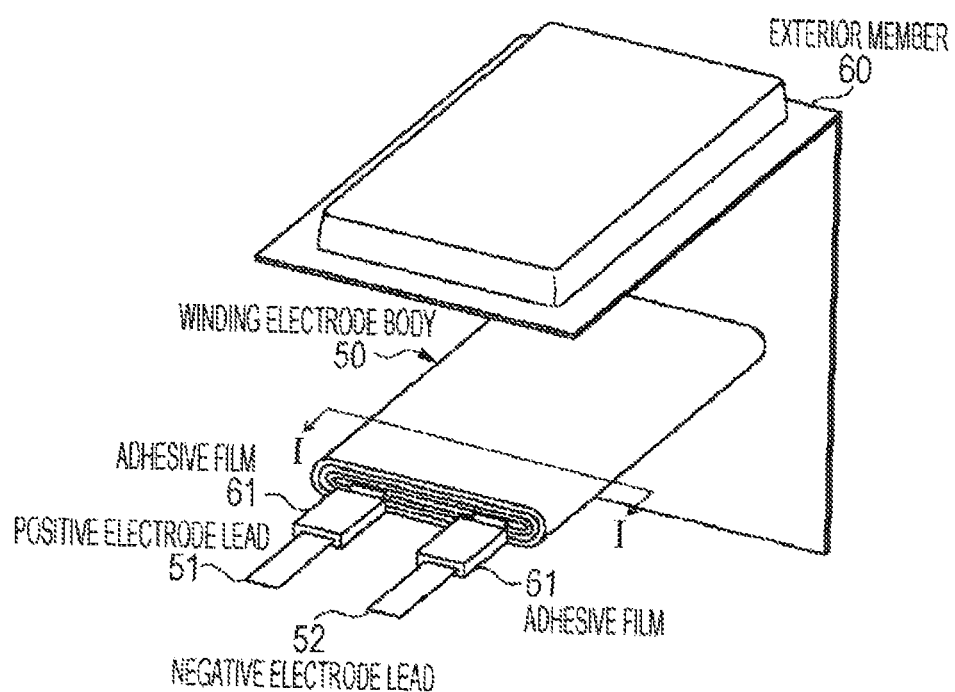
FIG. 1 is an exploded perspective view of a configuration of a laminated film type nonaqueous electrolyte battery of an embodiment of the present technology.

MODES FOR CARRYING OUT THE INVENTION (Summary of Present Technology)
For the sake of easy understanding of the present technology, the summary of the present technology will be first described. Since an initial capacity and quick-charge cycle performance are in an offset relationship, a typical design method is taken to achieve the best balance between both performances. In the typical design method, the thickness of an applied electrode (the thickness of an applied active material layer) and a press density (the density of the active material layer after pressing) are adjusted such that the balance between both performances is adjusted.

On the other hand, the technique of increasing an initial capacity to ensure a certain level of capacity after repeated quick-charge cycles has been proposed. For example, if a negative electrode is changed from graphite to a Si-based material, improvement of the initial capacity can be expected. However, if an electrode is produced with an applied electrode thickness and a press density suitable before the material change, quick-charge performance and cycle performance are significantly lowered. For this reason, an optimal electrode thickness and an optimal press density for an active material type need to be searched again. In the technique of adjusting the electrode thickness and the press density, the optimal balance between both performances cannot be ensured without depending on the active material type. In recent years, a negative electrode made of, e.g., a mixture of graphite and a material such as tin alloy or a Si-based or SiO-based active material has been developed, but an optimal electrode thickness and an optimal press density similarly need to be newly searched every time a mixture ratio is changed. Moreover, there is the technique of forming a battery with a low initial capacity to obtain excellent quick-charge cycle properties. However, due to the low initial capacity, capacity requirements cannot be fulfilled even after a cycle.

In addition, a capacity increases in proportional to a battery volume, and for this reason, it is difficult to compare, among batteries with different sizes, superiority or inferiority in a capacity after a quick-charge cycle. This interferes with estimation of an optimal balance for a certain device type based on a balance for another device type with a different size, and therefore, interferes with horizontal application of the estimated balance.

In order to meet the capacity requirements after the quick-charge cycle, it has been demanded to establish the technique of being able to cope with both of an initial capacity level and quick-charge cycle performance.

In view of the above-described situation, the inventors etc. of the present invention have newly found as follows as a result of intensive study. In a battery with a high battery capacity, a negative electrode is applied thick, and is pressed to a high density. The density of Li ions required to be taken into each unit area of the negative electrode is too high in quick charging. Moreover, such a density is extremely high in an active material gap, leading to delay in ion supply. In discharging, ion congestion is notable in the gap. This results in insufficient quick charging. In a positive electrode, no Li deposition occurs, and therefore, no Li depletion occurs. Even if the negative electrode can be thinly made of, e.g., a high-capacity active material such as a Si-based material, the density of permeated ions required per unit area of the gap remains high, and for this reason, no reserve of energy is generated for quick charging.

With a delay in ion supply to a deep electrode portion, a battery resistance increases, and as a result, a battery voltage and a constant voltage value also increase. This leads to insufficient charging due to a throttled charge current, as well as leading to deposition of Li metal due to many Li ions having received electrons on an electrode surface. The Li metal reacts with an electrolyte solution, and therefore, can no longer contribute to charging/discharging. This brings about the state called "cycle deterioration."

The inventors etc. of the present invention have found that an energy density level of a battery can be controlled using an electrode design index called a "capacity area density $(mAh/cm^2)$ of a negative electrode active material layer," the capacity area density not depending on an active material type. The inventors etc. have also found that quick-charge performance and cycle performance can be controlled using an electrode design index called a "capacity area density $(mAh/cm^2)$ of a gap in the negative electrode active material layer." The "capacity area density $(mAh/cm^2)$ of the gap in the negative electrode active material layer" indicates the concentration of ions passing through the gap, and is a capacity per area of the gap. Moreover, the inventors etc. of the present invention have found that the solid particles contained in an electrolyte can improve an ion diffusion rate, and can obtain both of an initial capacity level and quick-charge cycle performance.

In the present technology, electrode design is made such that solid particles are contained in an electrolyte and that the "capacity area density $(mAh/cm^2)$ of the negative electrode active material layer" and the "capacity area density $(mAh/cm^2)$ of the gap in the negative electrode active material layer" are each controlled within a predetermined range. With such electrode design, a battery can be provided, which maintains a high capacity even after repeated quick charging in the case of any active materials or a mixture of different types of active materials.

Embodiments of the present technology will be described below with reference to drawings. Note that description will be made in the following order:

1. First Embodiment (Example of Laminated Film Type Battery);
2. Second Embodiment (Example of Cylindrical Battery);
3. Third Embodiment (Example of Rectangular Battery);
4. Fourth Embodiment (Example of Battery Pack)
5. Fifth Embodiment (Another Example of Battery Pack)
6. Sixth Embodiment (Example of Power Storage System etc.)
7. Other Embodiments (Variations)

Note that the embodiments etc. described below are specific preferable examples of the present technology, and the contents of the present technology are not limited to these embodiments etc. Moreover, the advantageous effects described in the present specification will be merely set forth as examples, and are not limited. These advantageous effects are not intended to deny the presence of advantageous effects different from the example advantageous effects.

1. First Embodiment

In the first embodiment of the present technology, an example of a laminated film type battery will be described. Such a battery is a nonaqueous electrolyte battery, and is also a lithium ion secondary battery being able to perform charging/discharging.

(1-1) Configuration of Example of Nonaqueous Electrolyte Battery

FIG. 1 illustrates a configuration of the nonaqueous electrolyte battery of the first embodiment. Such a nonaqueous electrolyte battery is of a so-called "laminated film type," and is configured such that a winding electrode body 50 to which a positive electrode lead 51 and a negative electrode lead 52 are attached is housed in a film-shaped exterior member 60.

The positive electrode lead 51 and the negative electrode lead 52 protrude, in the same direction, from the inside to the outside of the exterior member 60, for example. The positive electrode lead 51 and the negative electrode lead 52 are each made of a metal material such as aluminum, copper, nickel, or stainless steel, and are each formed in a thin plate shape or a mesh shape.

The exterior member 60 is formed of, e.g., a laminated film configured such that a resin layer is formed on each side of a metal layer. In the laminated film, the outer resin layer is formed on the surface of the metal layer exposed on the outside of the battery, and the inner resin layer is formed on the surface of the metal layer facing a power generation element, such as the winding electrode body 50, on the inside of the battery.

The metal layer plays the most important role in prevention of entry of moisture, oxygen, and light and protection of contents. Considering lightness, extensibility, a cost, and easy processing, aluminum (Al) is most used. The outer resin layer has favorable appearance, strength, and flexibility, for example. A resin material such as nylon or polyethylene terephthalate (PET) is used for the outer resin layer. The inner resin layer includes the portions melted and fused together by heat or ultrasonic waves. For this reason, polyolefin resin is suitable for the inner resin layer, and co-extruded polypropylene (CPP) is often used. If necessary, an adhesive layer may be provided between the metal layer and each of the outer and inner resin layers.

The exterior member 60 is provided with the recess formed by deep drawing in the direction from the inner resin layer toward the outer resin layer and housing the winding electrode body 50, for example. The exterior member 60 is disposed such that the inner resin layer faces the winding electrode body 50. The opposing inner resin layer portions of the exterior member 60 closely contact each other at an outer edge portion of the recess by, e.g., fusing. An adhesive film 61 configured to improve adhesion between the inner resin layer of the exterior member 60 and each of the positive and negative electrode leads 51, 52 made of the metal material is disposed between the exterior member 60 and each of the positive and negative electrode leads 51, 52. The adhesive film 61 is made of a resin material exhibiting high adhesion to a metal material. The adhesive film 61 is made of, e.g., polyethylene, polypropylene, or polyolefin resin obtained by modification of these materials, such as modified polyethylene or modified polypropylene.

Note that the exterior member 60 may be, instead of the aluminum laminated film including the metal layer made of aluminum (Al), formed of a laminated film having another structure, a polymer film such as polypropylene, or a metal film.

Figure 2:
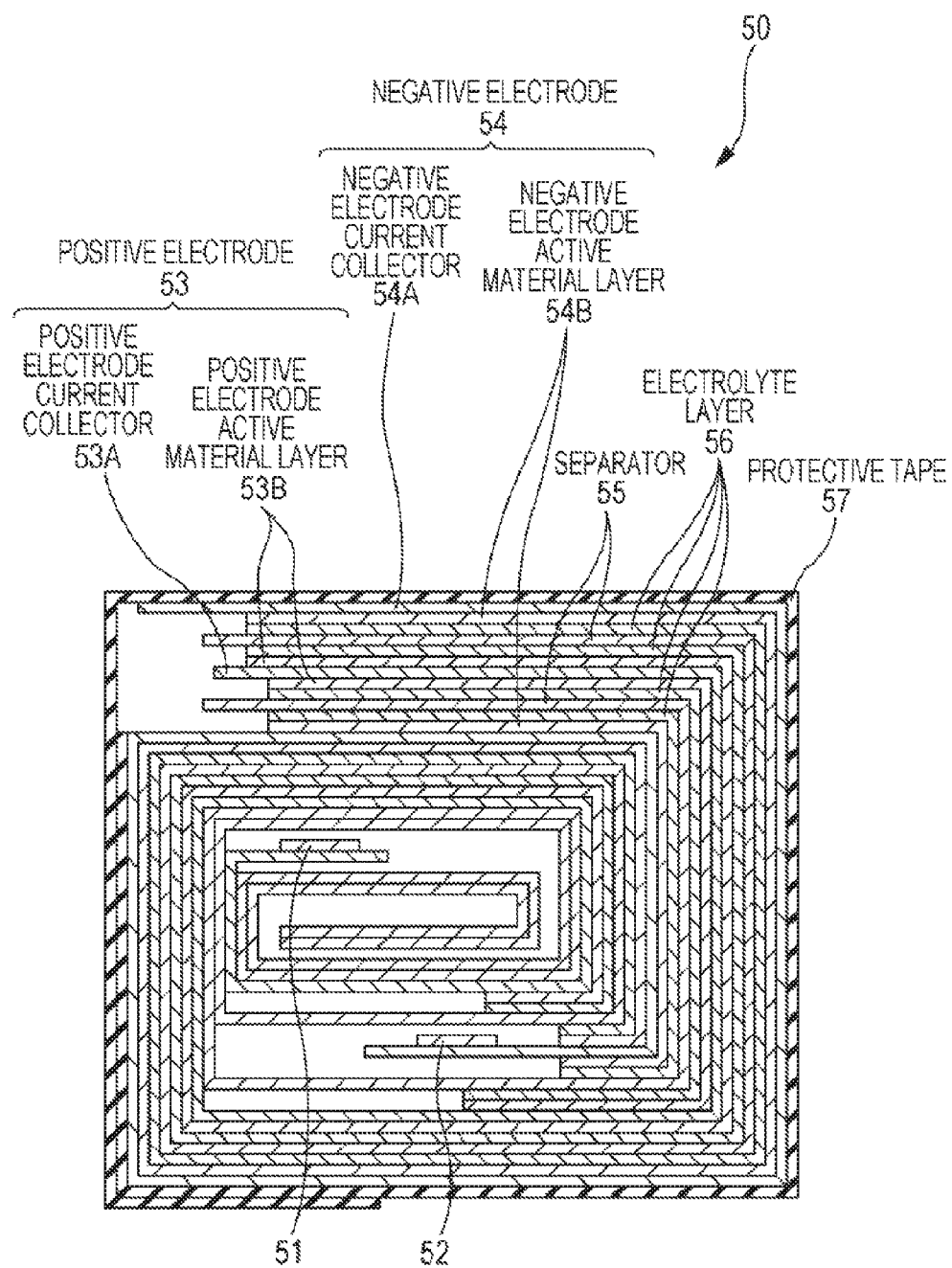
FIG. 2 is a cross-sectional view of a configuration of a winding electrode body of FIG. 1 along an I-I line.

FIG. 2 illustrates a cross-sectional structure of the winding electrode body 50 of FIG. 1 along an I-I line. As illustrated in FIG. 1, the winding electrode body 50 is wound in the state in which a band-shaped positive electrode 53 and a band-shaped negative electrode 54 are stacked on each other with a band-shaped separator 55 and an electrolyte layer 56 being interposed therebetween. An outermost portion of the winding electrode body 50 is protected by a protective tape 57, if necessary.

(Positive Electrode)

The positive electrode 53 has such a structure that a positive electrode active material layer 53B is formed on one or both surfaces of a positive electrode current collector 53A. Metal foil such as aluminum (Al) foil, nickel (Ni) foil, or stainless steel (SUS) foil can be used as the positive electrode current collector 53A, for example.

The positive electrode active material layer 53B contains a positive electrode active material, a conductive agent, and a binder, for example. One or more of any positive electrode materials being able to store and release lithium can be used as the positive electrode active material. If necessary, the positive electrode active material may contain other materials such as a binder and a conductive agent.

For example, a lithium-containing compound is preferable as the positive electrode material being able to store and release lithium. This is because such a compound exhibits a high energy density. Examples of the lithium-containing compound include the composite oxide containing lithium and a transition metal element, and the phosphate compound containing lithium and a transition metal element. Of these compounds, the compound containing, as the transition metal element, at least one selected from the group consisting of cobalt (Co), nickel (Ni), manganese (Mn), and iron (Fe) is preferable. This is because a higher voltage can be obtained.

The lithium-containing compound represented by $Li_xM1O_2$ or $Li_yM2PO_4$ can be used as the positive electrode material, for example. In such formulae, "M1" and "M2" denote one or more types of transition metal elements. Values of x and y vary according to a charge/discharge state of the battery, and are typically $0.05 \leq x \leq 1.10$ and $0.05 \leq y \leq 1.10$. Examples of the composite oxide containing lithium and the transition metal element include lithium-cobalt composite oxide ($Li_xCoO_2$); lithium-nickel composite oxide ($Li_xNiO_2$); lithium-nickel-cobalt composite oxide ($Li_xNi_{1-z}Co_zO_2$ ($0<z<1$)); lithium-nickel-cobalt-manganese composite oxide ($Li_xNi_{(1-v-w)}Co_vMn_wO_2$ ($0<v+w<1$, $v>0$, $w>0$); or lithium-manganese composite oxide ($LiMn_2O_4$) or lithium-manganese-nickel composite oxide ($LiMn_{2-t}Ni_tO_4$ ($0<t<2$)) with a spinel structure. Of these composite oxides, the composite oxides containing cobalt are preferable. This is because a high capacity and excellent cycle properties can be obtained. Moreover, examples of the phosphate compound containing lithium and the transition metal element include a lithium-iron-phosphate compound ($LiFePO_4$) and a lithium-iron-manganese-phosphate compound ($LiFe_{1-u}Mn_uPO_4$ ($0<u<1$)).

Specifically, examples of such lithium composite oxide include lithium cobalt oxide ($LiCoO_2$), lithium nickel oxide ($LiNiO_2$), and lithium manganese oxide ($LiMn_2O_4$). Moreover, the solid solution obtained by replacing some of the transition metal elements with other elements can be used. Examples of such a solid solution include a lithium-nickel-cobalt composite oxide (e.g., $LiNi_{0.5}Co_{0.5}O_2$, $LiNi_{0.8}Co_{0.2}O_2$). These lithium composite oxides can generate a high voltage, and exhibits an excellent energy density.

Moreover, from the viewpoint of realizing higher electrode filling properties and higher cycle properties, composite particles may be used, which are formed such that the surfaces of the particles made of any of the above-described lithium-containing compounds are covered with the particulates formed of any other of the lithium-containing compounds.

Other examples of the positive electrode material being able to store and release lithium include oxides such as vanadium oxide ($V_2O_5$), titanium dioxide ($TiO_2$), and manganese dioxide ($MnO_2$); disulfides such as iron disulfide ($FeS_2$), titanium disulfide ($TiS_2$), and molybdenum disulfide ($MoS_2$); chalcogenides (particularly layered compounds and spinel compounds) containing no lithium, such as niobium diselenide ($NbSe_2$); lithium-containing compounds containing lithium; and conductive polymers such as sulfur, polyaniline, polythiophene, polyacetylene, and polypyrrole. Needless to say, the positive electrode material being able to store and release lithium may be other materials than those described above. Moreover, two or more types of the positive materials listed above may be mixed together in any combinations.

For example, a carbon material such as carbon black and graphite is used as the conductive agent. Moreover, e.g., at least one selected from the following group is used as the binder: resin materials such as polyvinylidene fluoride (PVdF), polytetrafluoroethylene (PTFE), polyacrylonitrile (PAN), styrene-butadiene rubber (SBR), and carboxymethyl cellulose (CMC); and copolymers etc. mainly containing these resin materials.

The positive electrode 53 includes the positive electrode lead 51 connected, by spot welding or ultrasonic welding, to one end portion of the positive electrode current collector 53A. The positive electrode lead 51 is preferably formed of metal foil in a mesh shape. However, as long as electrochemical and chemical stability and conduction can be obtained, metal is not necessarily used. Examples of the material of the positive electrode lead 51 include aluminum (Al) and nickel (Ni).

(Negative Electrode)

The negative electrode 54 has such a structure that a negative electrode active material layer 54B is formed on one or both surfaces of a negative electrode current collector 54A. For example, the negative electrode active material layer 54B and the positive electrode active material layer 53B are arranged facing each other. The negative electrode current collector 54A is formed of, e.g., metal foil such as copper foil.

The negative electrode active material layer 54B contains, as a negative electrode active material, one or more of any negative electrode materials being able to store and release lithium. If necessary, the negative electrode active material layer 54B may contain other materials such as the binder and the conductive agent similar to those of the positive electrode active material layer 53B.

Note that in this nonaqueous electrolyte battery, the electrochemical equivalent of the negative electrode material being able to store and release lithium is greater than that of the positive electrode 53. Theoretically, it is preferable that no lithium metal is deposited on the negative electrode 54 in the middle of charging.

Moreover, such a nonaqueous electrolyte battery is designed such that an open circuit voltage (i.e., a battery voltage) in a fully-charged state falls within a range of equal to or higher than 2.80 V and equal to or lower than 6.00 V, for example. Particularly in the case of using, as the negative electrode active material, the material to be lithium alloy at about 0 V versus $Li/Li^+$ or the material storing lithium, it is designed such that the open circuit voltage in the fully-charged state falls within a range of equal to or higher than 4.20 V and equal to or lower than 6.00 V. In this case, the open circuit voltage in the fully-charged state is preferably equal to or higher than 4.25 V and equal to or lower than 6.00V. When the open circuit voltage in the fully-charged state is equal to or higher than 4.25 V, the released lithium amount per unit mass is, even with the same positive electrode active material, greater as compared to that of a battery of 4.20 V. Accordingly, the amounts of the positive and negative active materials are adjusted. Thus, a high energy density can be obtained.

Examples of the negative electrode material being able to store and release lithium include carbon materials such as non-graphitizable carbon, graphitizable carbon, graphite, a pyrolytic carbon group, a coke group, a glass carbon group, an organic polymer compound sintered body, carbon fibers, and activated carbon. Of these materials, examples of the coke group include pitch coke, needle coke, and petroleum coke. The organic polymer compound sintered body is obtained in such a manner that a polymer material such as phenol resin or furan resin is sintered and carbonized at a suitable temperature, and some organic polymer compound sintered bodies are classified into non-graphitizable carbon or graphitizable carbon. With these carbon materials, a change in a crystal structure due to charging/discharging is extremely small, and a high charge/discharge capacity can be obtained. In addition, favorable cycle properties can be obtained. For these reasons, such carbon materials are preferable. In particular, the graphite is preferable because the graphite exhibits a great electrochemical equivalent and a high energy density. Moreover, the non-graphitizable carbon is preferable because the non-graphitizable carbon exhibits excellent cycle properties. Further, the material whose charge/discharge potential is low, specifically the material whose charge/discharge potential is close to that of lithium metal, is preferable because such a material easily achieves a battery with a high energy density.

Examples of other negative electrode materials being able to store and release lithium and achieve a higher capacity include the materials being able to store and release lithium and containing, as a constituent element, at least one type of metal elements and semimetal elements. This is because use of such materials leads to a high energy density. In particular, the negative electrode material is preferably used in combination with a carbon material because a high energy density and excellent cycle properties can be obtained. This negative electrode material may be a single metal or semimetal element; or alloy or compound thereof. Alternatively, part of the negative electrode material may have at least one or more of these phases. Note that in the present technology, alloys include not only the alloy containing two or more types of metal elements, but also the alloy containing one or more types of metal elements and one or more types of semimetal elements. Moreover, a nonmetal element may be contained. The structures of such materials may include a solid solution, an eutectic (an eutectic mixture), an intermetallic compound, or coexistence of two or more of the solid solution, the eutectic, and the intermetallic compound.

Examples of the metal or semimetal element forming the negative electrode material include the metal or semimetal element being able to form lithium and alloy. Specific examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These elements may be crystalline or amorphous.

The negative electrode material preferably contains, as a constituent element, a 4B group metal or semimetal element in the short period periodic table, more preferably contains, as the constituent element, at least one of silicon (Si) or tin (Sn), and much more preferably contains at least silicon. This is because the silicon (Si) and the tin (Sn) exhibit a great lithium storage/release capacity and a high energy density. Examples of the negative electrode material containing at least one of silicon or tin include a simple substance of silicon, or alloy or compound thereof; a simple substance of tin, or alloy or compound thereof; or the material at least partially having one or more of these phases.

Examples of the silicon alloy include the alloy containing, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the tin alloy include the alloy containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the tin (Sn) compound or the silicon (Si) compound include the compound containing oxygen (O) or carbon (C). Such a compound may contain, in addition to the tin (Sn) or the silicon (Si), the above-described second constituent element.

Of these materials, a SnCoC-containing material is preferable as the negative electrode material, the SnCoC-containing material containing cobalt (Co), tin (Sn), and carbon (C) as constituent elements such that a carbon content is equal to or higher than 9.9 mass % and equal to or lower than 29.7 mass % and that the ratio of the cobalt (Co) to the total of the tin (Sn) and the cobalt (Co) is equal to or higher than 30 mass % and equal to or lower than 70 mass %. This is because a high energy density and excellent cycle properties can be obtained within such a composition range.

The SnCoC-containing material may further contain other constituent elements, if necessary. The following elements are preferable as other constituent elements: silicon (Si), iron (Fe), nickel (Ni), chromium (Cr), indium (In), niobium (Nb), germanium (Ge), titanium (Ti), molybdenum (Mo), aluminum (Al), phosphor (P), gallium (Ga), or bismuth (Bi). The SnCoC-containing material may contain two or more of these elements. This is because the capacity or the cycle properties can be further improved.

Note that the SnCoC-containing material has the phases of the tin (Sn), the cobalt (Co), and the carbon (C), and these phases preferably have a low-crystalline structure or a non-crystalline structure. Moreover, in the SnCoC-containing material, at least part of the carbon (C) as the constituent element is preferably bonded to the metal or semimetal element as other constituent element. This is because of the following reason. Although it is assumed that the cycle properties are lowered due to aggregation or crystallization of the tin (Sn), such aggregation or crystallization can be reduced by bonding of the carbon (C) to other elements.

For example, X-ray photoelectron spectroscopy (XPS) is employed as the measurement method for checking an element bonding state. In the XPS, the peak of the 1s orbit (C1s) of carbon appears at 284.5 eV in the device energy-calibrated such that the peak of the 4f orbit (Au4f) of gold atoms is obtained at 84.0 eV in the case of graphite. Moreover, in the case of surface contaminated carbon, the peak appears at 284.8 eV. On the other hand, in the case of a higher charge density of a carbon element or the case of the carbon bonded to a metal or semimetal element, the C1s peak appears in the region lower than 284.5 eV. That is, when the peak of the synthesized wave of C1s obtained for the SnCoC-containing material appears in the region lower than 284.5 eV, at least part of the carbon contained in the SnCoC-containing material is bonded to the metal or semimetal element as other constituent elements.

Note that in XPS measurement, a spectrum energy axis is corrected using the C1s peak, for example. Since surface contaminated carbon typically exists on a surface, the C1s peak of the surface contaminated carbon is 284.8 eV, and is used as a reference energy. In XPS measurement, the waveform of the C1s peak is obtained in the form containing the peak of the surface contaminated carbon and the peak of the carbon contained in the SnCoC-containing material. Thus, the peak of the surface contaminated carbon and the peak of the carbon contained in the SnCoC-containing material are separated from each other by, e.g., analysis using commercially-available software. In waveform analysis, the position of the main peak on the lowest bound energy side is taken as the reference energy (284.8 eV).

Examples of the negative electrode material being able to store and release lithium also include the metal oxide or the polymer compound being able to store and release lithium. Examples of the metal oxide include the lithium-titanium oxide containing titanium and lithium, such as lithium titanate ($Li_4Ti_5O_{12}$); iron oxide; ruthenium oxide; or molybdenum oxide. Examples of the polymer compound include polyacetylene, polyaniline, or polypyrrole.

("Capacity Area Density of Negative Electrode Active Material Layer" and "Capacity Area Density of Gap in Negative Electrode Active Material Layer")

The capacity area density ($mAh/cm^2$) of the negative electrode active material layer 54B is equal to or higher than 2.2 $mAh/cm^2$ and equal to or lower than 10 $mAh/cm^2$, and the capacity area density ($mAh/cm^2$) of the gap in the negative electrode active material layer 54B is equal to or higher than 5.9 $mAh/cm^2$ and equal to or lower than 67 $mAh/cm^2$.

In the present technology, the capacity area density of the negative electrode active material layer 54B is adjusted within a predetermined range so that the energy density of the battery can be adjusted high, and the capacity area density, indicating the concentration and amount of ions which need to pass through the gap, of the gap in the negative electrode active material layer 54B is adjusted within a predetermined range so that quick-charge performance and cycle performance can be improved. Further, since solid particles are contained in the electrolyte, an ion diffusion rate can be improved, and both of an excellent initial capacity and excellent quick-charge performance can be obtained.

For example, in the case where the active material is changed from graphite to Si regardless of an active material type, even if the active material is changed to the material with an extremely different capacity or if a mixture ratio is changed when the active material is a mixture, the capacity area density ($mAh/cm^2$) of the negative electrode active material layer 54B and the capacity area density ($mAh/cm^2$) of the gap in the negative electrode active material layer 54B are adjusted within the predetermined ranges, and as a result, control can be made to constantly obtain excellent performance. For example, in order to obtain a predetermined level of volume energy density of the battery, the capacity area density ($mAh/cm^2$) of the negative electrode active material layer 54B may be adjusted to the value corresponding to such a level. For example, in order to improve the quick-charge cycle of the battery to predetermined performance, the capacity area density ($mAh/cm^2$) of the gap in the negative electrode active material layer 54B may be adjusted to the value corresponding to such performance regardless of an active material type.

Since the capacity area density ($mAh/cm^2$) of the negative electrode active material layer 54B is adjusted within the predetermined range, the energy density of the battery can be stably adjusted to a desired level without depending on the material type of the negative electrode active material. In order to obtain better advantageous effects, the capacity area density ($mAh/cm^2$) of the negative electrode active material layer 54B is preferably equal to or higher than 2.5 $mAh/cm^2$ and equal to or lower than 9 mAh/cm$^2$, and more preferably equal to or higher than 4 mAh/cm$^2$ and equal to or lower than 7 mAh/cm$^2$.

Since the capacity area density (mAh/cm$^2$) of the gap in the negative electrode active material layer 54B is adjusted within the predetermined range, the density of lithium ions passing through the gap in the negative electrode active material layer 54B in quick charging can be adjusted to a suitable level. With such a configuration, the quick-charge performance and the cycle performance can be improved. In order to obtain better advantageous effects, the capacity area density (mAh/cm$^2$) of the gap in the negative electrode active material layer 54B is preferably equal to or higher than 8 mAh/cm$^2$ and equal to or lower than 45 mAh/cm$^2$, and more preferably equal to or higher than 13 mAh/cm$^2$ and equal to or lower than 23 mAh/cm$^2$.

(Measurement of Capacity Area Density of Negative Electrode Active Material Layer)

The capacity area density (mAh/cm$^2$) of the negative electrode active material layer 54B is defined by the negative electrode active material layer 54B on one side of the battery, the battery including the negative electrode active material layer 54B formed on one or both surfaces of the negative electrode current collector 54A. For example, the negative electrode obtained by disassembly of a fully-charged battery before cycle repetition is punch out to a circular shape, and then, Li metal is disposed opposing to the negative electrode with a separator being interposed therebetween. A coin cell is produced using an electrolyte solution (typically, e.g., EC: 20 mass %/DEC: 65 mass %/LiPF$_6$: 15 mass %). Next, a capacity (mAh) is measured when Li ions are dedoped from the negative electrode at a constant current of 0.2 mA until 1.5 V, and a value is obtained by dividing the capacity by the area (cm$^2$) of the negative electrode. The electrode configured such that an active material layer is disposed only on one side is used as the electrode, and the value per side of the electrode is obtained.

(Measurement of Capacity Area Density of Gap in Negative Electrode Active Material Layer)

The capacity area density (mAh/cm$^2$) of the gap in the negative electrode active material layer 54B is obtained as follows. The porosity of the above-described electrode is typically measured using a mercury porosimeter, and then, the capacity area density (mAh/cm$^2$) of the negative electrode active material layer 54B is divided by the porosity (Negative Electrode Active Material Layer Capacity Area Density (mAh/cm$^2$)/Porosity). Note that other methods for measuring the porosity may be used as long as the porosity of the electrode can be accurately obtained.

(Separator)

The separator 55 is a porous film formed of an insulating film exhibiting high ion permeability and having a predetermined mechanical strength. A nonaqueous electrolyte solution is held in holes of the separator 55.

The separator 55 is the porous film made of rein, for example. The porous film made of rein is formed in such a manner that a material such as resin is thinly extended, and has a porous structure. For example, the porous film made of resin is obtained in such a manner that a material such as resin is shaped by, e.g., stretching or phase separation. For example, in stretching, molten polymer is extruded from a T-die or a circular die, and then, thermal processing is performed for the extruded molten polymer. In this manner, a crystal structure is formed with high regularity. Subsequently, low-temperature stretching and high-temperature stretching are performed such that a crystal interface is detached to form a clearance between lamellae. In this manner, a porous structure is formed. In phase separation, the homogeneous solution prepared by mixing polymer and a solvent together at high temperature is formed into a film by a T-die method or inflation. Then, the solvent is extracted using another volatile solvent, and as a result, the porous film made of resin can be obtained. Note that the method for manufacturing the porous film made of resin is not limited to these methods, and typically-proposed methods can be broadly used. For example, polyolefin resin such as polypropylene or polyethylene, acrylic resin, styrene resin, polyester resin, or nylon resin is preferably used as the resin material forming the separator 55. In particular, polyethylene, such as low-density polyethylene, high-density polyethylene, and linear polyethylene, or a low-molecular-weight wax fraction thereof, or polyolefin resin such as polypropylene is preferably used because the melting temperature of these materials is suitable and these materials are easily available. Moreover, the structure in which two or more types of these porous films are stacked on each other or the porous film formed by melting and kneading two or more of resin materials may be used. With the porous film made of polyolefin resin, excellent separation between the positive electrode 53 and the negative electrode 54 can be obtained, and therefore, internal short circuit can be further reduced.

The separator 55 may be non-woven fabric. The non-woven fabric is the structure formed not by weaving or knitting fibers, but by bonding and/or interlacing fibers together in a mechanical manner, a chemical manner, a manner using a solvent, or a combination thereof. Most of the materials which can be processed into fibers can be used as the raw material of the non-woven fabric. By adjustment of shapes such as a fiber length and a thickness, the non-woven fabric can have the function corresponding to a purpose and a use application. The method for manufacturing the non-woven fabric typically includes two phases, i.e., the step of forming a multilayer of fibers called "fleece," and the step of bonding the fibers of the fleece. There are various manufacturing methods at each phase, and method selection is made according to the raw material, purpose, and use application of the non-woven fabric. For example, a dry method, a wet method, spunbonding, or melt blowing can be used as the step of forming the fleece. Thermal bonding, chemical bonding, needle punching, spunlacing (water-jet interlacing), stitch bonding, or a steam jet method can be used as the step of bonding the fibers of the fleece.

Examples of the non-woven fabric include a polyethylene terephthalate (PET) air-permeable film (polyethylene terephthalate non-woven fabric) using polyethylene terephthalate fibers. Note that the air-permeable film means the film having air permeability. Other examples of the non-woven fabric include the non-woven fabric using aramid fibers, glass fibers, cellulose fibers, polyolefin fibers, or nylon fibers. For the non-woven fabric, two or more types of fibers may be used.

The thickness of the separator 55 can be optionally set as long as the thickness of the separator 55 is equal to or greater than such a thickness that a required strength can be maintained. The separator 55 is preferably set at such a thickness that insulation between the positive electrode 53 and the negative electrode 54 is made to prevent short circuit etc., that the separator 55 has ion permeability for suitable battery reaction through the separator 55, and that the volume efficiency of the active material layer contributing to battery reaction in the battery is as high as possible. Specifically, the thickness of the separator 55 is preferably equal to or greater than 4 μm and equal to or smaller than 20 μm, for example.

(Electrolyte Layer)

The electrolyte layer 56 contains a matrix polymer compound, a nonaqueous electrolyte solution, and solid particles. In the electrolyte layer 56, the nonaqueous electrolyte solution is held by the matrix polymer compound, for example. The electrolyte layer 56 is, e.g., the layer formed of so-called "electrolyte gel." Note that the solid particles may be contained in the negative electrode active material layer 54B and/or the positive electrode active material layer 53B. Although details will be described in variations below, a nonaqueous electrolyte solution as a liquid electrolyte may be used instead of the electrolyte layer 56. In this case, the nonaqueous electrolyte battery includes, instead of the winding electrode body 50, the winding body configured such that the electrolyte layer 56 is omitted from the winding electrode body 50. The winding body is impregnated with the nonaqueous electrolyte as the liquid electrolyte with which the inside of the exterior member 60 is filled.

(Matrix Polymer Compound)

The compound having compatibility with a solvent may be used as the matrix polymer compound (resin) holding the electrolyte solution, for example. Examples of such a matrix polymer compound include fluorine-containing resin such as polyvinylidene difluoride and polytetrafluoroethylene; fluorine-containing rubber such as vinylidene fluoride-tetrafluoroethylene copolymer and ethylene-tetrafluoroethylene copolymer; styrene-butadiene copolymer and hydride thereof; acrylonitrile-butadiene copolymer and hydride thereof; acrylonitrile-butadiene-styrene copolymer and hydride thereof; methacrylic ester-acrylic ester copolymer; styrene-acrylic ester copolymer; acrylonitrile-acrylic ester copolymer; a rubber group such as ethylene propylene rubber, polyvinyl alcohol, and polyvinyl acetate; cellulose derivatives such as ethyl cellulose, methyl cellulose, hydroxyethyl cellulose, and carboxymethyl cellulose; resins for which at least one of a melting point or a glass transition temperature is equal to or higher than 180°, such as polyphenyleneether, polysulfon, polyether sulfone, polyphenylenesulfide, polyetherimide, polyimide, polyamide (particularly, aramid), polyamide imide, polyacrylonitrile, polyvinyl alcohol, polyether, acrylic resin, and polyester; and polyethylene glycol.

(Nonaqueous Electrolyte Solution)

The nonaqueous electrolyte solution contains electrolyte salt and a nonaqueous solvent dissolving the electrolyte salt.

(Electrolyte Salt)

The electrolyte salt contains one or more types of light metal compounds such as lithium salt, for example. Example of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate dehydrate ($Li_2SiF_6$), lithium chloride (LiCl), and lithium bromide (LiBr). Of these materials, at least one selected from the group consisting of the lithium hexafluorophosphate, the lithium tetrafluoroborate, the lithium perchlorate, and the lithium hexafluoroarsenate is preferable, and the lithium hexafluorophosphate is more preferable.

(Concentration of Electrolyte Salt)

In order to obtain better advantageous effects, the concentration of the electrolyte salt is preferably equal to or higher than 10 mass % and equal to or lower than 40 mass % with respect to the mass of the electrolyte, more preferably equal to or higher than 10 mass % and equal to or lower than 30 mass %, and particularly preferably equal to or higher than 12 mass % and equal to or lower than 20 mass %. The presence of the solid particles in an electrolyte layer 36 facilitates crushing of the cluster of lithium ions and solvent, leading to a higher degree of dissociation of cations and anions. Thus, a higher concentration of the electrolyte salt in the electrolyte can be set as compared to a typical concentration, and a higher capacity can be obtained as compared to a typical capacity.

(Nonaqueous Solvent)

Examples of the nonaqueous solvent include lactone-based solvents such as γ-butyrolactone, γ-valerolactone, δ-valerolactone, and ε-caprolactone; carbonate ester-based solvents such as ethylene carbonate, propylene carbonate, butylene carbonate, vinylene carbonate, dimethyl carbonate, ethyl methyl carbonate, and diethyl carbonate; ether-based solvents such as 1, 2-dimethoxyethane, 1-ethoxy-2-methoxyethane, 1,2-diethoxyethane, tetrahydrofuran, and 2-methyltetrahydrofuran; nitrile-based solvents such as acetonitrile; sulfolane-based solvents; a phosphoric acid group; phosphate ester solvents; and a pyrrolidone group. Any one of the solvents may be used alone, or may be used in combination of two or more.

(Solid Particle)

For example, at least any of inorganic or organic particles may be used as the solid particles. Examples of the solid particle include particles of metal oxide, a sulfate compound, a carbonate compound, metal hydroxide, metal carbide, metal nitride, metal fluoride, a phosphate compound, and mineral. Note that particles with electric insulation properties are typically used as the particles, but the particles (the particulates) electrically insulated by, e.g., surface treatment of particle (particulate) surfaces of a conductive material by an electrically-insulating material may be used.

The following materials may be suitably used as the metal oxide: silicon oxide (e.g., $SiO_2$, silica (including, e.g., silica stone powder, fused quartz, glass beads, diatomite, wet synthetics such as colloidal silica, and dry synthetics such as fumed silica)), zinc oxide (ZnO), tin oxide (SnO), magnesium oxide (magnesia, MgO), antimony oxide ($Sb_2O_3$), and aluminum oxide (alumina, $Al_2O_3$).

The following materials may be suitably used as the sulfate compound: magnesium sulfate ($MgSO_4$), calcium sulfate ($CaSO_4$), barium sulfate ($BaSO_4$), and strontium sulfate ($SrSO_4$). The following materials may be suitably used as the carbonate compound: magnesium carbonate ($MgCO_3$, magnesite), calcium carbonate ($CaCO_3$, calcite), barium carbonate ($BaCO_3$), and lithium carbonate ($Li_2CO_3$). The following materials may be suitably used as the metal hydroxide: hydroxide oxides and hydrous oxides such as magnesium hydroxide ($Mg(OH)_2$, brucite), aluminum hydroxide ($Al(OH)_3$ (bayerite, gibbsite)), zinc hydroxide ($Zn(OH)_2$), boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)); and magnesium oxide hydrate ($MgO_a.mH_2O$ (a=0.8 to 1.2, m=0.5 to 10)); and hydrate hydroxides such as magnesium hydroxide octahydrate. Boron carbide ($B_4C$) may be suitably used as the metal carbide. The following materials may be suitably used as the metal nitride: silicon nitride ($Si_3N_4$), boron nitride (BN), aluminum nitride (AlN), and titanium nitride (TiN).

The following materials may be suitably used as the metal fluoride: lithium fluoride (LiF), aluminum fluoride ($AlF_3$), calcium fluoride ($CaF_2$), barium fluoride ($BaF_2$), and magnesium fluoride. The following materials may be suitably used as the phosphate compound: trilithium phosphate ($Li_3PO_4$), magnesium phosphate, magnesium hydrogenphosphate, and ammonium polyphosphate.

Examples of the mineral include silicate mineral, carbonate mineral, and oxide mineral. The silicate mineral is, according to a crystal structure, classified into nesosilicate mineral, sorosilicate mineral, cyclosilicate mineral, inosilicate mineral, layered silicate (phyllosilicate) mineral, and tectosilicate mineral. Note that according to a classification criteria different from the crystal structure, some silicate minerals may be classified as fibrous silicate mineral called an "asbestos group."

The nesosilicate mineral is island-shaped tetrahedral silicate mineral formed of an isolated Si—O tetrahedron ($[SiO_4]^{4-}$). Examples of the nesosilicate mineral include an olivine group and a garnet group. Specific examples of the nesosilicate mineral include olivine (a continuous solid solution of $Mg_2SiO_4$ (forsterite) and $Fe_2SiO_4$ (fayalite)), magnesium silicate (forsterite (kudokanranseki), $Mg_2SiO_4$), aluminum silicate ($Al_2SiO_5$, sillimanite, andalusite, kyanite), zinc silicate (willenite, $Zn_2SiO_4$), zirconium silicate (zircon, $ZrSiO_4$), and mullite ($3Al_2O_3.2SiO_2$ to $2Al_2O_3.SiO_2$).

The sorosilicate mineral is group structural type silicate mineral with the group of linked Si—O tetrahedrons ($[Si_2O_7]^{6-}$, $[Si_5O_{16}]^{12-}$). Examples of the sorosilicate mineral include vesuvianite and an epidote group.

The cyclosilicate mineral is ring-shaped silicate mineral formed of a Si—O tetrahedron ring ($[Si_3O_9]^{6-}$, $[Si_4O_{12}]^{8-}$, $[Si_6O_{18}]^{12-}$) with a limited number of bonds (three to six bonds). Examples of the cyclosilicate mineral include beryl and tourmaline.

The inosilicate mineral is fibrous silicate mineral formed such that Si—O tetrahedrons are infinitely linked in a chain shape ($[Si_2O_6]^{4-}$) and a band shape ($[Si_3O_9]^{6-}$, $[Si_4O_{11}]^{6-}$, $[Si_5O_{15}]^{10-}$, $[Si_7O_{21}]^{14-}$). Examples of the inosilicate mineral include a pyroxene group such as calcium silicate (wollastonite (keikaiseki), $CaSiO_3$), and an amphibole group.

The layered silicate mineral is layered silicate mineral formed such that Si—O tetrahedrons ($[SiO_4]^{4-}$) are linked in a net shape. Note that specific examples of the layered silicate mineral will be described later.

The tectosilicate mineral is three-dimensional mesh structural type silicate mineral formed such that Si—O tetrahedrons ($[SiO_4]^{4-}$) are three-dimensionally linked in a mesh shape. Examples of the tectosilicate mineral include quartz, a feldsper group, a zeolite group, and aluminosilicate ($aM_2O.bAl_2O_3.cSiO_2.dH_2O$ where "M" is a metal element and "a," "b," "c," and "d" are each an integer of 1 or more) such as zeolite ($M_{2/n}O.Al_2O_3.xSiO_2.yH_2O$ where the same definition is applied to "M," "n" is a valence of M, x≥2, and y≥0).

Examples of the asbestos group include chrysotile, amosite, and anthophynite.

Examples of the carbonate mineral include dolomite (dolostone, $CaMg(CO_3)_2$) and hydrotalcite ($Mg_6Al_2(CO_3)(OH)_{16}.4(H_2O)$).

Examples of the oxide mineral include spinel ($MgAl_2O_4$).

Examples of other minerals include strontium titanate ($SrTiO_3$). Note that the minerals may be natural minerals or artificial minerals.

Note that, of these minerals, some minerals are classified into clay minerals. Examples of such a clay mineral include crystalline clay mineral and non-crystalline or quasi-crystalline clay mineral. Examples of the crystalline clay mineral include layered silicate mineral, mineral similar to the layered silicate mineral in a structure, other silicate minerals such as silicate mineral, and layered carbonate mineral.

The layered silicate mineral includes a Si—O tetrahedral sheet and an octahedral sheet of, e.g., Al—O or Mg—O combined with the tetrahedral sheet. The layered silicate is typically classified according to the number of tetrahedral and octahedral sheets, the number of cations of an octahedron, and a layer charge. Note that in the layered silicate mineral, all or some of interlayer metal ions may be replaced with, e.g., organic ammonium ions.

Specific examples of the layered silicate mineral include a 1:1 kaolinite-serpentine group, a 2:1 pyrophylite-talc group, a smectite group, a vermiculite group, a mica (unmo) group, a brittle mica (zeiunmo) group, and a chlorite (ryokudeiseki) group.

Examples of the kaolinite-serpentine group include chrysotile, antigorite, lizardite, kaolinite ($Al_2Si_2O_5(OH)_4$), and dickite. Examples of the pyrophylite-talc group include talc ($Mg_3Si_4O_{10}(OH)_2$), willemseite, and pyrophyllite (yoroseki, $Al_2Si_4O_{10}(OH)_2$). Examples of the smectite group include saponite [$(Ca/2,Na)_{0.33}$ $(Mg,Fe^{2+})_3(Si,Al)_4 O_{10}(OH)_2.4H_2O$], hectorite, sauconite, montmorillonite $\{(Na,Ca)_{0.33}(Al,Mg)2Si_4O_{10}(OH)_2.nH_2O$, note that the clay containing montmorillonite as a main component is referred to as "bentonite"}, beidellite, and nontolite. Examples of the mica (unmo) group include muscovite (white mica, $KAl_2(AlSi_3)O_{10}(OH)_2$), sericite (kinuunmo), phlogopite (gold mica), biotite, and lepidolite (lithia mica). Examples of the brittle mica (zeiunmo) group include margarite, clintonite, and anandite. Examples of the chlorite (ryokudeiseki) group include cookeite, sudoite, clinochlore, chamosite, and nimite.

Examples of the mineral similar to the layered silicate in the structure include water-containing magnesium silicate with such a 2:1 ribbon structure that a layer of tetrahedral sheets arranged in a ribbon shape is joined to an adjacent layer of tetrahedral sheets arranged in a ribbon with the top of one of the layers being inverted. Examples of the water-containing magnesium silicate include sepiolite (meerschaum, $Mg_9Si_{12}O_{30}(OH)_6(OH_2)_4.6H_2O$) and palygorskite.

Examples of other silicate minerals include porous aluminosilicate such as zeolite ($M_{2/n}O.Al_2O_3.xSiO_2.yH_2O$ where "M" denotes a metal element, "n" denotes a valence of M, x≥2, y≥0), and attapulgite [$(Mg,Al)2Si_4O_{10}(OH) 6H_2O$].

Examples of the layered carbonate mineral include hydrotalcite ($Mg_6Al_2(CO_3)(OH)_{16}.4(H_2O)$).

Examples of the non-crystalline or quasi-crystalline clay mineral include bingeraito, imogolite ($Al_2SiO_3(OH)$), and allophane.

These inorganic particles may be used alone, or may be used in combination of two or more. The inorganic particles also have oxidation resistance. In the case of providing the electrolyte layer 56 between the positive electrode 53 and the separator 55, the inorganic particles have great resistance to oxidation environment in the vicinity of the positive electrode in charging.

The solid particles may be organic particles. Examples of the material forming the organic particles include melamine, melamine cyanurate, melamine polyphosphate, crosslinked polymethyl methacrylate (crosslinked PMMA), polyolefin, polyethylene, polypropylene, polystyrene, polytetrafluoroethylene, polyvinylidene fluoride, polyamide, polyimide, melamine resin, phenol resin, and epoxy resin. These materials may be used alone, or may be used in combination of two or more.

Of these solid particles, particles of metal hydroxide and particles of layered silicate are preferable in order to obtain better advantageous effects, and boehmite and magnesium hydroxide as metal hydroxide particles are more preferable.

(Concentration of Solid Particles)

In order to obtain better advantageous effects, the concentration of the solid particles (also referred to as a "solid particle concentration") is preferably equal to or higher than 1 volume % and equal to or lower than 50 volume %, preferably equal to or higher than 2 volume % and equal to or lower than 40 volume %, and much more preferably equal to or higher than 3 volume % and equal to or lower than 30 volume %. The solid particles exhibit the effect of crushing the cluster of ions and solvent and dissociating cations and anions, and for this reason, a greater concentration is effective. However, an extremely great concentration leads to resistance to ion permeation, and for this reason, the concentration within the above-described range is preferable.

(Measurement of Solid Particle Concentration)

The above-described sold particle concentration is a solid particle volume concentration (volume %) defined by the area percentage ("Total Particle Cross-Sectional Area"/"Area in Observation Field"×100) (%) of a total particle cross-sectional area in the case of an observation field of 2 μm×2 μm. For example, observation is made using a SEM, and the above-described area can be calculated by processing of the image acquired by photographing. The average of the particle concentrations obtained for several points (typically, four points) is taken as the solid particle concentration. Note that with concentration distribution of the solid particles of the electrolyte in the battery, the average of the particle concentrations obtained for several points in a recess impregnation region A is taken as the solid particle concentration.

(Arrangement of Solid Particles)

The solid particles contained in the electrolyte are arranged in at least any of the region between the positive electrode and the separator, the region between the negative electrode and the separator, the gap in the positive electrode active material layer, and the gap in the negative electrode active material layer. The electrolyte is contained in the region between the positive electrode and the separator, and the solid particles are contained in such an electrolyte. The electrolyte is contained in the region between the negative electrode and the separator, and the solid particles are contained in such an electrolyte. The electrolyte is contained in the gap among active material particles in the positive electrode active material layer, and the solid particles are contained in such an electrolyte. The electrolyte is contained in the gap among active material particles in the negative electrode active material layer, and the solid particles are contained in such an electrolyte.

(Preferable Arrangement of Solid Particles)

The solid particles contained in the electrolyte may be arranged to show the concentration distribution in the battery. In this case, it is preferable that the solid particles contained in the electrolyte are particularly arranged to concentrate on a recess in the region between the electrode and the separator, the recess being between adjacent active material particles positioned in an outermost surface portion of the electrode active material layer. In the case where the solid particles are arranged in the gap in the electrode active material layer, the amount of electrolyte itself needs to be decreased, or the amount of active material needs to be decreased. For this reason, high-concentration arrangement of the solid particles in the electrode active material layer is not always effective. Moreover, the solid particles are not necessarily arranged between the electrode and the separator. This is because there are disadvantages that no ion depletion occurs because of a sufficient amount of electrolyte and that the distance between the electrodes is increased. That is, it is most effective to arrange the solid particles in the recess (in the vicinity of the entrance of the gap in the electrode active material layer) positioned in the outermost surface portion of the electrode active material layer, the recess being the portion into which lithium ions need to most quickly flow.

Figure 3:
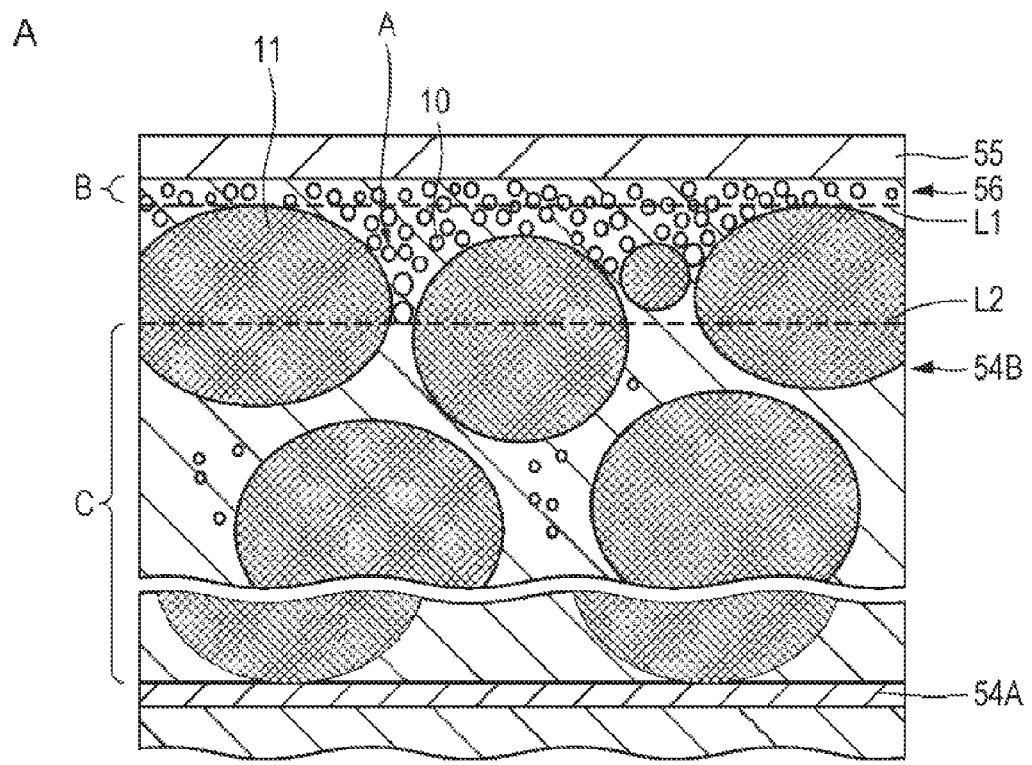
FIGS. 3A and 3B are schematic cross-sectional views of an internal configuration of the nonaqueous electrolyte battery.
Figure 3:
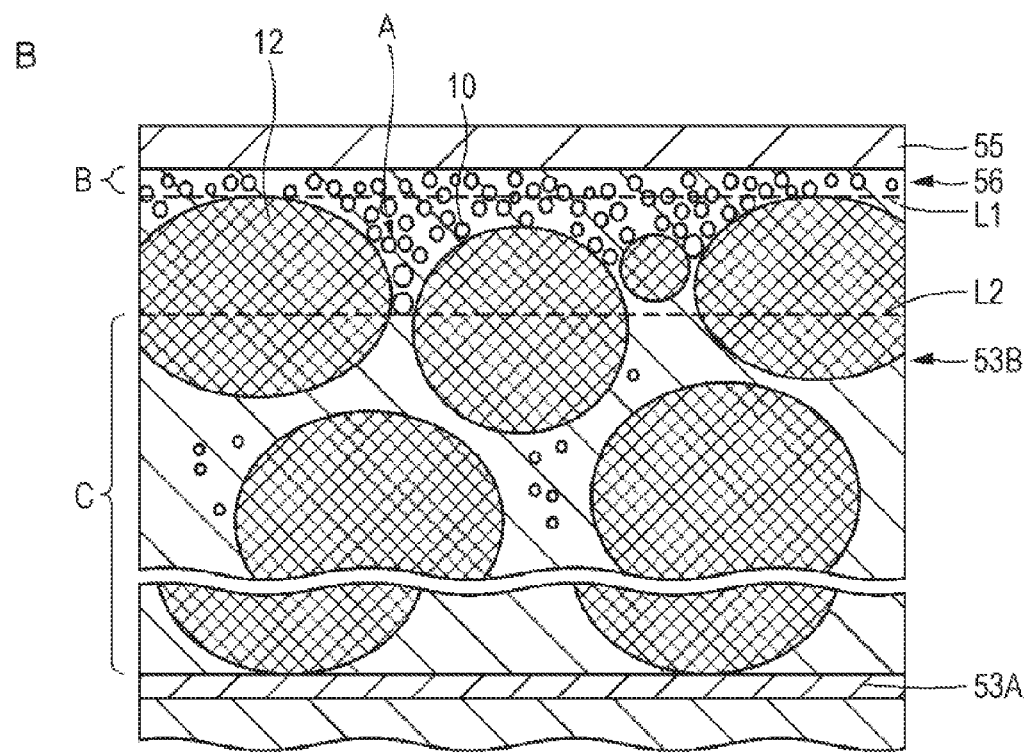

Preferable arrangement of the solid particles will be described with reference to FIGS. 3A and 3B. FIGS. 3A and 3B are enlarged partial schematic cross-sectional views of the inside of the nonaqueous electrolyte battery. Note that the binder, the conductive agent, etc. contained in the active material layer are not shown. In this example, the solid particles contained in the electrolyte are arranged such that the concentration of the solid particles arranged in a predetermined region (the region including the recess among particles) in the battery is at least higher than the concentration of the solid particles arranged in the gap in the electrode.

In this configuration example as illustrated in FIG. 3A, particles 10 as the above-described solid particles are arranged with a suitable concentration in suitable regions between the separator 55 and the negative electrode active material layer 54B and in the negative electrode active material layer 54B (the gap among active material particles). In the configuration with, e.g., three regions divided as a negative electrode side recess impregnation region A, a negative electrode side top coating region B, and a negative electrode side deep region C, the solid particles are arranged such that the particle concentration in the negative electrode side recess impregnation region A is higher than the particle concentration in the negative electrode side deep region C. Further, the solid particles may be arranged such that the particle concentration in the negative electrode side recess impregnation region A is higher than the particle concentration in the negative electrode side top coating region B.

Moreover, similarly, in this configuration example as illustrated in FIG. 3B, particles 10 as the above-described solid particles are arranged with a suitable concentration in suitable regions between the separator 55 and the positive electrode active material layer 53B and in the positive electrode active material layer 53B (the gap among active material particles). In the configuration with, e.g., three regions divided as a positive electrode side recess impregnation region A, a positive electrode side top coating region B, and a positive electrode side deep region C, the solid particles are arranged such that the particle concentration in the positive electrode side recess impregnation region A is higher than the particle concentration in the positive electrode side deep region C. Further, the solid particles may be arranged such that the particle concentration in the positive electrode side recess impregnation region A is higher than the particle concentration in the positive electrode side top coating region B.

(Recess Impregnation Region A, Top Coating Region B, and Deep Region C)

The negative and positive electrode side recess impregnation regions A, the negative and positive electrode side top coating regions B, and the negative and positive deep regions C are defined as follows, for example.

(Recess Impregnation Region A)

(Negative Electrode Side Recess Impregnation Region)

The negative electrode side recess impregnation region A is the region of the negative electrode active material layer 54B containing negative electrode active material particles 11 as the negative electrode active material, the region including the recess among adjacent negative electrode active material particles 11 positioned in the outermost surface portion of the negative electrode active material layer 54B. The recess impregnation region A is impregnated with the electrolyte containing the particles 10. Thus, the negative electrode side recess impregnation region A is filled with the electrolyte. Moreover, the negative electrode side recess impregnation region A contains the particles 10 as the solid particles contained in the electrolyte. Note that the electrolyte may be electrolyte gel or a liquid electrolyte formed of a nonaqueous electrolyte solution.

The region excluding the cross sections of the negative electrode active material particles 11 from the region between two parallel lines L1, L2 illustrated in FIG. 3A is taken as the negative electrode side recess impregnation region A including the recess containing the electrolyte and the particles 10. The two parallel lines L1, L2 are drawn as follows. The cross sections of the separator 55 and the negative electrode active material layer 54B and the cross section of the region between the separator 55 and the negative electrode active material layer 54B are observed within a predetermined visual field range (typically, a visual field range of 50 μm) as illustrated in FIG. 3A. In such a visual field, the two parallel lines L1, L2 perpendicular to the thickness direction of the separator 55 are drawn. The parallel line L1 is the line passing through the position of the cross-sectional image of the negative electrode active material particle 11, the position being closest to the separator 55. The parallel line L2 is the line passing through the deepest portion of the cross-sectional image of the particle 10 contained in the recess among adjacent negative electrode active material particles 11. The deepest portion means the position farthest from the separator 55 in the thickness direction thereof. Note that the cross section can be observed using the scanning electron microscope (SEM).

(Positive Electrode Side Recess Impregnation Region)

The positive electrode side recess impregnation region A is the region of the positive electrode active material layer 53B containing positive electrode active material particles 12 as the positive electrode active material, the region including the recess among adjacent positive electrode active material particles 12 positioned in the outermost surface portion of the positive electrode active material layer 53B. The recess impregnation region A is impregnated with the electrolyte containing the particles 10 as the solid particles. Thus, the positive electrode side recess impregnation region A is filled with the electrolyte. Moreover, the positive electrode side recess impregnation region A contains the particles 10 as the solid particles contained in the electrolyte. Note that the electrolyte may be electrolyte gel or a liquid electrolyte formed of a nonaqueous electrolyte solution.

The region excluding the cross sections of the positive electrode active material particles 12 from the region between two parallel lines L1, L2 illustrated in FIG. 3B is taken as the positive electrode side recess impregnation region A including the recess containing the electrolyte and the particles 10. The two parallel lines L1, L2 are drawn as follows. The cross sections of the separator 55 and the positive electrode active material layer 53B and the cross section of the region between the separator 55 and the positive electrode active material layer 53B are observed within a predetermined visual field range (typically, a visual field range of 50 μm) as illustrated in FIG. 3B. In such a visual field, the two parallel lines L1, L2 perpendicular to the thickness direction of the separator 55 are drawn. The parallel line L1 is the line passing through the position of the cross-sectional image of the positive electrode active material particle 12, the position being closest to the separator 55. The parallel line L2 is the line passing through the deepest portion of the cross-sectional image of the particle 10 contained in the recess among adjacent positive electrode active material particles 12. Note that the deepest portion means the position farthest from the separator 55 in the thickness direction thereof.

(Top Coating Region B)
(Negative Electrode Side Top Coating Region)

The negative electrode side top coating region B is the region between the negative electrode side recess impregnation region A and the separator 55. The top coating region B is filled with the electrolyte. The top coating region B contains the particles 10 as the solid particles contained in the electrolyte. Note that the top coating region B does not necessarily contain the particles 10. The region between the above-described parallel line L1 included in the predetermined observation field similar to that illustrated in FIG. 3A and the separator 55 is taken as the negative electrode side top coating region B.

(Positive Electrode Side Top Coating Region)

The positive electrode side top coating region B is the region between the positive electrode side recess impregnation region A and the separator 55. The top coating region B is filled with the electrolyte. The top coating region B contains the particles 10 as the solid particles contained in the electrolyte. Note that the top coating region B does not necessarily contain the particles 10. The region between the above-described parallel line L1 included in the predetermined observation field similar to that illustrated in FIG. 3B and the separator 55 is taken as the positive electrode side top coating region B.

(Deep Region C)
(Negative Electrode Side Deep Region)

The negative electrode side deep region C is the region deeper than the negative electrode side recess impregnation region A in the negative electrode active material layer 54B. The gap among the negative electrode active material particles 11 in the deep region C is filled with the electrolyte. The deep region C contains the particles 10 contained in such an electrolyte. Note that the deep region C does not necessarily contain the particles 10.

The region of the negative electrode active material layer 54B other than the recess impregnation region A and the top coating region B included in the predetermined observation field similar to that illustrated in FIG. 3A is taken as the negative electrode side deep region C. For example, the region between the above-described parallel line L2 included in the predetermined observation field similar to that illustrated in FIG. 3A and the negative electrode current collector 54A is taken as the negative electrode side deep region C.

(Positive Electrode Side Deep Region)

The positive electrode side deep region C is the region deeper than the positive electrode side recess impregnation region A in the positive electrode active material layer 53B. The gap among the positive electrode active material particles 12 in the positive electrode side deep region C is filled with the electrolyte. The deep region C contains the particles 10 contained in such an electrolyte. Note that the deep region C does not necessarily contain the particles 10.

The region of the positive electrode active material layer 53B other than the recess impregnation region A and the top coating region B included in the predetermined observation field similar to that illustrated in FIG. 3B is taken as the positive electrode side deep region C. For example, the region between the above-described parallel line L2 included in the predetermined observation field similar to that illustrated in FIG. 3B and the positive electrode current collector 53A is taken as the positive electrode side deep region C.

(Particle Size of Solid Particle)

A particle size D50 as the size of the solid particle is preferably equal to or smaller than the particle size D50 of the active material particle. In addition, the particle size D50 as the size of the solid particle is more preferably equal to or greater than 0.1 μm. A particle size D95 as the size of the solid particle is preferably equal to or greater than a "$2/\sqrt{3}-1$" fold of an active material particle size D50. The clearance among adjacent active material particles in a recess bottom portion is closed with the particles with a greater particle size, and as a result, an adverse effect on battery properties due to entry of excessive solid particles into the deep region C can be reduced. In order to hold the solid particles in the recess to prevent too many solid particles from entering the gap in the electrode, the solid particles larger than an electrode pore diameter are preferably arranged. Since the active material in an electrode surface layer is in a close-packed state due to pressing, the diameter of particle which can pass through the gap pore might be often up to a $(2/\sqrt{3}-1)$ fold of the particle size of the active material. The solid particle larger than such a diameter does not enter further inside. Note that it is often the case that a specific surface area is small in the case of the above-described size. Tendency shows that a greater particle size results in a smaller specific surface area. However, the size of all particles is not necessarily a $(2/\sqrt{3}-1)$ fold of the active material particle size. As long as some particles with a size of equal to or greater than D95 are present, such particles effectively serve as a lid, and therefore, many particles are effectively arranged in high concentration in the surface recess without entering the pore. Since the size of the recess is much greater than that of the pore, electrolyte ion supply is not interfered even if the recess is occupied with the solid particles.

(Measurement of Particle Size)

The solid particle size D50 indicates, for example, the particle size corresponding to 50% in the volume-based cumulative particle size distribution measured from a smaller particle size side, the particle size distribution being obtained in such a manner that the solid particles are measured by laser diffraction after other components than the solid particles have been removed from the electrolyte containing the solid particles. Moreover, the value of the particle size D95 corresponding to 95% can be obtained from the volume-based cumulative particle size distribution obtained as described above. The active material particle size D50 indicates the particle size corresponding to 50% in the volume-based cumulative particle size distribution measured from a smaller particle size side, the particle size distribution being obtained in such a manner that the active material particles are measured by laser diffraction after other components than the active material particles have been removed from the active material layer containing the active material particles.

(Specific Surface Area of Solid Particles)

The specific surface area ($m^2/g$) is the BET specific surface area ($m^2/g$) measured by BET as a specific area measurement method. The BET specific surface area of the solid particles is preferably equal to or greater than 1 $m^2/g$ and equal to or smaller than 60 $m^2/g$. The BET specific surface area within the above-described value range is preferable because such a BET specific surface area can provide better advantageous effects. On the other hand, tendency shows that an extremely great BET specific surface area increases the electrolyte adsorbing to the solid particles, and for this reason, reduces contribution to charge reaction. Note that the BET specific surface area can be, similarly to the above, obtained in such a manner that the solid particles are measured after other components than the solid particles have been removed from the electrolyte containing the solid particles, for example.

Note that the electrolyte layer 56 containing the solid particles may be formed only on each principal surface of the negative electrode 54, and the electrolyte layer 56 containing no solid particles may be applied and formed on each principal surface of the positive electrode 53. There may be a concentration difference only among the negative electrode side recess impregnation region A, the negative electrode side top coating region B, and the negative electrode side deep region C. Moreover, the solid particles may be arranged such that at least the particle concentration in the negative electrode side recess impregnation region A is higher than the particle concentration in the negative electrode side deep region C, and these regions with the concentration difference are not necessarily formed on the positive electrode side.

Similarly, the electrolyte layer 56 containing the solid particles may be formed only on each principal surface of the positive electrode, and the electrolyte layer 56 containing no solid particles may be applied and formed on each principal surface of the negative electrode 54. There may be a concentration difference only among the positive electrode side recess impregnation region A, the positive electrode side top coating region B, and the positive electrode side deep region C. Moreover, the solid particles may be arranged such that at least the particle concentration in the positive electrode side recess impregnation region A is higher than the particle concentration in the positive electrode side deep region C, and these regions with the concentration difference are not necessarily formed on the negative electrode side.

(1-2) Method for Manufacturing Example of Nonaqueous Electrolyte Battery

An example of the nonaqueous electrolyte battery can be manufactured as follows, for example.

(Method for Manufacturing Positive Electrode)

A positive electrode active material, a conductive agent, and a binder are mixed together to prepare a positive electrode mixture. The positive electrode mixture is dispersed in a solvent of, e.g., N-methyl-2-pyrrolidone, and as a result, a positive electrode mixture slurry in a paste form is produced. Next, the positive electrode mixture slurry is applied to a positive electrode current collector 53A, and then, the solvent is dried. The resultant is compressed and molded by, e.g., a roll press machine to form a positive electrode active material layer 53B. In this manner, a positive electrode 53 is produced.

(Method for Manufacturing Negative Electrode)

A negative electrode active material and a binder are mixed together to prepare a negative electrode mixture. The negative electrode mixture is dispersed in a solvent of, e.g., N-methyl-2-pyrrolidone, and as a result, a negative electrode mixture slurry in a paste form is produced. Next, the negative electrode mixture slurry is applied to a negative electrode current collector 54A, and then, the solvent is dried. The resultant is compressed and molded by, e.g., the roll press machine to form a negative electrode active material layer 54B. In this manner, a negative electrode 54 is produced.

(Preparation of Nonaqueous Electrolyte Solution)

A nonaqueous electrolyte solution is prepared in such a manner that electrolyte salt is dissolved in a nonaqueous solvent.

(Solution Application)

The coating solution containing the nonaqueous electrolyte solution, a matrix polymer compound, solid particles, and a diluent solvent (e.g., dimethyl carbonate) is applied to both principal surfaces of each of the positive and negative electrodes 53, 54, and then, the diluent solvent is volatilized to form an electrolyte layer 56.

Note that the following methods may be employed. The coating solution (the coating solution containing no particles) containing the nonaqueous electrolyte solution, a matrix polymer compound, and a diluent solvent (e.g., dimethyl carbonate) may be applied to each principle surface of the positive electrode 53, and in this manner, the electrolyte layer 56 containing no solid particles may be formed. Alternatively, the electrolyte layer 56 similarly containing solid particles may be formed only on each principal surface of the negative electrode 54 without forming an electrolyte layer 56 on one or both of the principle surfaces of the positive electrode 53. As another alternative, the coating solution (the coating solution containing no particles) containing the nonaqueous electrolyte solution, a matrix polymer compound, and a diluent solvent (e.g., dimethyl carbonate) may be applied to each principal surface of the negative electrode 54, and in this manner, the electrolyte layer 56 containing no solid particles may be formed. As still another alternative, the electrolyte layer 56 similarly containing solid particles may be formed only on each principal surface of the positive electrode 53 without forming an electrolyte layer 56 on one or both of the principle surfaces of the negative electrode 54.

(Assembly of Nonaqueous Electrolyte Battery)

Next, a positive electrode lead 51 is attached to an end portion of the positive electrode current collector 53A by welding, and a negative electrode lead 52 is attached to an end portion of the negative electrode current collector 54A by welding.

Next, the positive electrode 53 formed with the electrolyte layer 56 and the negative electrode 54 formed with the electrolyte layer 56 are stacked on each other with a separator 55 being interposed therebetween, thereby forming a stack. Such a stack is wound in the longitudinal direction thereof, and a protective tape 57 is bonded to an outermost portion of the winding stack. As a result, a winding electrode body 50 is formed.

Eventually, the winding electrode body 50 is sandwiched in an exterior member 60, and outer edge portions of the exterior member 60 closely contact each other to seal the winding electrode body 50 by thermal fusing, for example. At this point, an adhesive film 61 is inserted between each of the positive and negative electrode leads 51, 52 and the exterior member 60. In this manner, a nonaqueous electrolyte battery as illustrated in FIGS. 1 and 2 is completed.

(Case of Adjusting Solid Particle Arrangement)

In order to adjust solid particle arrangement to suitable arrangement, the nonaqueous electrolyte battery may be produced as follows.

(Production of Positive and Negative Electrodes, Preparation of Nonaqueous Electrolyte Solution)

As in the above, positive and negative electrodes are produced, and a nonaqueous electrolyte solution is prepared.

(Solution Application)

After the coating solution containing the nonaqueous electrolyte solution, a matrix polymer compound, solid particles, and a diluent solvent (e.g., dimethyl carbonate) has been, in a heated state, applied to both principal surfaces of each of the positive and negative electrodes 53, 54, the diluent solvent is volatilized to form an electrolyte layer 56.

Since the coating solution is applied in the heated state, the recess among adjacent negative electrode active material particles positioned in an outermost surface portion of a negative electrode active material layer 54B and a deep region C in the negative electrode active material layer 54B can be impregnated with the electrolyte containing the solid particles. At this point, the solid particles are filtered by the recess among adjacent particles, and therefore, a particle concentration in a negative electrode side recess impregnation region A increases. This provides a difference in the particle concentration between the recess impregnation region A and the deep region C. Similarly, since the coating solution is applied in the heated state, the recess among adjacent positive electrode active material particles positioned in an outermost surface portion of a positive electrode active material layer 53B and a deep region C in the positive electrode active material layer 53B can be impregnated with the electrolyte containing the solid particles. At this point, the solid particles are filtered by the recess among adjacent particles, and therefore, a particle concentration in a positive electrode side recess impregnation region A increases. This provides a difference in the particle concentration between the recess impregnation region A and the deep region C. For example, the solid particles for which a solid particle size D95 is adjusted to equal to or greater than a predetermined magnification of an active material particle size D50 are preferably used as the solid particles. For example, the solid particles adjusted as follows are preferably used: particles with a particle size of equal to or greater than a $2/\sqrt{3}-1$ fold of the active material particle size D50 are added as some solid particles such that the solid particle size D95 is adjusted to equal to or greater than a $2/\sqrt{3}-1$ fold of the active material particle size D50. Thus, the clearance among particles in a recess bottom portion is filled with some solid particles with a larger particle size, and therefore, the solid particles can be easily filtered.

Note that after the coating solution has been applied, an extra portion of the coating solution is scraped, and therefore, unnecessary expansion of the distance between the electrodes can be reduced. Moreover, since the coating solution surface is scraped, more solid particles can be arranged in the recess among adjacent active material particles, and the ratio of the solid particles in the top coating region B can be decreased.

Note that the following methods may be employed. The coating solution (the coating solution containing no particles) containing the nonaqueous electrolyte solution, a matrix polymer compound, and a diluent solvent (e.g., dimethyl carbonate) may be applied to each principle surface of the positive electrode 53, and in this manner, the electrolyte layer 56 containing no solid particles may be formed. Alternatively, the electrolyte layer 56 similarly containing solid particles may be formed only on each principal surface of the negative electrode 54 without forming an electrolyte layer 56 on one or both of the principle surfaces of the positive electrode 53. As another alternative, the coating solution (the coating solution containing no particles) containing the nonaqueous electrolyte solution, a matrix polymer compound, and a diluent solvent (e.g., dimethyl carbonate) may be applied to each principal surface of the negative electrode 54, and in this manner, the electrolyte layer 56 containing no solid particles may be formed. As still another alternative, the electrolyte layer 56 similarly containing solid particles may be formed only on each principal surface of the positive electrode 53 without forming an electrolyte layer 56 on one or both of the principle surfaces of the negative electrode 54.

(Assembly of Nonaqueous Electrolyte Battery)

Subsequently, a nonaqueous electrolyte battery as illustrated in FIGS. 1 and 2 is completed through the steps similar to those described above.

[Variation 1-1]

The nonaqueous electrolyte battery of the first embodiment may be produced as follows. This production method is similar to the method for manufacturing the example of the nonaqueous electrolyte battery as described above, except that at the solution application step in the method for manufacturing the example of the nonaqueous electrolyte battery, the coating solution is applied to at least one of the principal surfaces of the separator 55 instead of applying the coating solution to both surfaces of at least one of the positive and negative electrodes 53, 54.

[Method for Manufacturing Nonaqueous Electrolyte Battery According to Variation 1-1]

(Production of Positive and Negative Electrodes and Separator, Preparation of Nonaqueous Electrolyte Solution)

As in the method for manufacturing the example of the nonaqueous electrolyte battery, positive and negative electrodes 53, 54 and a separator 55 are produced, and a nonaqueous electrolyte solution is prepared.

(Solution Application)

After the coating solution containing the nonaqueous electrolyte solution, a matrix polymer compound, solid particles, and a diluent solvent (e.g., dimethyl carbonate) has been applied to at least one of the principal surfaces of the separator 55, the diluent solvent is volatilized to form an electrolyte layer 56.

(Assembly of Nonaqueous Electrolyte Battery)

Next, a positive electrode lead 51 is attached to an end portion of a positive electrode current collector 53A by welding, and a negative electrode lead 52 is attached to an end portion of a negative electrode current collector 54A by welding.

Next, the positive electrode 53 and the negative electrode 54 are stacked on each other in the state in which the separator 55 formed with the electrolyte layer 56 is interposed therebetween, thereby forming a stack. Such a stack is wound in the longitudinal direction thereof, and a protective tape 57 is bonded to an outermost portion of the winding stack. As a result, a winding electrode body 50 is formed.

Eventually, an exterior member 60 formed of a laminated film is deep-drawn such that a recessed portion is formed, and the winding electrode body 50 is inserted into the recessed portion. An unprocessed portion of the exterior member 60 is bent back to above the recessed portion, and then, is thermally fused at the outer periphery of the recessed portion. At this point, an adhesive film 61 is inserted between each of the positive and negative leads 51, 52 and the exterior member 60. As described above, an intended nonaqueous electrolyte battery is obtained.

(Case of Adjusting Solid Particle Arrangement)

In order to adjust solid particle arrangement to suitable arrangement, the nonaqueous electrolyte battery may be produced as follows.

As in the above-described method, a winding electrode body 50 is produced.

(Heating and Pressurizing Steps)

Next, the winding electrode body 50 is sealed in a packaging material such as a latex tube, and heating pressing is performed under hydrostatic pressure. This moves solid particles to the recess among adjacent negative electrode active material particles positioned in an outermost surface portion of a negative electrode active material layer 54B, and therefore, a solid particle concentration in a negative electrode side recess impregnation region A increases. Moreover, solid particles move to the recess among adjacent positive electrode active material particles positioned in an outermost surface portion of a positive electrode active material layer 53B, and therefore, a solid particle concentration in a positive electrode side recess impregnation region A increases.

Subsequently, an intended nonaqueous electrolyte battery can be obtained through the steps similar to those described above.

[Variation 1-2]

The configuration example using the electrolyte gel has been described as an example of the nonaqueous electrolyte battery of the first embodiment as described above. However, instead of the electrolyte gel, an electrolyte solution as a liquid electrolyte may be used. In this case, the exterior member 60 is filled with the nonaqueous electrolyte solution, and the winding body obtained in such a manner that the electrolyte layer 56 is omitted from the winding electrode body 50 is impregnated with the nonaqueous electrolyte solution. In this case, the nonaqueous electrolyte battery is produced as follows, for example.

[Method for Manufacturing Nonaqueous Electrolyte Battery According to Variation 1-2]

(Preparation of Positive and Negative Electrodes and Nonaqueous Electrolyte Solution)

As in the method for manufacturing the example of the nonaqueous electrolyte battery, positive and negative electrodes 53, 54 are produced, and a nonaqueous electrolyte solution is prepared.

(Application and Formation of Solid Particle Layer)

Next, after paint has been, by, e.g., a coating method, applied to at least one of the principal surfaces of the negative electrode 54, a solvent is removed by drying, and as a result, a solid particle layer is formed. For example, a mixture of solid particles, a binder polymer compound (resin), and a solvent may be used as the paint. Similarly, after the paint similar to that described above has been, by, e.g., the coating method, applied to both principal surfaces of the positive electrode 53, the solvent is removed by drying, and as a result, solid particle layers are formed.

Note that electrolyte solution absorbability of the resin and solubility and swelling properties of the resin in the electrolyte solution can be changed by adjustment of, e.g., a resin type, a polymerization degree, and a molecular weight. In the present specification, the resin bringing about the following state in the solid particle layer containing the electrolyte solution is referred to as a "binder polymer compound." The solid particle layer contains the electrolyte solution in the state in which the electrolyte solution is present in the micropores (the gap) formed by at least any of the binder polymer compound and the particles. In this case, the solid particle layer functions as a separator. That is, the solid particle layer and the separator are together interposed between the positive and negative electrodes to prevent contact between both electrode active materials, for example. As in the separator, the solid particle layer holds the electrolyte solution in the micropores to form an ion conduction path between the electrodes. The type similar to the above-described matrix polymer compound can be used as the resin type of the binder polymer compound.

(Assembly of Nonaqueous Electrolyte Battery)

Next, a positive electrode lead 51 is attached to an end portion of a positive electrode current collector 53A by welding, and a negative electrode lead 52 is attached to an end portion of a negative electrode current collector 54A by welding.

Next, the positive electrode 53 and the negative electrode 54 are stacked on each other with a separator 55 being interposed therebetween, and then, are wound. A protective tape 57 is bonded to an outermost portion of the winding stack. As a result, a winding body is formed as a precursor of a winding electrode body 50. Next, the winding body is sandwiched in an exterior member 60, and other outer peripheral edge portion of the exterior member 60 than one side thereof is thermally fused in a bag shape. Thus, the winding body is housed in the exterior member 60.

Next, the nonaqueous electrolyte solution is injected into the exterior member 60, and the winding body is impregnated with the nonaqueous electrolyte solution. Then, the opening of the exterior member 60 is thermally fused and sealed under vacuum atmosphere. In the above-described manner, an intended nonaqueous electrolyte secondary battery is obtained.

(Case of Adjusting Solid Particle Arrangement)

In order to adjust solid particle arrangement to suitable arrangement, the nonaqueous electrolyte battery may be produced as follows.

As in the above, a positive electrode 53 and a negative electrode 54 are produced, and a nonaqueous electrolyte solution is prepared.

(Application and Formation of Solid Particle Layer)

Next, after paint has been, by, e.g., a coating method, applied to at least one of the principal surfaces of the negative electrode 54, a solvent is removed by drying, and as a result, a solid particle layer is formed. For example, a mixture of solid particles, a binder polymer compound, and a solvent may be used as the paint. In an outermost surface portion of a negative electrode active material layer 54B on which the solid particle layer is applied and formed, the solid particles are filtered by the recess among adjacent negative electrode active material particles positioned in the outermost surface portion of the negative electrode active material layer 54B, and therefore, a particle concentration in a negative electrode side recess impregnation region A increases. Similarly, after the paint similar to that described above has been, by, e.g., the coating method, applied to both principal surfaces of the positive electrode 53, the solvent is removed by drying, and as a result, solid particle layers are formed. In an outermost surface portion of a positive electrode active material layer 53B on which the solid particle layer is applied and formed, the solid particles are filtered by the recess among adjacent positive electrode active material particles positioned in the outermost surface portion of the positive electrode active material layer 53B, and therefore, a particle concentration in a positive electrode side recess impregnation region A increases. For example, the solid particles for which a particle size D95 is adjusted to equal to or greater than a predetermined magnification of a particle size D50 are preferably used as the solid particles. For example, the solid particles adjusted as follows are preferably used: particles with a particle size of equal to or greater than a $2/\sqrt{3}-1$ fold of the particle size D50 are added as some solid particles such that the solid particle size D95 is adjusted to equal to or greater than a $2\sqrt{3}-1$ fold of the active material particle size D50. Thus, the clearance among particles in a recess bottom portion is filled with some particles with a larger particle size, and therefore, the solid particles can be easily filtered.

Note that after each solid particle layer has been applied and formed, an extra portion of the paint is scraped, and therefore, unnecessary expansion of the distance between the electrodes can be reduced. Moreover, since the applied paint surface is scraped, more solid particles can be arranged in the recess among adjacent active material particles, and the ratio of the solid particles in a top coating region B can be decreased. Thus, a majority of the solid particles can be intensively arranged in the recess impregnation region.

(Assembly of Nonaqueous Electrolyte Battery)

Subsequently, an intended nonaqueous electrolyte battery is obtained through the steps similar to those described above.

[Variation 1-3]

The nonaqueous electrolyte battery of the first embodiment may be produced as follows.

[Method for Manufacturing Nonaqueous Electrolyte Battery According to Variation 1-3]

(Production of Positive and Negative Electrodes)

As in the method for manufacturing the example of the nonaqueous electrolyte battery, a positive electrode 53 and a negative electrode 54 are produced.

(Application and Formation of Solid Particle Layer)

Next, after paint has been, by, e.g., a coating method, applied to at least one of the principal surfaces of the negative electrode 54, a solvent is removed by drying, and as a result, a solid particle layer is formed. For example, a mixture of solid particles, a binder polymer compound, and a solvent may be used as the paint. Similarly, a solid particle layer is formed on at least one of the principal surfaces of the positive electrode 53.

(Preparation of Electrolyte Composition)

Next, the electrolyte composition containing a nonaqueous electrolyte solution, a monomer as a polymer compound raw material, a polymerization initiator, and if necessary, other materials such as a polymerization inhibitor is prepared.

(Assembly of Nonaqueous Electrolyte Battery)

Next, a positive electrode lead 51 is attached to an end portion of a positive electrode current collector 53A by welding, and a negative electrode lead 52 is attached to an end portion of a negative electrode current collector 54A by welding.

Next, the positive electrode 53 and the negative electrode 54 are stacked on each other with a separator 55 being interposed therebetween, and then, are wound. A protective tape 57 is bonded to an outermost portion of the winding stack. As a result, a winding body is formed as a precursor of a winding electrode body 50. Next, the winding body is sandwiched in an exterior member 60, and other outer peripheral edge portion of the exterior member 60 than one side thereof is thermally fused in a bag shape. Thus, the winding body is housed in the exterior member 60.

Next, the electrolyte composition is injected into the bag-shaped exterior member 60, and the exterior member 60 is sealed by, e.g., thermal fusing. Then, the monomer is polymerized by, e.g., thermal polymerization. As a result, a polymer compound is formed, and therefore, an electrolyte layer 56 is formed. In the above-described manner, an intended nonaqueous electrolyte battery is obtained.

(Case of Adjusting Solid Particle Arrangement)

In order to adjust solid particle arrangement to suitable arrangement, the nonaqueous electrolyte battery may be produced as follows.

As in the above, a positive electrode 53 and a negative electrode 54 are produced.

(Application and Formation of Solid Particle Layer)

Next, after paint has been, by, e.g., a coating method, applied to at least one of the principal surfaces of the negative electrode 54, a solvent is removed by drying, and as a result, a solid particle layer is formed. For example, a mixture of solid particles, a binder polymer compound, and a solvent may be used as the paint. In an outermost surface portion of a negative electrode active material layer 54B on which the solid particle layer is applied and formed, the solid particles are filtered by the recess among adjacent negative electrode active material particles positioned in the outermost surface portion of the negative electrode active material layer 54B, and therefore, a particle concentration in a negative electrode side recess impregnation region A increases. Similarly, after the paint similar to that described above has been, by, e.g., the coating method, applied to both principal surfaces of the positive electrode 53, the solvent is removed by drying, and as a result, solid particle layers are formed. In an outermost surface portion of a positive electrode active material layer 53B on which the solid particle layer is applied and formed, the solid particles are filtered by the recess among adjacent positive electrode active material particles positioned in the outermost surface portion of the positive electrode active material layer 53B, and therefore, a particle concentration in a positive electrode side recess impregnation region A increases. For example, the solid particles for which a particle size D95 is adjusted to equal to or greater than a predetermined magnification of a particle size D50 are preferably used as the solid particles. For example, the solid particles adjusted as follows are preferably used: particles with a particle size of equal to or greater than a $2/\sqrt{3}-1$ fold of the particle size D50 are added as some solid particles such that the solid particle size D95 is adjusted to equal to or greater than a $2\sqrt{3}-1$ fold of the active material particle size D50. Thus, the clearance among particles in a recess bottom portion is filled with some particles with a larger particle size, and therefore, the solid particles can be easily filtered.

Note that after each solid particle layer has been applied and formed, an extra portion of the paint is scraped, and therefore, unnecessary expansion of the distance between the electrodes can be reduced. Moreover, since the applied paint surface is scraped, more solid particles can be arranged in the recess among adjacent active material particles, and the ratio of the solid particles in a top coating region B can be decreased. Thus, a majority of the solid particles can be intensively arranged in the recess impregnation region.

Subsequently, an intended nonaqueous electrolyte battery is obtained through the steps similar to those described above.

[Variation 1-4]

The nonaqueous electrolyte battery of the first embodiment may be produced as follows.

[Method for Manufacturing Nonaqueous Electrolyte Battery According to Variation 1-4]

(Production of Positive and Negative Electrodes, Preparation of Nonaqueous Electrolyte Solution)

First, as in the example of the method for manufacturing the nonaqueous electrolyte battery, a positive electrode 53 and a negative electrode 54 are produced, and a nonaqueous electrolyte solution is prepared.

(Formation of Solid Particle Layer)

Next, after paint has been, by, e.g., a coating method, applied to at least one of the principal surfaces of the negative electrode 54, a solvent is removed by drying, and as a result, a solid particle layer is formed. For example, a mixture of solid particles, a binder polymer compound, and a solvent may be used as the paint. Similarly, a solid particle layer is formed on at least one of the principal surfaces of the positive electrode 53.

(Formation of Matrix Resin Layer)

Next, the coating solution containing the nonaqueous electrolyte solution, a matrix polymer compound, and a dispersive solvent of, e.g., N-methyl-2-pyrrolidone has been applied to at least one of the principal surfaces of the separator 55, a matrix resin layer is formed by, e.g., drying.

(Assembly of Nonaqueous Electrolyte Battery)

Next, the positive electrode 53 and the negative electrode 54 are stacked on each other with a separator 55 being interposed therebetween, thereby forming a stack. Such a stack is wound in the longitudinal direction thereof, and a protective tape 57 is bonded to an outermost portion of the winding stack. As a result, a winding electrode body 50 is formed.

Next, an exterior member 60 formed of a laminated film is deep-drawn such that a recessed portion is formed, and the winding electrode body 50 is inserted into the recessed portion. An unprocessed portion of the exterior member 60 is bent back to above the recessed portion, and then, is thermally fused at other outer peripheral portion of the recessed portion than part thereof (e.g., one side). At this point, an adhesive film 61 is inserted between each of positive and negative leads 51, 52 and the exterior member 60.

Subsequently, the nonaqueous electrolyte solution is injected into the exterior member 60 through an unfused portion thereof, and then, such an unfused portion of the exterior member 60 is sealed by, e.g., thermal fusing. At this point, the matrix resin layer is impregnated with the nonaqueous electrolyte solution by vacuum sealing, and the matrix polymer compound is swollen. In this manner, an electrolyte layer 56 is formed. As a result, an intended nonaqueous electrolyte battery is obtained.

(Case of Adjusting Solid Particle Concentration)

In order to adjust solid particle arrangement to suitable arrangement, the nonaqueous electrolyte battery may be produced as follows.

(Production of Positive and Negative Electrodes, Preparation of Nonaqueous Electrolyte Solution)

As in the above, a positive electrode 53 and a negative electrode 54 are produced, and a nonaqueous electrolyte solution is prepared.

(Formation of Solid Particle Layer)

Next, after paint has been, by, e.g., a coating method, applied to at least one of the principal surfaces of the negative electrode 54, a solvent is removed by drying, and as a result, a solid particle layer is formed. For example, a mixture of solid particles, a binder polymer compound, and a solvent may be used as the paint. In an outermost surface portion of a negative electrode active material layer 54B on which the solid particle layer is applied and formed, the solid particles are filtered by the recess among adjacent negative electrode active material particles positioned in the outermost surface portion of the negative electrode active material layer 54B, and therefore, a particle concentration in a negative electrode side recess impregnation region A increases. Similarly, after the paint similar to that described above has been, by, e.g., the coating method, applied to both principal surfaces of the positive electrode 53, the solvent is removed by drying, and as a result, solid particle layers are formed. In an outermost surface portion of a positive electrode active material layer 53B on which the solid particle layer is applied and formed, the solid particles are filtered by the recess among adjacent positive electrode active material particles positioned in the outermost surface portion of the positive electrode active material layer 53B, and therefore, a particle concentration in a positive electrode side recess impregnation region A increases. For example, the solid particles for which a particle size D95 is adjusted to equal to or greater than a predetermined magnification of a particle size D50 are preferably used as the solid particles. For example, the solid particles adjusted as follows are preferably used: particles with a particle size of equal to or greater than a $2/\sqrt{3}-1$ fold of the particle size D50 are added as some solid particles such that the solid particle size D95 is adjusted to equal to or greater than a $2/\sqrt{3}-1$ fold of the active material particle size D50. Thus, the clearance among particles in a recess bottom portion is filled with some particles with a larger particle size, and therefore, the solid particles can be easily filtered.

Note that after each solid particle layer has been applied and formed, an extra portion of the paint is scraped, and therefore, unnecessary expansion of the distance between the electrodes can be reduced. Moreover, since the applied paint surface is scraped, more solid particles can be arranged in the recess among adjacent active material particles, and the ratio of the solid particles in a top coating region B can be decreased. Thus, a majority of the solid particles can be intensively arranged in the recess impregnation region.

Subsequently, an intended nonaqueous electrolyte battery is obtained through the steps similar to those described above.

[Variation 1-5]

The configuration example using the electrolyte gel has been described above in the first embodiment. However, instead of the electrolyte gel, an electrolyte solution as a liquid electrolyte may be used. In this case, the exterior member 60 is filled with the nonaqueous electrolyte solution, and the winding body obtained in such a manner that the electrolyte layer 56 is omitted from the winding electrode body 50 is impregnated with the nonaqueous electrolyte solution. In this case, the nonaqueous electrolyte battery is produced as follows, for example.

[Method for Manufacturing Nonaqueous Electrolyte Battery According to Variation 1-5]

(Production of Positive and Negative Electrodes, Preparation of Nonaqueous Electrolyte Solution)

First, as in the example of the method for manufacturing the nonaqueous electrolyte battery, a positive electrode 53 and a negative electrode 54 are produced, and a nonaqueous electrolyte solution is prepared.

(Formation of Solid Particle Layer)

Next, after paint has been, by, e.g., a coating method, applied to at least one of the principal surfaces of a separator 55, a solvent is removed by drying, and as a result, a solid particle layer is formed. For example, a mixture of solid particles, a binder polymer compound (resin), and a solvent may be used as the paint.

(Assembly of Nonaqueous Electrolyte Battery)

Next, the positive electrode 53 and the negative electrode 54 are stacked on each other with the separator 55 being interposed therebetween, and then, are wound. A protective tape 57 is bonded to an outermost portion of the winding stack. As a result, a winding body is formed as a precursor of a winding electrode body 50.

Next, the winding body is sandwiched in an exterior member 60, and other outer peripheral edge portion of the exterior member 60 than one side thereof is thermally fused in a bag shape. Thus, the winding body is housed in the exterior member 60. Next, the nonaqueous electrolyte solution is prepared, and is injected into the exterior member 60. After the winding body has been impregnated with the nonaqueous electrolyte solution, the opening of the exterior member 60 is thermally fused and sealed under vacuum atmosphere. In the above-described manner, an intended nonaqueous electrolyte battery is obtained.

(Case of Adjusting Solid Particle Arrangement)

In order to adjust solid particle arrangement to suitable arrangement, the nonaqueous electrolyte battery may be produced as follows.

First, as in the above, a positive electrode 53 and a negative electrode 54 are produced, and a nonaqueous electrolyte solution is prepared. Subsequently, a winding body is formed as in the above.

(Heating and Pressurizing Steps)

Next, before the electrolyte solution is injected into the exterior member 60, the winding body is sealed in a packaging material such as a latex tube, and heating pressing is performed under hydrostatic pressure. This moves solid particles to the recess among adjacent negative electrode active material particles positioned in an outermost surface portion of a negative electrode active material layer 54B, and therefore, a solid particle concentration in a negative electrode side recess impregnation region A increases. Moreover, solid particles move to the recess among adjacent positive electrode active material particles positioned in an outermost surface portion of a positive electrode active material layer 53B, and therefore, a solid particle concentration in a positive electrode side recess impregnation region A increases.

Subsequently, an intended nonaqueous electrolyte battery can be obtained through the steps similar to those described above.

[Variation 1-6]

The nonaqueous electrolyte battery of the first embodiment may be produced as follows.

[Method for Manufacturing Nonaqueous Electrolyte Battery According to Variation 1-6]

(Production of Positive and Negative Electrodes)

First, as in the example of the method for manufacturing the nonaqueous electrolyte battery, a positive electrode 53 and a negative electrode 54 are produced.

(Preparation of Electrolyte Composition)

Next, the electrolyte composition containing a nonaqueous electrolyte solution, a monomer as a polymer compound raw material, a polymerization initiator, and if necessary, other materials such as a polymerization inhibitor is prepared.

(Formation of Solid Particle Layer)

Next, after paint has been, by, e.g., a coating method, applied to at least one of the principal surfaces of a separator 55, a solvent is removed by drying, and as a result, a solid particle layer is formed. For example, a mixture of solid particles, a binder polymer compound (resin), and a solvent may be used as the paint.

(Assembly of Nonaqueous Electrolyte Battery)

Next, a positive electrode lead 51 is attached to an end portion of a positive electrode current collector 53A by welding, and a negative electrode lead 52 is attached to an end portion of a negative electrode current collector 54A by welding. Next, the positive electrode 53 and the negative electrode 54 are stacked on each other with the separator 55 being interposed therebetween, and then, are wound. A protective tape 57 is bonded to an outermost portion of the winding stack. As a result, a winding body is formed as a precursor of a winding electrode body 50.

Next, the winding body is sandwiched in an exterior member 60, and other outer peripheral edge portion of the exterior member 60 than one side thereof is thermally fused in a bag shape. Thus, the winding body is housed in the exterior member 60.

Next, the electrolyte composition is injected into the bag-shaped exterior member 60, and the exterior member 60 is sealed by, e.g., thermal fusing. Then, the monomer is polymerized by, e.g., thermal polymerization. As a result, a polymer compound is formed, and therefore, an electrolyte layer 56 is formed. In the above-described manner, an intended nonaqueous electrolyte battery is obtained.

(Case of Adjusting Solid Particle Arrangement)

In order to adjust solid particle arrangement to suitable arrangement, the nonaqueous electrolyte battery may be produced as follows.

First, as in the above, a winding body is formed as a precursor of a winding electrode body 50.

(Heating and Pressurizing Steps)

Next, before a nonaqueous electrolyte solution is injected into an exterior member 60, the winding body is sealed in a packaging material such as a latex tube, and heating pressing is performed under hydrostatic pressure. This moves solid particles to the recess among adjacent negative electrode active material particles positioned in an outermost surface portion of a negative electrode active material layer 54B, and therefore, a solid particle concentration in a negative electrode side recess impregnation region A increases. Moreover, solid particles move to the recess among adjacent positive electrode active material particles positioned in an outermost surface portion of a positive electrode active material layer 53B, and therefore, a solid particle concentration in a positive electrode side recess impregnation region A increases.

Subsequently, an intended nonaqueous electrolyte battery can be obtained through the steps similar to those described above.

[Variation 1-7] The nonaqueous electrolyte battery of the first embodiment may be produced as follows.

[Method for Manufacturing Nonaqueous Electrolyte Battery According to Variation 1-7]

(Production of Positive and Negative Electrodes)

First, as in the method for manufacturing the example of the nonaqueous electrolyte battery, a positive electrode 53 and a negative electrode 54 are produced. Next, solid particles and a matrix polymer compound are applied to at least one of the principal surfaces of a separator 55, and then, are dried. In this manner, a matrix resin layer is formed.

(Assembly of Nonaqueous Electrolyte Battery)

Next, the positive electrode 53 and the negative electrode 54 are stacked on each other with the separator 55 being interposed therebetween, thereby forming a stack. Such a stack is wound in the longitudinal direction thereof, and a protective tape 57 is bonded to an outermost portion of the winding stack. As a result, a winding electrode body 50 is formed.

Next, an exterior member 60 formed of a laminated film is deep-drawn such that a recessed portion is formed, and the winding electrode body 50 is inserted into the recessed portion. An unprocessed portion of the exterior member 60 is bent back to above the recessed portion, and then, is the thermally fused at other outer peripheral portion of the recessed portion than part thereof (e.g., one side). At this point, an adhesive film 61 is inserted between each of positive and negative leads 51, 52 and the exterior member 60.

Subsequently, a nonaqueous electrolyte solution is injected into the exterior member 60 through an unfused portion thereof, and then, such an unfused portion of the exterior member 60 is sealed by, e.g., thermal fusing. At this point, the matrix resin layer is impregnated with the nonaqueous electrolyte solution by vacuum sealing, and the matrix polymer compound is swollen. In this manner, an electrolyte layer 56 is formed. As a result, an intended nonaqueous electrolyte battery is obtained.

(Case of Adjusting Solid Particle Arrangement)

In order to adjust solid particle arrangement, the nonaqueous electrolyte battery may be produced as follows.

First, as in the above, a winding electrode body 50 is produced.

(Heating and Pressurizing Steps)

Next, the winding electrode body 50 is sealed in a packaging material such as a latex tube, and heating pressing is performed under hydrostatic pressure. This moves solid particles to the recess among adjacent negative electrode active material particles positioned in an outermost surface portion of a negative electrode active material layer 54B, and therefore, a solid particle concentration in a negative electrode side recess impregnation region A increases. Moreover, solid particles move to the recess among adjacent positive electrode active material particles positioned in an outermost surface portion of a positive electrode active material layer 53B, and therefore, a solid particle concentration in a positive electrode side recess impregnation region A increases.

Next, an exterior member 60 formed of a laminated film is deep-drawn such that a recessed portion is formed, and the winding electrode body 50 is inserted into the recessed portion. An unprocessed portion of the exterior member 60 is bent back to above the recessed portion, and then, is thermally fused at other outer peripheral portion of the recessed portion than part thereof (e.g., one side). At this point, an adhesive film 61 is inserted between each of positive and negative leads 51, 52 and the exterior member 60.

Subsequently, a nonaqueous electrolyte solution is injected into the exterior member 60 through an unfused portion thereof, and then, such an unfused portion of the exterior member 60 is sealed by, e.g., thermal fusing. At this point, a matrix resin layer is impregnated with the nonaqueous electrolyte solution by vacuum sealing, and a matrix polymer compound is swollen. In this manner, an electrolyte layer 56 is formed. As a result, an intended nonaqueous electrolyte battery is obtained.

[Variation 1-8]

The configuration example using the electrolyte gel has been described above in the first embodiment. However, instead of the electrolyte gel, an electrolyte solution as a liquid electrolyte may be used. In this case, the winding electrode body 50 is impregnated with the nonaqueous electrolyte solution with which the exterior member 60 is filled. In this case, the nonaqueous electrolyte battery is produced as follows, for example.

[Method for Manufacturing Nonaqueous Electrolyte Battery According to Variation 1-8]

First, solid particles are contained in an active material layer of each electrode as follows. Note that the example where solid particles are contained in active material layers of both electrodes will be described below, but the solid particle may be contained only in the negative electrode active material layer. Alternatively, the solid particle may be contained only in the positive electrode active material layer.

[Method for Manufacturing Positive Electrode]

A positive electrode active material, a conductive agent, a binder, and solid particles are mixed together to prepare a positive electrode mixture. The positive electrode mixture is dispersed in a solvent of, e.g., N-methyl-2-pyrrolidone, and as a result, a positive electrode mixture slurry in a paste form is produced. Next, the positive electrode mixture slurry is applied to a positive electrode current collector 53A, and then, the solvent is dried. The resultant is compressed and molded by, e.g., a roll press machine to form a positive electrode active material layer 53B. In this manner, a positive electrode 53 is produced.

[Method for Manufacturing Negative Electrode]

A negative electrode active material, a binder, and solid particles are mixed together to prepare a negative electrode mixture. The negative electrode mixture is dispersed in a solvent of, e.g., N-methyl-2-pyrrolidone, and as a result, a negative electrode mixture slurry in a paste form is produced. Next, the negative electrode mixture slurry is applied to a negative electrode current collector 54A, and then, the solvent is dried. The resultant is compressed and molded by, e.g., the roll press machine to form a negative electrode active material layer 54B. In this manner, a negative electrode 54 is produced.

(Assembly of Nonaqueous Electrolyte Battery)

Next, a positive electrode lead 51 is attached to an end portion of the positive electrode current collector 53A by welding, and a negative electrode lead 52 is attached to an end portion of the negative electrode current collector 54A by welding. Next, the positive electrode 53 and the negative electrode 54 are stacked on each other with a separator 55 being interposed therebetween, and then, are wound. A protective tape 57 is bonded to an outermost portion of the winding stack. As a result, a winding body is formed as a precursor of a winding electrode body 50.

Next, the winding body is sandwiched in an exterior member 60, and other outer peripheral edge portion of the exterior member 60 than one side thereof is thermally fused in a bag shape. Thus, the winding body is housed in the exterior member 60. Next, a nonaqueous electrolyte solution is prepared, and is injected into the exterior member 60. After the winding body has been impregnated with the nonaqueous electrolyte solution, the opening of the exterior member 60 is thermally fused and sealed under vacuum atmosphere. In the above-described manner, an intended nonaqueous electrolyte battery is obtained.

[Variation 1-9]

The nonaqueous electrolyte battery of the first embodiment may be produced as follows. First, solid particles are contained in an active material layer of each electrode as follows. Note that the example where solid particles are contained in active material layers of both electrodes will be described below, but the solid particles may be contained only in the active material layer of one (the negative or positive electrode) of the electrodes.

(Method for Manufacturing Positive Electrode)

As in Variation 1-8, a positive electrode 53 is produced. Thus, a solid particle concentration in a positive electrode side recess impregnation region A increases.

(Method for Manufacturing Negative Electrode)

As in Variation 1-8, a negative electrode 54 is produced. Thus, a solid particle concentration in a negative electrode side recess impregnation region A increases.

(Preparation of Electrolyte Composition)

Next, the electrolyte composition containing a nonaqueous electrolyte solution, a monomer as a polymer compound raw material, a polymerization initiator, and if necessary, other materials such as a polymerization inhibitor is prepared.

(Assembly of Nonaqueous Electrolyte Battery)

Next, as in Variation 1-8, a winding body is formed as a precursor of a winding electrode body 50. Then, the winding body is sandwiched in an exterior member 60, and other outer peripheral edge portion of the exterior member 60 than one side thereof is thermally fused in a bag shape. Thus, the winding body is housed in the exterior member 60.

Next, after the electrolyte composition has been injected into the bag-shaped exterior member 60, the exterior member 60 is sealed by, e.g., thermal fusing. Then, the monomer is polymerized by, e.g., thermal polymerization. As a result, a polymer compound is formed, and therefore, an electrolyte layer 56 is formed. In the above-described manner, an intended nonaqueous electrolyte battery is obtained.

[Variation 1-10]

Figure 4:
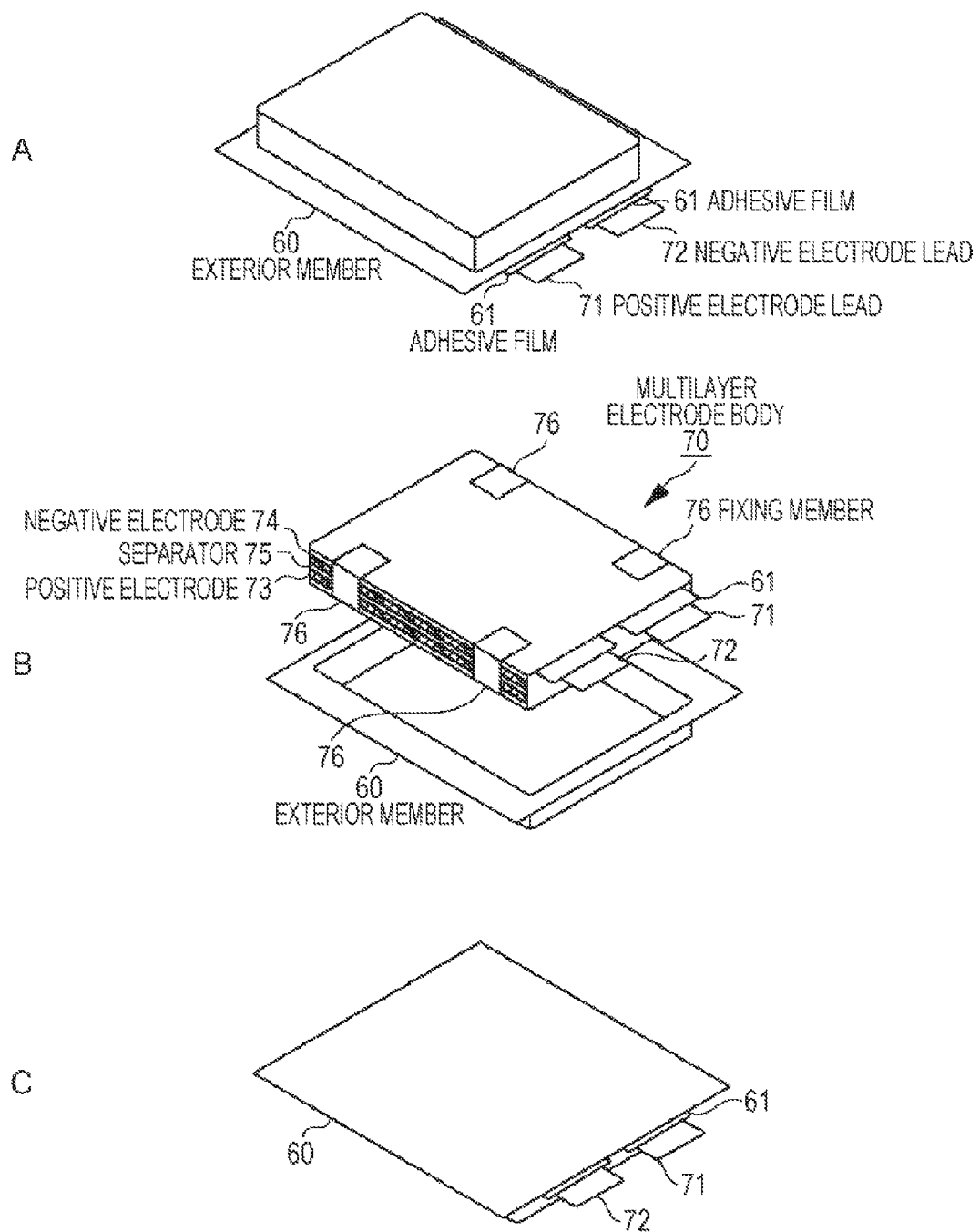
FIGS. 4A to 4C are exploded perspective views of a configuration of a laminated film type nonaqueous electrolyte battery using a multilayer electrode body.

The nonaqueous electrolyte battery configured such that the winding electrode body 50 is wrapped with the exterior member 60 has been described in the example of the first embodiment and Variations 1-1 to 1-9. However, as illustrated in FIGS. 4A to 4C, a multilayer electrode body 70 may be used instead of the winding electrode body 50. FIG. 4A is an external view of the nonaqueous electrolyte battery housing the multilayer electrode body 70. FIG. 4B is an exploded perspective view of the state in which the multilayer electrode body 70 is housed in the exterior member 60. FIG. 4C is an external view of the appearance of the nonaqueous electrolyte battery of FIG. 4A from the bottom side.

The multilayer electrode body 70 is used, which is configured such that a rectangular positive electrode 73 and a rectangular negative electrode 74 are stacked on each other with a rectangular separator 75 being interposed therebetween, and are fixed together with fixing members 76. Note that although not shown in the figure, in the case of forming an electrolyte layer, the electrolyte layer is provided to contact the positive electrode 73 and the negative electrode 74. For example, the electrolyte layer (not shown) is provided between the positive electrode 73 and the separator 75 and between the negative electrode 74 and the separator 75. Such an electrolyte layer is similar to the above-described electrolyte layer 56. The positive electrode lead 71 connected to the positive electrode 73 and the negative electrode lead 72 connected to the negative electrode 74 protrude out of the multilayer electrode body 70, and an adhesive film 61 is provided between each of the positive and negative electrode leads 71, 72 and the exterior member 60.

Note that the method for manufacturing the nonaqueous electrolyte battery is similar to those in the example of the first embodiment and Variations 1-1 to 1-9 as described above, except that the multilayer electrode body is produced instead of the winding electrode body 50 and that the stack (the configuration in which the electrolyte layer is omitted from the multilayer electrode body 70) is produced instead of the winding body.

2. Second Embodiment

In the second embodiment of the present technology, a cylindrical nonaqueous electrolyte battery (a battery) will be described. Such a nonaqueous electrolyte battery is the nonaqueous electrolyte secondary battery being able to perform charging/discharging, for example. Alternatively, the nonaqueous electrolyte battery is a lithium ion secondary battery, for example.

(2-1) Configuration of Example of Nonaqueous Electrolyte Battery

Figure 5:
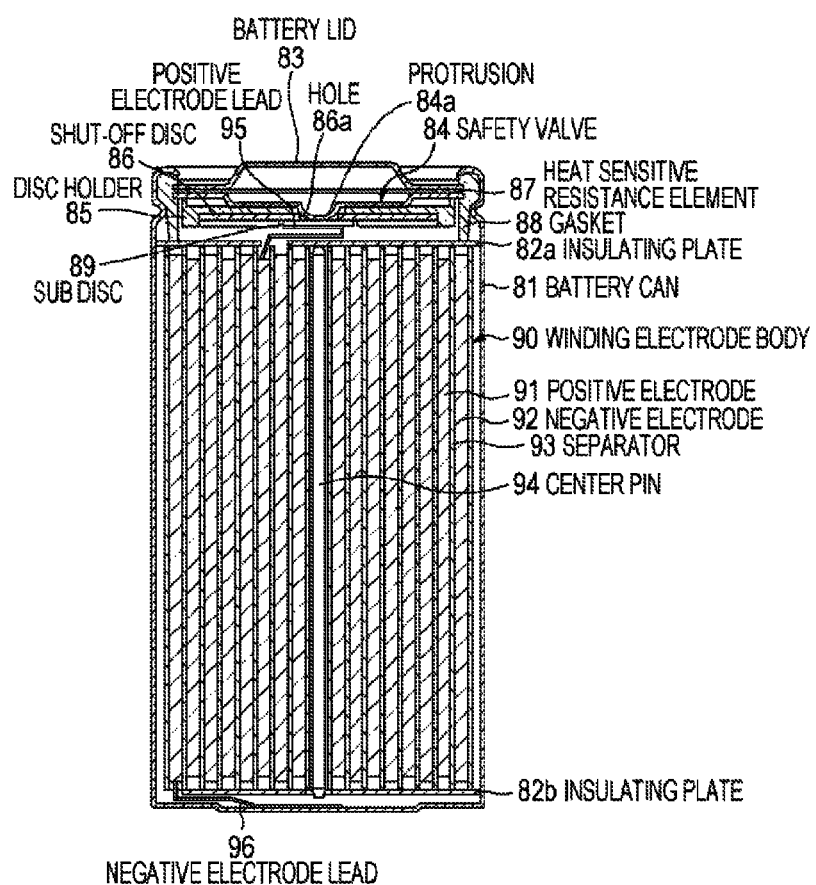
FIG. 5 is a cross-sectional view of a configuration of a cylindrical nonaqueous electrolyte battery of another embodiment of the present technology.

FIG. 5 is a cross-sectional view of an example of the nonaqueous electrolyte battery of the second embodiment. Such a nonaqueous electrolyte battery is of a so-called "cylindrical type," and is configured such that a substantially-hollow cylindrical battery can 81 contains, together with a not-shown liquid nonaqueous electrolyte (hereinafter referred to as a "nonaqueous electrolyte solution," as necessary), a winding electrode body 90 formed in such a manner that a band-shaped positive electrode 91 and a band-shaped negative electrode 92 are wound with a separator 93 being interposed therebetween.

The battery can 81 is made of, e.g., iron plated with nickel. One end portion of the battery can 81 is closed, and the other end portion of the battery can 81 is opened. In the battery can 81, a pair of insulating plates 82a, 82b is arranged perpendicular to a winding body peripheral surface to sandwich the winding electrode body 90.

Examples of the material of the battery can 81 include iron (Fe), nickel (Ni), stainless steel (SUS), aluminum (Al), and titanium (Ti). The battery can 81 may be plated with, e.g., nickel in order to prevent corrosion due to the electrochemical nonaqueous electrolyte solution in charging/discharging of the nonaqueous electrolyte battery. A battery lid 83 as a positive electrode lead plate, a safety valve mechanism, and a heat sensitive resistor element (a positive temperature coefficient (PTC) element) 87 are swaged to the opening end portion of the battery can 81 through a gasket 88 for insulation sealing, the safety valve mechanism and the heat sensitive resistor element 87 being provided inside the battery lid 83.

The battery lid 83 is made of the material similar to that of the battery can 81, for example. The battery lid 83 is provided with an opening for discharging the gas generated inside the battery. The safety valve mechanism is configured such that a safety valve 84, a disc holder 85, and a shut-off disc 86 are stacked on each other in this order. A protrusion 84a of the safety valve 84 is connected to a positive electrode lead 95 protruding out of the winding electrode body 90 through a sub disc 89 disposed to cover a hole 86a formed at the center of the shut-off disc 86. Since the safety valve 84 and the positive electrode lead 95 are connected together through the sub disc 89, drawing of the positive electrode lead 95 into the hole 86a in reversing of the safety valve 84 is prevented. Moreover, the safety valve mechanism is electrically connected to the battery lid 83 through the heat sensitive resistor element 87.

The safety valve mechanism is configured such that when the internal pressure of the nonaqueous electrolyte battery reaches equal to or higher than a certain level due to, e.g., short circuit in the battery or heating from the outside of the battery, the safety valve 84 is reversed for electrical disconnection among the protrusion 84a, the battery lid 83, and the winding electrode body 90. That is, when the safety valve 84 is reversed, the shut-off disc 86 presses the positive electrode lead 95 to disconnect the safety valve 84 and the positive electrode lead 95 from each other. The disc holder 85 is formed of an insulating material. When the safety valve 84 is reversed, the safety valve 84 and the shut-off disc 86 are insulated from each other.

Moreover, when more gas is generated in the battery to further increase the internal pressure of the battery, part of the safety valve 84 is breakable so that the gas can be discharged toward the battery lid 83.

Moreover, e.g., a plurality of gas vent holes (not shown) are provided at the periphery of the hole 86a of the shut-off disc 86. When gas is generated from the winding electrode body 90, the gas can be effectively discharged toward the battery lid 83.

The heat sensitive resistor element 87 is configured to increase a resistance value with a temperature increase and to electrically disconnect the battery lid 83 and the winding electrode body 90 from each other to shut off current, thereby preventing abnormal heat generation due to excessive current. The gasket 88 is formed of, e.g., an insulating material, and asphalt is applied to the surface of the gasket 88.

The winding electrode body 90 housed in the nonaqueous electrolyte battery is wound around a center pin 94. The winding electrode body 90 is formed as follows: the positive electrode 91 and the negative electrode 92 are stacked in this order with the separator 93 being interposed therebetween, and then, such a stack is wound in the longitudinal direction thereof. The positive electrode lead 95 is connected to the positive electrode 91, and a negative electrode lead 96 is connected to the negative electrode 92. As described above, the positive electrode lead 95 is welded to the safety valve 84, and is electrically connected to the battery lid 83. The negative electrode lead 96 is welded and electrically connected to the battery can 81.

Figure 6:
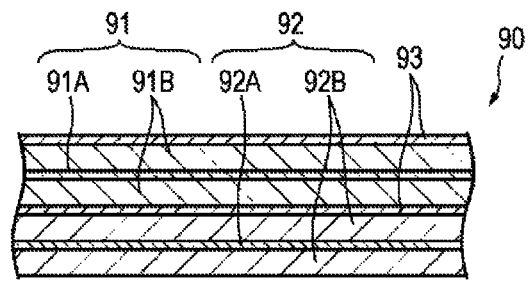
FIG. 6 is an enlarged partial cross-sectional view of a winding electrode body housed in the cylindrical nonaqueous electrolyte battery.

FIG. 6 is an enlarged partial view of the winding electrode body 90 illustrated in FIG. 5.

The positive electrode 91, the negative electrode 92, and the separator 93 will be described in detail below.

[Positive Electrode]

The positive electrode 91 is configured such that a positive electrode active material layer 91B containing a positive electrode active material is formed on each surface of a positive electrode current collector 91A. Although not shown, the positive electrode 91 may have the region formed with the positive electrode active material layer 91B only on one surface of the positive electrode current collector 91A. Metal foil such as aluminum (Al) foil, nickel (Ni) foil, or stainless steel (SUS) foil can be used as the positive electrode current collector 91A, for example.

The positive electrode active material layer 91B contains, as the positive electrode active material, one or more of any positive electrode materials being able to store and release lithium. If necessary, the positive electrode active material layer 91B may contain other materials such as a binder and a conductive agent. Note that the materials similar to those of the first embodiment can be used as the positive electrode active material, the conductive agent, and the binder.

The positive electrode 91 includes the positive electrode lead 95 connected, by spot welding or ultrasonic welding, to one end portion of the positive electrode current collector 91A. The positive electrode lead 95 is preferably formed of metal foil in a mesh shape. However, as long as electrochemical and chemical stability and conduction can be obtained, metal is not necessarily used. Examples of the material of the positive electrode lead 95 include aluminum (Al) and nickel (Ni).

[Negative Electrode]

The negative electrode 92 has such a structure that a negative electrode active material layer 92B is formed on each surface of a negative electrode current collector 92A having a pair of opposing surfaces, for example. Note that although not shown, the negative electrode 92 may have the region formed with the negative electrode active material layer 92B only on one surface of the negative electrode current collector 92A. The negative electrode current collector 92A is formed of, e.g., metal foil such as copper foil.

The negative electrode active material layer 92B contains, as the negative electrode active material, one or more of any negative electrode materials being able to store and release lithium. If necessary, the negative electrode active material layer 92B may contain other materials such as the binder and the conductive agent similar to those of the positive electrode active material layer 91B. Note that the materials similar to those of the first embodiment can be used as the negative electrode active material, the conductive agent, and the binder.

[Separator]

The separator 93 is similar to the separator 55 of the first embodiment.

[Nonaqueous Electrolyte Solution]

The nonaqueous electrolyte solution is similar to that of the first embodiment.

(Arrangement of Solid Particles)

The solid particles contained in the electrolyte are arranged in at least any of the region between the positive electrode and the separator, the region between the negative electrode and the separator, the gap in the positive electrode active material layer, and the gap in the negative electrode active material layer. That is, the electrolyte is contained in the region between the positive electrode and the separator, and the solid particles are contained in such an electrolyte. The electrolyte is contained in the region between the negative electrode and the separator, and the solid particles are contained in such an electrolyte. The electrolyte is contained in the gap among active material particles in the positive electrode active material layer, and the solid particles are contained in such an electrolyte. The electrolyte is contained in the gap among active material particles in the negative electrode active material layer, and the solid particles are contained in such an electrolyte.

(Preferable Arrangement of Solid Particles)

Although not shown, the solid particles are preferably arranged in the nonaqueous electrolyte battery such that there is a concentration difference among the regions similar to those of the configuration in which the electrolyte layer 56 is omitted from the configuration of FIGS. 3A and 3B as described in the first embodiment. That is, the solid particles are arranged such that there is a concentration difference among a negative electrode side recess impregnation region A, a negative electrode side top coating region B, and a negative electrode side deep region C and that a particle concentration in the recess impregnation region A is at least higher than that in the negative electrode side deep region C. Moreover, the solid particles are arranged such that there is a concentration difference among a positive electrode side recess impregnation region A, a positive electrode side top coating region B, and a positive electrode side deep region C and that a particle concentration in the recess impregnation region A is at least higher than that in the positive electrode side deep region C.

(2-2) Method for Manufacturing Nonaqueous Electrolyte Battery (Method for Manufacturing Positive Electrode, Method for Manufacturing Negative Electrode)

As in the first embodiment, a positive electrode 91 and a negative electrode 92 are produced.

(Formation of Solid Particle Layer)

Next, after paint has been, by, e.g., a coating method, applied to at least one of the principal surfaces of the negative electrode 92, a solvent is removed by drying, and as a result, a solid particle layer is formed. For example, a mixture of solid particles, a binder polymer compound, and a solvent may be used as the paint. Similarly, after the paint has been, by, e.g., the coating method, applied to at least one of the principal surfaces of the positive electrode 93, the solvent is removed by drying, and as a result, a solid particle layer is formed. Note that the solid particle layer may be at least formed on one principal surface of one (the positive electrode 92 or the negative electrode 93) of the electrodes.

(Method for Manufacturing Separator)

Next, a separator 93 is prepared.

(Preparation of Nonaqueous Electrolyte Solution)

A nonaqueous electrolyte solution is prepared in such a manner that electrolyte salt is dissolved in a nonaqueous solvent.

(Assembly of Nonaqueous Electrolyte Battery)

A positive electrode lead 95 is attached to a positive electrode current collector 91A by welding, and a negative electrode lead 96 is attached to a negative electrode current collector 92A by welding. Subsequently, the positive electrode 91 and the negative electrode 92 are wound with the separator 93 being interposed therebetween, and as a result, a winding electrode body 90 is formed.

A tip end portion of the positive electrode lead 95 is welded to a safety valve mechanism, and a tip end portion of the negative electrode lead 96 is welded to a battery can 81. Then, the winding electrode body 90 is housed in the battery can 81 with the winding surfaces of the winding electrode body 90 being sandwiched between a pair of insulating plates 82*a*, 82*b*. After the winding electrode body 90 has been housed in the battery can 81, the nonaqueous electrolyte solution is injected into the battery can 81, and the separator 93 is impregnated with the nonaqueous electrolyte solution. Thereafter, a battery lid 83, the safety valve mechanism including a safety valve 84 etc., and a heat sensitive resistor element 87 are swaged and fixed to an opening end portion of the battery can 81 through a gasket 88. Thus, a nonaqueous electrolyte battery of the present technology as illustrated in FIG. 5 is formed.

In charging of this nonaqueous electrolyte battery, lithium ions are released from a positive electrode active material layer 91B, and are stored in a negative electrode active material layer 92B through the nonaqueous electrolyte solution with which the separator 93 is impregnated, for example. Moreover, in discharging, lithium ions are released from the negative electrode active material layer 92B, and are stored in the positive electrode active material layer 91B through the nonaqueous electrolyte solution with which the separator 93 is impregnated, for example.

(Case of Adjusting Solid Particle Arrangement)

In order to adjust solid particle arrangement to suitable arrangement, the nonaqueous electrolyte battery may be produced as follows.

(Method for Manufacturing Positive Electrode, Method for Manufacturing Negative Electrode)

As in the first embodiment, a positive electrode 91 and a negative electrode 92 are produced.

(Formation of Solid Particle Layer)

Next, after paint has been, by, e.g., a coating method, applied to at least one of the principal surfaces of the negative electrode 92, a solvent is removed by drying, and as a result, a solid particle layer is formed. For example, a mixture of solid particles, a binder polymer compound, and a solvent may be used as the paint. In an outermost surface portion of a negative electrode active material layer 92B on which the solid particle layer is applied and formed, the solid particles are filtered by the recess among adjacent negative electrode active material particles positioned in the outermost surface portion of the negative electrode active material layer 92B, and therefore, a particle concentration in a negative electrode side recess impregnation region A increases. Similarly, a solid particle layer is formed on each principal surface of the positive electrode 91 by, e.g., the coating method. In an outermost surface portion of a positive electrode active material layer 91B on which the solid particle layer is applied and formed, the solid particles are filtered by the recess among adjacent positive electrode active material particles positioned in the outermost surface portion of the positive electrode active material layer 91B, and therefore, a particle concentration in a positive electrode side recess impregnation region A increases. The solid particles for which a particle size D95 is adjusted to equal to or greater than a predetermined magnification of a particle size D50 are preferably used as the solid particles. For example, the solid particles adjusted as follows are preferably used: particles with a particle size of equal to or greater than a $2/\sqrt{3}-1$ fold of the particle size D50 are added as some solid particles such that the solid particle size D95 is adjusted to equal to or greater than a $2/\sqrt{3}-1$ fold of the active material particle size D50. Thus, a clearance in a recess bottom portion is filled with some particles with a larger particle size, and therefore, the solid particles can be easily filtered. Note that the solid particle layer may be at least formed on one principal surface of one (the positive electrode 92 or the negative electrode 93) of the electrodes.

Note that after each solid particle layer has been applied and formed, an extra portion of the paint is scraped, and therefore, unnecessary expansion of the distance between the electrodes can be reduced. Moreover, since the applied paint surface is scraped, more particles can be sent into the recess among adjacent active material particles, and the ratio of the particles in a top coating region B can be decreased. Thus, a majority of the solid particles can be intensively arranged in the recess impregnation region.

(Method for Manufacturing Separator)

Next, a separator 93 is prepared.

(Preparation of Nonaqueous Electrolyte Solution)

A nonaqueous electrolyte solution is prepared in such a manner that electrolyte salt is dissolved in a nonaqueous solvent.

(Assembly of Nonaqueous Electrolyte Battery)

Next, a positive electrode lead 95 is attached to a positive electrode current collector 91A by welding, and a negative electrode lead 96 is attached to a negative electrode current collector 92A by welding. Subsequently, the positive electrode 91 and the negative electrode 92 are wound with the separator 93 being interposed therebetween, and as a result, a winding electrode body 90 is formed.

A tip end portion of the positive electrode lead 95 is welded to a safety valve mechanism, and a tip end portion of the negative electrode lead 96 is welded to a battery can 81. Then, the winding electrode body 90 is housed in the battery can 81 with the winding surfaces of the winding electrode body 90 being sandwiched between a pair of insulating plates 82a, 82b. After the winding electrode body 90 has been housed in the battery can 81, the nonaqueous electrolyte solution is injected into the battery can 81, and the separator 93 is impregnated with the nonaqueous electrolyte solution. Thereafter, a battery lid 83, the safety valve mechanism including a safety valve 84 etc., and a heat sensitive resistor element 87 are swaged and fixed to an opening end portion of the battery can 81 through a gasket 88. Thus, a nonaqueous electrolyte battery of the present technology as illustrated in FIG. 5 is formed.

In charging of this nonaqueous electrolyte battery, lithium ions are released from the positive electrode active material layer 91B, and are stored in the negative electrode active material layer 92B through the nonaqueous electrolyte solution with which the separator 93 is impregnated, for example. Moreover, in discharging, lithium ions are released from the negative electrode active material layer 92B, and are stored in the positive electrode active material layer 91B through the nonaqueous electrolyte solution with which the separator 93 is impregnated, for example.

[Variation 2-1]

The nonaqueous electrolyte battery of the second embodiment may be produced as follows.

(Production of Positive and Negative Electrodes)

As in the example of the nonaqueous electrolyte battery, a positive electrode 91 and a negative electrode 92 are produced.

(Formation of Solid Particle Layer)

Next, after paint has been, by, e.g., a coating method, applied to at least one of the principal surfaces of a separator 93, a solvent is removed by drying, and as a result, a solid particle layer is formed. For example, a mixture of solid particles, a binder polymer compound, and a solvent may be used as the paint.

(Assembly of Nonaqueous Electrolyte Battery)

Next, as in the example of the nonaqueous electrolyte battery, a winding electrode body 90 is formed.

As in the above-described example, an intended nonaqueous electrolyte battery can be obtained by the subsequent steps.

(Case of Adjusting Solid Particle Arrangement)

In order to adjust solid particle arrangement to suitable arrangement, the nonaqueous electrolyte battery may be produced as follows.

(Production of Positive and Negative Electrodes)

First, as in the example of the nonaqueous electrolyte battery, a positive electrode 91 and a negative electrode 92 are produced.

(Formation of Solid Particle Layer)

Next, after paint has been, by, e.g., a coating method, applied to at least one of the principal surfaces of a separator 93, a solvent is removed by drying, and as a result, a solid particle layer is formed. For example, a mixture of solid particles, a binder polymer compound, and a solvent may be used as the paint.

(Assembly of Nonaqueous Electrolyte Battery)

Next, as in the example of the nonaqueous electrolyte battery, a winding electrode body 90 is formed.

(Heating and Pressurizing Steps)

Before the winding electrode body 90 is housed in a battery can 81, the winding electrode body 90 is sealed in a packaging material such as a latex tube, and heating pressing is performed under hydrostatic pressure. This moves the solid particles to the recess among adjacent negative electrode active material particles positioned in an outermost surface portion of a negative electrode active material layer 92B, and therefore, a solid particle concentration in a negative electrode side recess impregnation region A increases. Moreover, the solid particles move to the recess among adjacent positive electrode active material particles positioned in an outermost surface portion of a positive electrode active material layer 91B, and therefore, a solid particle concentration in a positive electrode side recess impregnation region A increases.

As in the above-described example, an intended nonaqueous electrolyte battery can be obtained by the subsequent steps.

[Variation 2-2]

The nonaqueous electrolyte battery of the second embodiment may be produced as follows.

First, solid particles are contained in an active material layer of each electrode as follows. Note that the example where solid particles are contained in active material layers of both electrodes will be described below, but the solid particles may be contained only in the active material layer of one (the negative or positive electrode) of the electrodes.

(Method for Manufacturing Positive Electrode)

A positive electrode active material, a conductive agent, a binder, and solid particles are mixed together to prepare a positive electrode mixture. The positive electrode mixture is dispersed in a solvent of, e.g., N-methyl-2-pyrrolidone, and as a result, a positive electrode mixture slurry in a paste form is produced. Next, the positive electrode mixture slurry is applied to a positive electrode current collector 91A, and then, the solvent is dried. The resultant is compressed and molded by, e.g., a roll press machine to form a positive electrode active material layer 91B. In this manner, a positive electrode 91 is produced.

(Method for Manufacturing Negative Electrode)

A negative electrode active material, a binder, and solid particles are mixed together to prepare a negative electrode mixture. The negative electrode mixture is dispersed in a solvent of, e.g., N-methyl-2-pyrrolidone, and as a result, a negative electrode mixture slurry in a paste form is produced. Next, the negative electrode mixture slurry is applied to a negative electrode current collector 92A, and then, the solvent is dried. The resultant is compressed and molded by, e.g., the roll press machine to form a negative electrode active material layer 92B. In this manner, a negative electrode 92 is produced.

(Assembly of Nonaqueous Electrolyte Battery)

Next, as in the example of the nonaqueous electrolyte battery, a winding electrode body 90 is produced. Then, an intended nonaqueous electrolyte battery is obtained by similar subsequent steps.

3. Third Embodiment

In the third embodiment, a rectangular nonaqueous electrolyte battery will be described.

(3-1) Configuration of Example of Nonaqueous Electrolyte Battery

Figure 7:
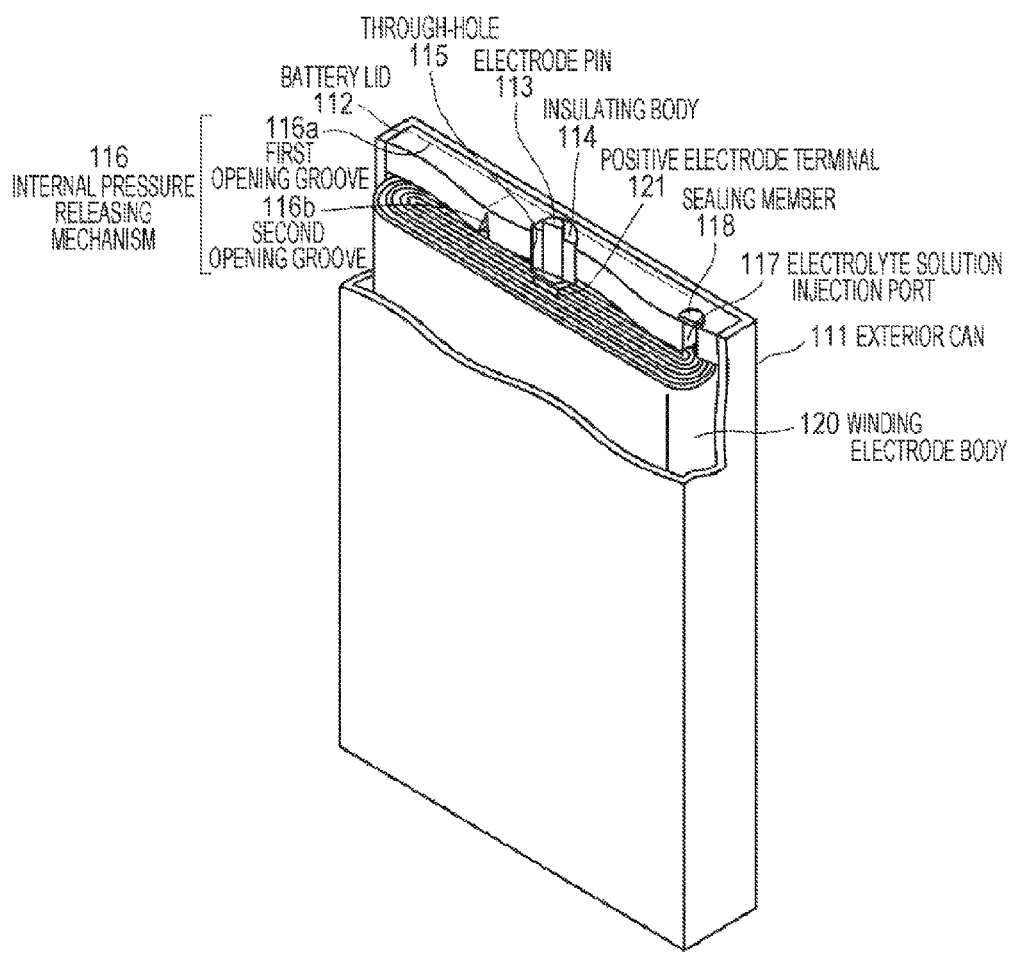
FIG. 7 is a perspective view of a configuration of a rectangular nonaqueous electrolyte battery of still another embodiment of the present technology.

FIG. 7 illustrates a configuration of an example of the nonaqueous electrolyte battery of the third embodiment. Such a nonaqueous electrolyte battery is of a so-called "rectangular type," and is configured such that a winding electrode body 120 is housed in a rectangular exterior can 111.

The nonaqueous electrolyte battery includes the rectangular cylindrical exterior can 111, the winding electrode body 120 as a power generation element housed in the exterior can 111, a battery lid 112 configured to close an opening of the exterior can 111, and an electrode pin 113 provided at the substantially center of the battery lid 112, for example.

For example, the exterior can 111 is, as a hollow rectangular cylindrical body with a closed bottom, made of the metal having conductivity, such as iron (Fe). The inner surface of the exterior can 111 is preferably plated with nickel or applied with conductive paint such that the conductivity of the exterior can 111 increases. Moreover, the outer peripheral surface of the exterior can 111 may be covered with an exterior label formed of a plastic sheet or paper, or may be applied with insulating paint for protection, for example. As in the exterior can 111, the battery lid 112 is made of the metal having conductivity, such as iron (Fe).

The winding electrode body 120 is obtained as follows: positive and negative electrodes are stacked on each other with a separator being interposed therebetween, and then, such a stack is wound in an elongated coin shape. Since the positive and negative electrodes, the separator, and a nonaqueous electrolyte solution are similar to those of the first embodiment, detailed description thereof will not be repeated.

The winding electrode body 120 having the above-described configuration is provided with many positive electrode terminals 121 connected to a positive electrode current collector and many negative electrode terminals connected to a negative electrode current collector. All of the positive electrode terminals 121 and the negative electrode terminals protrude out of one end of the winding electrode body 120 in the axial direction thereof. Then, the positive electrode terminals 121 are connected to the lower end of the electrode pin 113 by a fixing method such as welding. Moreover, the negative electrode terminals are connected to the inner surface of the exterior can 111 by a fixing method such as welding.

The electrode pin 113 is formed of a conductive shaft member, and is held by an insulating body 114 with a head portion of the electrode pin 113 protruding upward. The electrode pin 113 is fixed to the substantially center of the battery lid 112 through the insulating body 114. The insulating body 114 is made of the material having high insulation properties, and is fitted into a through-hole 115 provided on the surface side of the battery lid 112. Moreover, the electrode pin 113 penetrates the through-hole 115, and tip end portions of the positive electrode terminals 121 are fixed to the lower end surface of the electrode pin 113.

The battery lid 112 provided with, e.g., the electrode pin 113 is fitted into the opening of the exterior can 111, and the contact surface between the exterior can 111 and the battery lid 112 is joined by a fixing method such as welding. Thus, the opening of the exterior can 111 is sealed by the battery lid 112, leading to an air-tight and liquid-tight configuration. The battery lid 112 is provided with an internal pressure releasing mechanism 116 configured to break, when a pressure in the exterior can 111 increases to equal to or higher than a predetermined value, part of the battery lid 112 to transfer (release) the internal pressure to the outside.

The internal pressure releasing mechanism 116 includes two first opening grooves 116a (one of the first opening grooves 116a is not shown) linearly extending in the longitudinal direction of the battery lid 112 at the inner surface of the battery lid 112, and a second opening groove 116b extending in the width direction perpendicular to the longitudinal direction at the inner surface of the battery lid 32 and communicating, at both ends, with the two first opening grooves 116a. The two first opening grooves 116a are provided parallel to each other along the long-side outer edges of the battery lid 112 in the vicinity of the inside of two long sides of the battery lid 112, the long sides being positioned to face the width direction of the battery lid 112. Moreover, the second opening groove 116b is provided at the substantially middle position between one of the short-side outer edges of the battery lid 112 and the electrode pin 113 on one side of the electrode pin 113 in the longitudinal direction thereof.

The first opening grooves 116a and the second opening groove 116b each have a V-shaped cross section opening on the lower side, for example. Note that the shapes of the first opening groove 116a and the second opening groove 116b are not limited to the V-shape described in the present embodiment. For example, the shapes of the first opening grooves 116a and the second opening groove 116b may be a U-shape or a semicircular shape.

An electrolyte solution injection port 117 is provided to penetrate the battery lid 112. The electrolyte solution injection port 117 is used for nonaqueous electrolyte solution injection after swaging of the battery lid 112 and the exterior can 111, and is sealed by a sealing member 118 after nonaqueous electrolyte solution injection. Thus, in the case where a winding electrode body is produced in such a manner that electrolyte gel is, in advance, provided between each of positive and negative electrodes and a separator, the electrolyte solution injection port 117 and the sealing member 118 are not necessarily provided.

[Separator]

The separator similar to that of the first embodiment is used as the separator.

[Nonaqueous Electrolyte Solution]

The nonaqueous electrolyte solution is similar to that of the first embodiment.

(Arrangement of Solid Particles)

The solid particles contained in the electrolyte are arranged in at least any of the region between the positive electrode and the separator, the region between the negative electrode and the separator, a gap in a positive electrode active material layer, and a gap in a negative electrode active material layer. That is, the electrolyte is contained in the region between the positive electrode and the separator, and the solid particles are contained in such an electrolyte. The electrolyte is contained in the region between the negative electrode and the separator, and the solid particles are contained in such an electrolyte. The electrolyte is contained in the gap among active material particles in the positive electrode active material layer, and the solid particles are contained in such an electrolyte. The electrolyte is contained in the gap among active material particles in the negative electrode active material layer, and the solid particles are contained in such an electrolyte.

(Preferable Arrangement of Solid Particles)

Although not shown, the solid particles are preferably arranged in the nonaqueous electrolyte battery such that there is a concentration difference among the regions similar to those of the configuration in which the electrolyte layer 56 is omitted from the configuration of FIGS. 3A and 3B as described in the first embodiment. That is, the solid particles are arranged such that there is a concentration difference among a negative electrode side recess impregnation region A, a negative electrode side top coating region B, and a negative electrode side deep region C and that a particle concentration in the recess impregnation region A is at least higher than that in the negative electrode side deep region C. Moreover, the solid particles are arranged such that there is a concentration difference among a positive electrode side recess impregnation region A, a positive electrode side top coating region B, and a positive electrode side deep region C and that a particle concentration in the recess impregnation region A is at least higher than that in the positive electrode side deep region C.

(3-2) Method for Manufacturing Nonaqueous Electrolyte Battery

The nonaqueous electrolyte battery can be manufactured as follows, for example.

[Method for Manufacturing Positive and Negative Electrodes]

Positive and negative electrodes can be produced in the method similar to that of the third embodiment.

(Formation of Solid Particle Layer)

Next, after paint has been, by, e.g., a coating method, applied to at least one of the principal surfaces of the negative electrode, a solvent is removed by drying, and as a result, a solid particle layer is formed. For example, a mixture of solid particles, a binder polymer compound, and a solvent may be used as the paint. Similarly, after the paint has been, by, e.g., the coating method, applied to at least one of the principal surfaces of the positive electrode, the solvent is removed by drying, and as a result, a solid particle layer is formed. Note that the solid particle layer may be at least formed on one principal surface of one (the positive electrode 92 or the negative electrode 93) of the electrodes.

(Assembly of Nonaqueous Electrolyte Battery)

The positive and negative electrodes and a separator (the separator formed with a particle-containing resin layer on at least one surface of a base material) are sequentially stacked and wound, and as a result, a coin-shaped elongated winding electrode body 120 is produced. Subsequently, the winding electrode body 120 is housed in an exterior can 111.

Then, the electrode pin 113 provided at a battery lid 112 and the positive electrode terminals 121 protruding out of the winding electrode body 120 are connected together. Although not shown, the negative electrode terminals protruding out of the winding electrode body 120 and the battery can are connected together. Subsequently, the exterior can 111 and the battery lid 112 are fitted together, and a nonaqueous electrolyte solution is injected through an electrolyte solution injection port 117 under, e.g., reduced pressure to seal the exterior can 111 and the battery lid 112 by a sealing member 118. In the above-described manner, a nonaqueous electrolyte battery can be obtained.

(Case of Adjusting Solid Particle Arrangement)

In order to adjust solid particle arrangement to suitable arrangement, the nonaqueous electrolyte battery may be produced as follows.

[Method for Manufacturing Positive and Negative Electrodes]

Positive and negative electrodes can be produced in the method similar to that described above.

(Formation of Solid Particle Layer)

Next, after paint has been, by, e.g., a coating method, applied to at least one of the principal surfaces of the negative electrode, a solvent is removed by drying, and as a result, a solid particle layer is formed. For example, a mixture of solid particles, a binder polymer compound, and a solvent may be used as the paint. In an outermost surface portion of a negative electrode active material layer on which the solid particle layer is applied and formed, the solid particles are filtered by the recess among adjacent negative electrode active material particles positioned in the outermost surface portion of the negative electrode active material layer, and therefore, a particle concentration in a negative electrode side recess impregnation region A increases. Similarly, a solid particle layer is, by, e.g., the coating method, formed on each principal surface of the positive electrode. In an outermost surface portion of a positive electrode active material layer on which the solid particle layer is applied and formed, the solid particles are filtered by the recess among adjacent positive electrode active material particles positioned in the outermost surface portion of the positive electrode active material layer, and therefore, a particle concentration in a positive electrode side recess impregnation region A increases. The solid particles for which a particle size D95 is adjusted to equal to or greater than a predetermined magnification of a particle size D50 are preferably used as the solid particles. For example, the solid particles adjusted as follows are preferably used: particles with a particle size of equal to or greater than a 2/√3−1 fold of the particle size D50 are added as some solid particles such that the solid particle size D95 is adjusted to equal to or greater than a 2/√3−1 fold of the active material particle size D50. Thus, a clearance in a recess bottom portion is filled with some particles with a larger particle size, and therefore, the solid particles can be easily filtered. Note that the solid particle layer may be at least formed on one principal surface of one (the positive electrode 92 or the negative electrode 93) of the electrodes.

Note that after each solid particle layer has been applied and formed, an extra portion of the paint is scraped, and therefore, unnecessary expansion of the distance between the electrodes can be reduced. Moreover, since the applied paint surface is scraped, more solid particles can be arranged in the recess among adjacent active material particles, and the ratio of the solid particles in a top coating region B can be decreased. Thus, a majority of the solid particles can be intensively arranged in the recess impregnation region.

(Assembly of Nonaqueous Electrolyte Battery)

The positive and negative electrodes and a separator (the separator formed with a particle-containing resin layer on at least one surface of a base material) are sequentially stacked and wound, and as a result, a coin-shaped elongated winding electrode body 120 is produced. Subsequently, the winding electrode body 120 is housed in an exterior can 111.

Then, the electrode pin 113 provided at a battery lid 112 and the positive electrode terminals 121 protruding out of the winding electrode body 120 are connected together. Although not shown, the negative electrode terminals protruding out of the winding electrode body 120 and the battery can are connected together. Subsequently, the exterior can 111 and the battery lid 112 are fitted together, and a nonaqueous electrolyte solution is injected through an electrolyte solution injection port 117 under, e.g., reduced pressure to seal the exterior can 111 and the battery lid 112 by a sealing member 118. In the above-described manner, a nonaqueous electrolyte battery can be obtained.

[Variation 3-1]

The nonaqueous electrolyte battery of the third embodiment may be produced as follows.

(Production of Positive and Negative Electrodes)

First, as in the example of the nonaqueous electrolyte battery, positive and negative electrodes are produced.

(Formation of Solid Particle Layer)

Next, after paint has been, by, e.g., a coating method, applied to at least one of the principal surfaces of a separator, a solvent is removed by drying, and as a result, a solid particle layer is formed. For example, a mixture of solid particles, a binder polymer compound, and a solvent may be used as the paint.

(Assembly of Nonaqueous Electrolyte Battery)

Next, as in the example of the nonaqueous electrolyte battery, a winding electrode body 120 is formed.

Subsequently, an intended nonaqueous electrolyte battery can be obtained as in the above-described example.

(Case of Adjusting Solid Particle Arrangement)

In order to adjust solid particle arrangement to suitable arrangement, the nonaqueous electrolyte battery may be produced as follows.

(Production of Positive and Negative Electrodes, Formation of Solid Particle Layer)

As in the above, positive and negative electrodes are produced. Moreover, as in the above, a solid particle layer is formed on at least one of the principal surfaces of a separator.

(Assembly of Nonaqueous Electrolyte Battery)

Next, a winding electrode body 120 is formed as in the example of the nonaqueous electrolyte battery. Next, before the winding electrode body 120 is housed in an exterior can 111, the winding electrode body 120 is sealed in a packaging material such as a latex tube, and heating pressing is performed under hydrostatic pressure. This moves (pushes) solid particles to the recess among adjacent negative electrode active material particles positioned in an outermost surface portion of a negative electrode active material layer, and therefore, a solid particle concentration in a negative electrode side recess impregnation region A increases. Moreover, solid particles move to the recess among adjacent positive electrode active material particles positioned in an outermost surface portion of a positive electrode active material layer, and therefore, a solid particle concentration in a positive electrode side recess impregnation region A increases.

Subsequently, as in the above-described example, an intended nonaqueous electrolyte battery can be obtained.

[Variation 3-2]

The nonaqueous electrolyte battery of the third embodiment may be produced as follows.

First, solid particles are contained in an active material layer of each electrode as follows. Note that the example where solid particles are contained in active material layers of both electrodes will be described below, but the solid particles may be contained only in the active material layer of one (the negative or positive electrode) of the electrodes.

(Method for Manufacturing Positive Electrode)

A positive electrode active material, a conductive agent, a binder, and solid particles are mixed together to prepare a positive electrode mixture. The positive electrode mixture is dispersed in a solvent of, e.g., N-methyl-2-pyrrolidone, and as a result, a positive electrode mixture slurry in a paste form is produced. Next, the positive electrode mixture slurry is applied to a positive electrode current collector, and then, the solvent is dried. The resultant is compressed and molded by, e.g., a roll press machine to form a positive electrode active material layer. In this manner, a positive electrode is produced.

(Method for Manufacturing Negative Electrode)

A negative electrode active material, a binder, and solid particles are mixed together to prepare a negative electrode mixture. The negative electrode mixture is dispersed in a solvent of, e.g., N-methyl-2-pyrrolidone, and as a result, a negative electrode mixture slurry in a paste form is produced. Next, the negative electrode mixture slurry is applied to a negative electrode current collector, and then, the solvent is dried. The resultant is compressed and molded by, e.g., the roll press machine to form a negative electrode active material layer. In this manner, a negative electrode is produced.

(Assembly of Nonaqueous Electrolyte Battery)

Next, as in the example of the nonaqueous electrolyte battery, a winding electrode body 120 is produced. Then, an intended nonaqueous electrolyte battery is obtained by similar subsequent steps.

4. Fourth Embodiment

Figure 8:
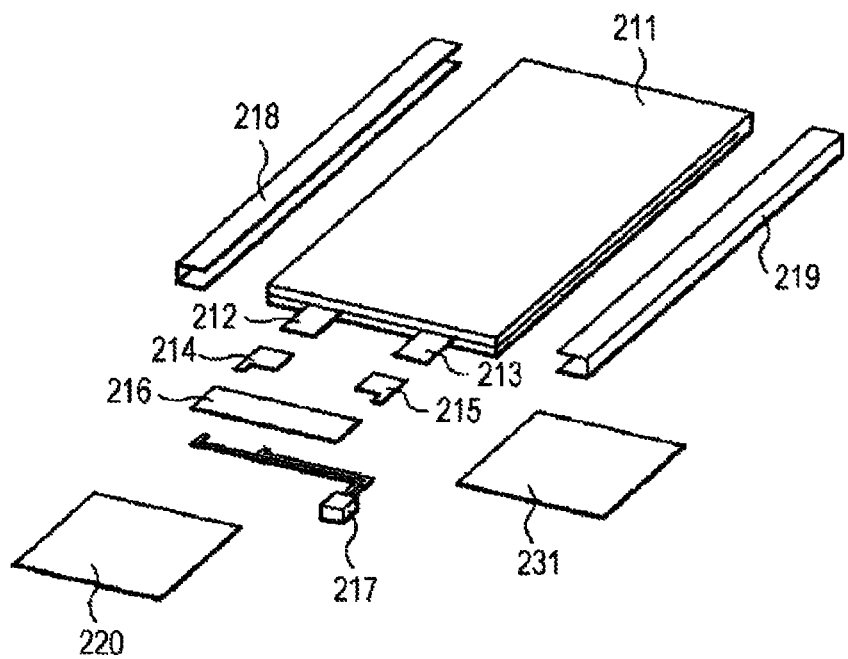
FIG. 8 is a perspective view of a configuration of an application example (a battery pack: a single battery) of a secondary battery.
Figure 9:
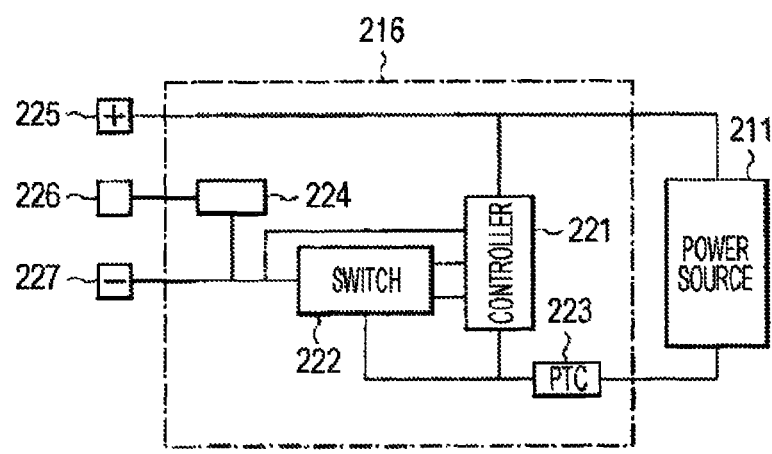
FIG. 9 is a block diagram of the configuration of the battery pack of FIG. 8.

FIG. 8 is a perspective view of a configuration of a battery pack using a single battery. FIG. 9 is a block diagram of the configuration of the battery pack illustrated in FIG. 8. Note that FIG. 8 illustrates the exploded state of the battery pack.

The battery pack described herein is a simple battery pack (a so-called "soft pack") using a single secondary battery, and is built in the electronic equipment typified by, e.g., a smartphone. The battery pack includes a power source 211 as the laminated film type secondary battery similar to that of the first embodiment, and a circuit board 216 connected to the power source 211, as illustrated in, e.g., FIG. 9.

Adhesive tapes 218, 219 in a pair are bonded respectively to both side surfaces of the power source 211. The circuit board 216 is provided with a protection circuit (a protection circuit module (PCM)). The circuit board 216 is connected to positive and negative electrode leads 212, 213 of the power source 211 via a pair of tabs 214, 215, and is connected to a connector lead wire 217 for external connection. Note that the circuit board 216 is vertically protected by a label 220 and an insulating sheet 231 with the circuit board 216 being connected to the power source 211. The label 220 is bonded to fix the circuit board 216, the insulating sheet 231, etc.

Moreover, the battery pack includes the power source 211 and the circuit board 216, as illustrated in, e.g., FIG. 9. The circuit board 216 includes a controller 221, a switch 222, a PTC 223, and a temperature detector 224, for example. The power source 211 is connectable to the outside via a positive electrode terminal 225 and a negative electrode terminal 227, and therefore, is charged/discharged via the positive electrode terminal 225 and the negative electrode terminal 227. The temperature detector 224 is configured to use a temperature detection terminal (a so-called "T-terminal") 226 to detect a temperature.

The controller 221 is configured to control operation (including the use state of the power source 211) of the entire battery pack, and includes, e.g., a central processing unit (CPU) and a memory.

For example, when a battery voltage reaches an overcharge detection voltage, the controller 221 cuts off the switch 222 such that charge current does not flow through a current flow path of the power source 211. Moreover, when great current flows in charging, the controller 221 cuts off the switch 222 to block the charge current, for example.

In addition, when the battery voltage reaches an overdischarge detection voltage, the controller 221 cuts off the switch 222 such that discharge current does not flow through the current flow path of the power source 211, for example. Further, when great current flows in charging, the controller 221 cuts off the switch 222 to block the discharge current, for example.

Note that the overcharge detection voltage of the secondary battery is, e.g., 4.20 V±0.05 V, and the overdischarge detection voltage is, e.g., 2.4 V±0.1 V.

The switch 222 is configured to switch the use state of the power source 211 (whether or not the connection between the power source 211 and external equipment is available) according to the instruction of the controller 221. The switch 222 includes, e.g., a charge control switch and a discharge control switch. The charge control switch and the discharge control switch are semiconductor switches such as field-effect transistors (MOSFETs) using a metal oxide semiconductor, for example. Note that the charge/discharge current is detected on the basis of the ON resistance of the switch 222, for example.

The temperature detector 224 is configured to measure the temperature of the power source 211 to output the measurement result to the controller 221. The temperature detector 224 includes, e.g., a temperature detection element such as a thermistor. Note that the measurement result obtained by the temperature detector 224 is used in the case of performing charge/discharge control by the controller 221 in abnormal heat generation or the case of performing correction processing by the controller 221 in remaining capacity calculation, for example.

Note that the circuit board 216 does not necessarily include the PTC 223. In this case, a PTC element may be additionally provided at the circuit board 216.

5. Fifth Embodiment

Figure 10:
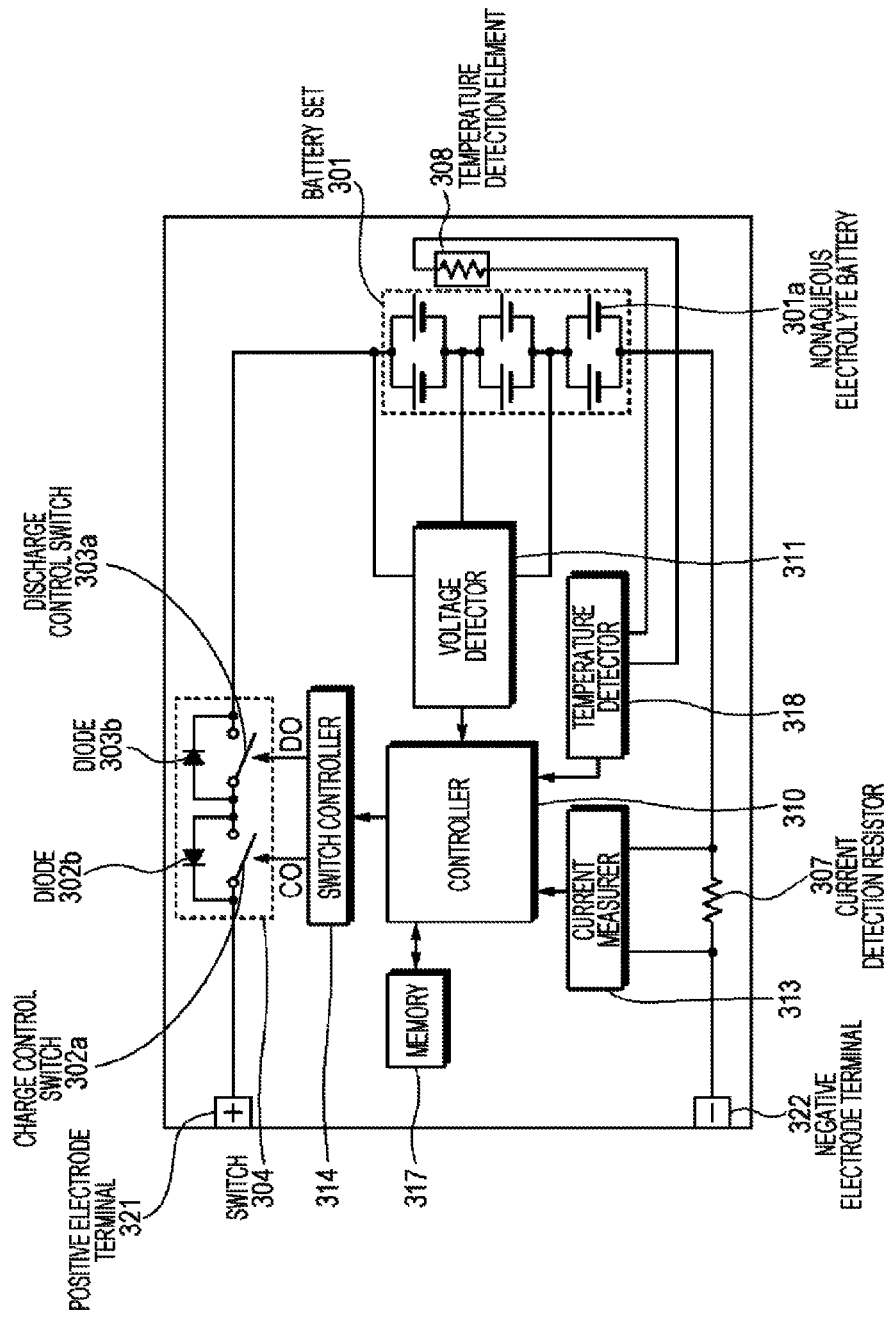
FIG. 10 is a block diagram of a circuit configuration example of a battery pack of still another embodiment of the present technology.

FIG. 10 is a block diagram of a circuit configuration example in the case of applying the batteries (hereinafter referred to as "secondary batteries," as necessary) of the first to third embodiments of the present technology to a battery pack. The battery pack includes a battery set 301, an exterior, a switch 304 with a charge control switch 302a and a discharge control switch 303a, a current detection resistor 307, a temperature detection element 308, and a controller 310.

Moreover, the battery pack further includes a positive electrode terminal 321 and a negative electrode lead 322. In charging, the positive electrode terminal 321 and the negative electrode lead 322 are connected respectively to positive and negative electrode terminals of a charger, and therefore, charging is performed. Moreover, in use of electronic equipment, the positive electrode terminal 321 and the negative electrode lead 322 are connected respectively to positive and negative electrode terminals of the electronic equipment, and therefore, discharging is performed.

The battery set 301 is configured such that a plurality of secondary batteries 301a are connected together in series and/or in parallel. These secondary batteries 301a are the secondary batteries of the present technology. Note that FIG. 10 illustrates the case where six secondary batteries 301a are in two-parallel three-series (2P3S) connection, but other connection methods such as n-parallel m-series ("n" and "m" are integers) connection may be employed.

The switch 304 includes not only the charge control switch 302a and a diode 302b, but also the discharge control switch 303a and a diode 303b. The switch 304 is controlled by the controller 310. The diode 302b has polarity in the reverse direction with respect to the charge current flowing in the direction from the positive electrode terminal 321 toward the battery set 301, and has polarity in the forward direction with respect to the discharge current flowing in the direction from the negative electrode lead 322 toward the battery set 301. The diode 303b has polarity in the forward direction with respect to the charge current, and has polarity in the reverse direction with respect to the discharge current. Note that the switch 304 is provided on the positive (+) side in the present example, but may be provided on the negative (−) side.

The charge control switch 302a is turned OFF when a battery voltage reaches an overcharge detection voltage, and is controlled by a charge/discharge controller such that no charge current flows through a current flow path of the battery set 301. After the charge control switch 302a has been turned OFF, only discharging is available through the diode 302b. Moreover, the charge control switch 302a is turned OFF when great current flows in charging, and is controlled by the controller 310 such that the charge current flowing through the current flow path of the battery set 301 is blocked.

The discharge control switch 303a is turned OFF when the battery voltage reaches an overdischarge detection voltage, and is controlled by the controller 310 such that no discharge current flows through the current flow path of the battery set 301. After the discharge control switch 303a has been turned OFF, only charging is available through the diode 303b. Moreover, the discharge control switch 303a is turned OFF when great current flows in discharging, and is controlled by the controller 310 such that the discharge current flowing through the current flow path of the battery set 301 is blocked.

The temperature detection element 308 is, e.g., a thermistor, and is provided near the battery set 301 to measure the temperature of the battery set 301 to output the measured temperature to the controller 310. A voltage detector 311 is configured to measure the voltage of the battery set 301 and the voltage of each secondary battery 301a forming the battery set 301 and to A/D convert the measured voltages to supply the converted voltages to the controller 310. A current measurer 313 is configured to measure, using the current detection resistor 307, a current to supply the measured current to the controller 310.

A switch controller 314 is configured to control the charge control switch 302a and the discharge control switch 303a of the switch 304 on the basis of the voltages and current input from the voltage detector 311 and the current measurer 313. When the voltage of any of the secondary batteries 301a reaches equal to or lower than the overcharge detection voltage or the overdischarge detection voltage or when great current rapidly flows, the switch controller 314 sends a control signal to the switch 304 to prevent overcharging, over discharging, and overcurrent charging/discharging.

For example, in the case of a lithium ion secondary battery as the secondary battery, the overcharge detection voltage is set at 4.20V±0.05V, and the overdischarge detection voltage is set at 2.4 V±0.1 V, for example.

A semiconductor switch such as a MOSFET can be used as a charge/discharge switch. In this case, a parasitic diode of the MOSFET functions as the diode 302b and the diode 303b. In the case of using a P-channel FET as the charge/discharge switch, the switch controller 314 supplies control signals DO, CO respectively to the charge control switch 302a and the discharge control switch 303a. In the case of using P-channel type switches as the charge control switch 302a and the discharge control switch 303a, these switches are turned ON with the gate potential equal to or lower than the source potential by a predetermined value. That is, in typical charging and discharging, the control signals CO, DO are at a low level, and the charge control switch 302a and the discharge control switch 303a are in an ON state.

Then, for example, in overcharging or overdischarging, the control signals CO, DO are at a high level, and the charge control switch 302a and the discharge control switch 303a are in an OFF state.

A memory 317 includes, e.g., a RAM or a ROM. The memory 317 is, e.g., an erasable programmable read only memory (EPROM) as a non-volatile memory. In the memory 317, e.g., the numeric values calculated by the controller 310 and the internal resistance value, measured at the stage of a manufacturing process, of each secondary battery 301a in the initial state thereof are stored in advance, and can be rewritten as necessary. (Moreover, the full charge capacity of the secondary battery 301a is stored so that a remaining capacity can be calculated by the controller 310, for example.

A temperature detector 318 is configured to measure, using the temperature detection element 308, a temperature to control charging/discharging in abnormal heat generation and make correction in remaining capacity calculation.

<6. Sixth Embodiment>

The above-described batteries of the first to third embodiments of the present technology and the above-described battery packs of the fourth and fifth embodiments of the present technology can be mounted on equipment such as electronic equipment, electric vehicles, and power storage devices, or can be used for supplying power to such equipment.

Examples of the electronic equipment include laptop computers, personal digital assistants (PDAs), mobile phones, cordless handsets, video movie cameras, digital still cameras, electronic books, electronic dictionaries, music players, radios, headphones, game machines, navigation systems, memory cards, pacemakers, hearing aids, electric tools, electric razors, refrigerators, air-conditioners, television sets, stereos, water heaters, microwaves, dish washers, washers, dryers, lighting equipment, toys, medical equipment, robots, load conditioners, and traffic lights.

Moreover, examples of the electric vehicle include railway vehicles, golf carts, electric carts, and electric cars (including hybrid cars). The battery and battery pack of the present technology are used as the power supplies for driving these vehicles or auxiliary power supplies for these vehicles.

Examples of the power storage device include power storage power supplies for buildings such as residences and power generation facilities.

Of the above-described application examples, a specific example of the power storage system using the power storage device to which the above-described battery of the present technology is applied will be described below.

For example, the power storage system is configured as follows. A first power storage system is a power storage system configured such that a power storage device is charged by a power generation device configured to generate power from renewable energy. A second power storage system is a storage system including a power storage device and configured to supply power to the electronic equipment connected to the power storage device. A third power storage system is electronic equipment configured to receive power from a power storage device. These power storage systems are implemented as the systems configured to cooperate with an external power supply network to efficiently supply power.

Moreover, a fourth power storage system is an electric vehicle including a conversion device configured to receive the power supplied from a power storage device to convert the power into the driving force for the vehicle and a control device configured to process information on vehicle control on the basis of information on the power storage device. A fifth power storage system is a power system including a power information transceiver configured to transmit/receive signals to/from other devices via a network and configured to control charging/discharging of the above-described power storage device on the basis of the information received by the transceiver. A sixth power storage system is a power system configured to receive the power supplied from the above-described power storage device or configured to supply power from a power generation device or a power network to the power storage device. The power storage system will be described below.

(6-1) Residential Power Storage System as Application Example

Figure 11:
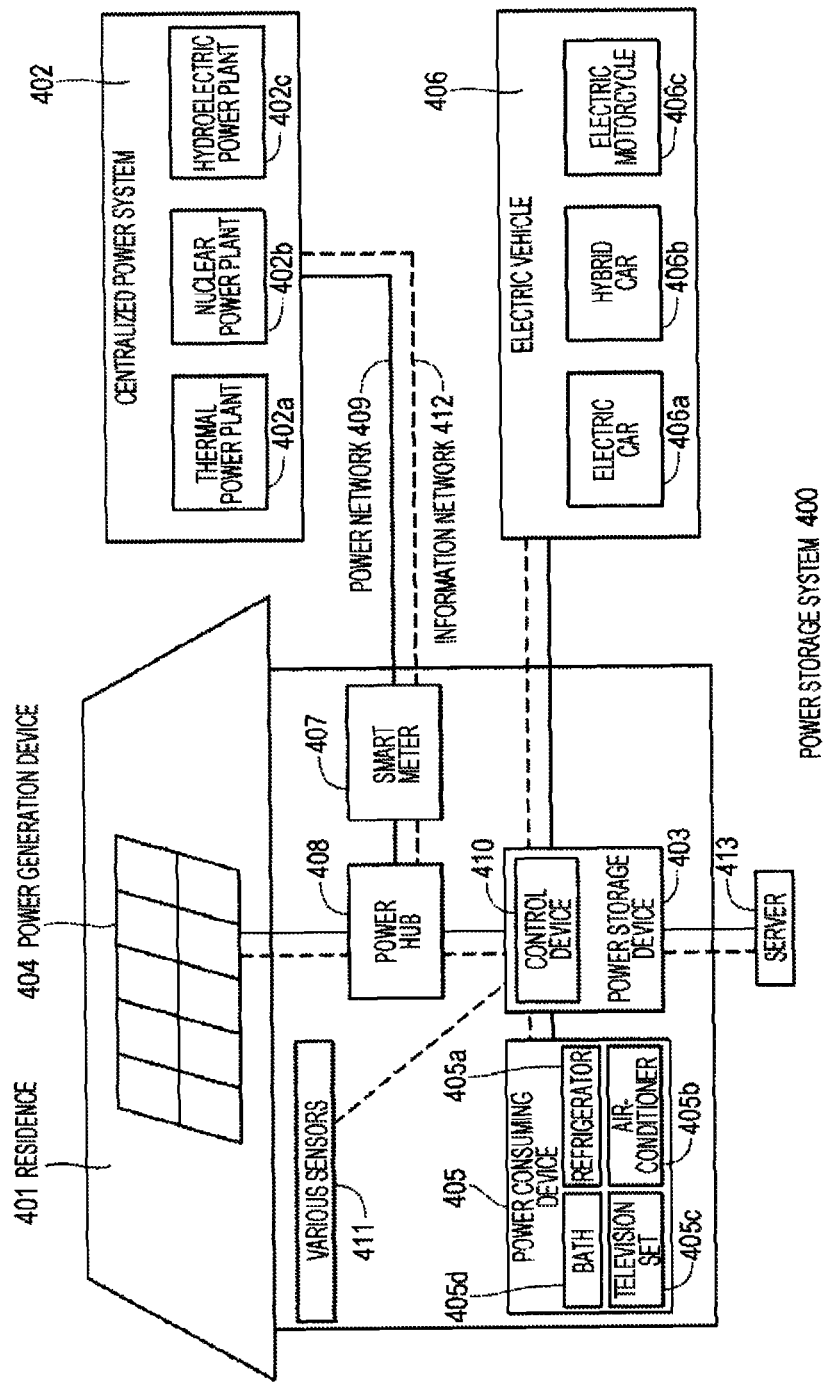
FIG. 11 is a schematic diagram of an example suitable for a residential power storage system using the nonaqueous electrolyte battery of the present technology.

The example where the power storage device using the battery of the present technology is applied to a residential power storage system will be described with reference to FIG. 11. For example, in a power storage system 400 for a residence 401, power is supplied from a centralized power system 402 including, e.g., thermal power generation 402a, nuclear power generation 402b, and hydroelectric power generation 402c to a power storage device 403 via a power network 409, an information network 412, a smart meter 407, a power hub 408, etc. In addition, power is supplied from an independent power supply such as a residential power generation device 404 to the power storage device 403. The power supplied to the power storage device 403 is stored. Using the power storage device 403, the power to be used at the residence 401 is supplied. A similar power storage system can be used not only for the residence 401 but also for buildings.

The residence 401 is provided with the power generation device 404, a power consuming device 405, the power storage device 403, a control device 410 configured to control each device, the smart meter 407, and sensors 411 configured to obtain various types of information. These devices are connected together via the power network 409 and the information network 412. For example, a solar cell or a fuel cell is used as the power generation device 404, and generated power is supplied to the power consuming device 405 and/or the power storage device 403. The power consuming device 405 includes, e.g., a refrigerator 405a, an air-conditioner 405b as an air-conditioning device, a television set 405c as a television receiver, and a bath 405d. The power consuming device 405 further includes an electric vehicle 406. The electric vehicle 406 includes an electric car 406a, a hybrid car 406b, and an electric motorcycle 406c.

The battery of the present technology is applied to the power storage device 403. The battery of the present technology may be, e.g., the above-described lithium ion secondary battery. The smart meter 407 has the function of measuring a commercial power consumption to transmit the measured power consumption to a power company. The power network 409 may be one or a combination of DC power supply, AC power supply, and non-contact power supply.

Various sensors 411 include, e.g., a human sensor, an illuminance sensor, an object detection sensor, a power consumption sensor, a vibration sensor, a contact sensor, a temperature sensor, and an infrared sensor. The information obtained by the various sensors 411 is transmitted to the control device 410. A weather condition, a human condition, etc. are grasped from the information obtained from the sensors 411, and therefore, the power consuming device 405 can be automatically controlled such that energy consumption is suppressed to the minimum. Moreover, the control device 410 can transmit information on the residence 401 to, e.g., an external power company via the Internet.

The power hub 408 performs processing such as branching of a power line and DC-AC conversion. Examples of the method for communication via the information network 412 connected to the control device 410 include the method using a communication interface such as a universal asynchronous receiver-transceiver (a UART), and the method using a sensor network according to wireless communication standards, such as Bluetooth, ZigBee, and Wi-Fi. The Bluetooth method is applied to multimedia communication, and can perform point-to-multipoint communication. The ZigBee uses a physical layer of 802.15.4 of the Institute of Electrical and Electronics Engineers (IEEE). IEEE 802.15.4 is the name of the short-distance wireless communication standard called a "personal area network (PAN)" or a "wireless personal area network (WPAN)."

The control device 410 is connected to an external server 413. The server 413 may be managed by any of the residence 401, a power company, and a service provider. Examples of the information transmitted/received by the server 413 include power consumption information, life pattern information, an electricity rate, weather information, natural disaster information, and information on electricity transaction. These types of information may be transmitted/received by the residential power consuming device (e.g., the television receiver), but may be transmitted/received by a device (e.g., a mobile phone) outside the residence. These types of information may be displayed on the equipment having a display function, such as television receivers, mobile phones, and personal digital assistants (PDAs).

The control device 410 configured to control each section includes, e.g., a central processing unit (CPU), a random access memory (RAM), and a read only memory (ROM). In this example, the control device 410 is housed in the power storage device 403. The control device 410 is, via the information network 412, connected to the power storage device 403, the residential power generation device 404, the power consuming device 405, various sensors 411, and the server 413. The control device 410 has the function of adjusting a commercial power consumption and a commercial power generation amount, for example. Note that the control device 410 may have, e.g., the function of performing electricity transaction at a power market.

As described above, not only the power from the centralized power system 402 including, e.g., the thermal power generation 402a, the nuclear power generation 402b, and the hydroelectric power generation 402c but also the power generated from the residential power generation device 404 (solar power generation, wind power generation, etc.) can be stored in the power storage device 403. Thus, even if the power generated by the residential power generation device 404 changes, the control of outputting a constant amount of power to the outside or discharging only a required amount of power can be performed. For example, the following usage is available: the power obtained by solar power generation is stored in the power storage device 403, cheaper midnight power is stored in the power storage device 403 during a nighttime, and the power stored in the power storage device 403 is discharged and used during a daytime for which an electricity rate is higher.

Note that the example where the control device 410 is housed in the power storage device 403 has been described, and the control device 410 may be housed in the smart meter 407 or may be configured alone. Further, the power storage system 400 may be used for a plurality of residences of a housing complex, or may be used for a plurality of single-family houses.

(6-2) Vehicle Power Storage System as Application Example

Figure 12:
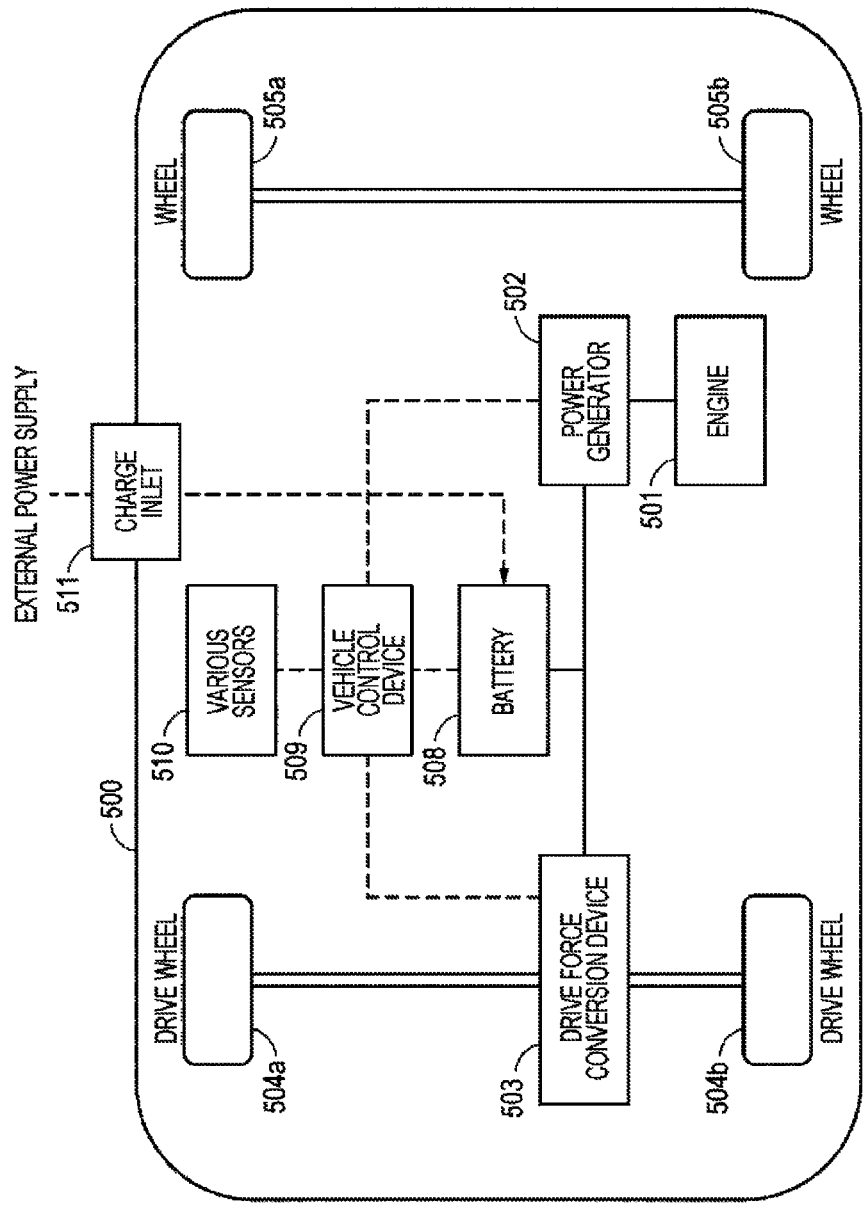
FIG. 12 is a schematic diagram of an example of a configuration of a hybrid vehicle, the hybrid vehicle employing a series hybrid system to which the present technology is applied.

The example where the present technology is applied to a vehicle power storage system will be described with reference to FIG. 12. FIG. 12 schematically illustrates an example of a hybrid vehicle configuration employing a series hybrid system to which the present technology is applied. The series hybrid system is the vehicle using the power generated by a power generator driven by an engine or the power generator's power temporarily stored in a battery to run by a power-to-drive-force conversion device.

A hybrid vehicle 500 includes an engine 501, a power generator 502, a power-to-drive-force conversion device 503, a drive wheel 504a, a drive wheel 504b, a wheel 505a, a wheel 505b, a battery 508, a vehicle control device 509, various sensors 510, and a charge inlet 511. The above-described battery of the present technology is applied to the battery 508.

The hybrid vehicle 500 runs using the power-to-drive-force conversion device 503 as a power source. An example of the power-to-drive-force conversion device 503 is a motor. The power-to-drive-force conversion device 503 is actuated by the power of the battery 508, and the rotation force of the power-to-drive-force conversion device 503 is transmitted to the drive wheels 504a, 504b. Note that DC-to-AC (DC-AC) conversion or inverse conversion (AC-DC conversion) is used for a required section so that the power-to-drive-force conversion device 503 is applicable as an AC motor or a DC motor. The various sensors 510 are configured to control an engine rotation speed via the vehicle control device 509 or control the opening degree of a not-shown throttle valve (a throttle opening degree). The various sensors 510 include a speed sensor, an acceleration sensor, and an engine rotation speed sensor, for example.

The rotation force of the engine 501 is transmitted to the power generator 502, and the power generated by such rotation force of the power generator 502 can be stored in the battery 508.

When the hybrid vehicle 500 decelerates by a not-shown braking mechanism, resistance in such deceleration is added to the power-to-drive-force conversion device 503 as rotation force, and the regenerative power generated by such rotation force of the power-to-drive-force conversion device 503 is stored in the battery 508.

The battery 508 is connected to a power supply outside the hybrid vehicle 500 to receive the power supplied from the external power supply via the charge inlet 511 as an inlet port, and the received power can be stored.

Although not shown, an information processing device configured to process information on vehicle control on the basis of information on the secondary battery may be provided. Examples of the information processing device include an information processing device configured to display a remaining battery capacity on the basis of information on a remaining battery capacity.

Note that the series hybrid vehicle configured to use the power generated by the power generator driven by the engine or the power generator's power temporarily stored in the battery to run by the motor has been described as an example. However, the present technology is also effectively applicable to a parallel hybrid vehicle using both of engine output and motor output as a drive source and configured to switch, as necessary, among three modes of running only by an engine, running only by a motor, and running by the engine and the motor. Further, the present technology is also effectively applicable to a so-called "electric vehicle" configured to run by driving using only a drive motor without using an engine.

EXAMPLES

The present technology will be described below in detail with reference to examples. Note that the present technology is not limited to the configurations of the examples described below.

Example <1-1>

[Production of Positive Electrode]

A positive electrode mixture was prepared in such a manner that 91 mass % of lithium cobalt oxide ($LiCoO_2$) particles (particle size D50: 10 μm) as a positive electrode active material, 6 mass % of carbon black as a conductive agent, and 3 mass % of polyvinylidene fluoride (PVdF) as a binder are mixed together. Such a positive electrode mixture was dispersed in a dispersion medium of N-methyl-2-pyrrolidone (NMP), and as a result, a positive electrode mixture slurry was prepared.

The positive electrode mixture slurry was applied to both surfaces of a positive electrode current collector formed of band-shaped aluminum foil having a thickness of 12 μm such that part of the positive electrode current collector is exposed. Subsequently, the dispersion medium of the applied positive electrode mixture slurry was evaporated and dried, and then, was compressed and molded by roll pressing. As a result, a positive electrode active material layer was formed. Eventually, a positive electrode terminal was attached to the exposed portion of the positive electrode current collector. In this manner, a positive electrode was formed.

[Production of Negative Electrode]

A negative electrode mixture was prepared in such a manner that 96 mass % of granular graphite particles (particle size D50: 20 μm) as a negative electrode active material, 1.5 mass % of an acrylic acid modified product of styrene-butadiene copolymer as a binder, and 1.5 mass % of carboxymethyl cellulose as a thickener are mixed together. A proper amount of water was further added to the negative electrode mixture, and then, the resultant was stirred. As a result, a negative electrode mixture slurry was prepared.

The negative electrode mixture slurry was applied to both surfaces of a negative electrode current collector formed of band-shaped copper foil having a thickness of 15 μm such that part of the negative electrode current collector is exposed. Subsequently, the dispersion medium of the applied negative electrode mixture slurry was evaporated and dried, and then, was compressed and molded by roll pressing. As a result, a negative electrode active material layer was formed. Eventually, a negative electrode terminal was attached to the exposed portion of the positive electrode current collector. In this manner, a negative electrode was formed.

Note that at least any of a press density (the area density of the active material layer after roll pressing) and an active material amount is adjusted so that the capacity area density ($mAh/cm^2$) of the negative electrode active material layer and the capacity area density ($mAh/cm^2$) of a gap in the negative electrode active material layer can be adjusted to desired values.

[Production of Separator]

A microporous film (a polyethylene separator) made of polyethylene (PE) and having a thickness of 5 μm was prepared as a separator.

[Formation of Electrolyte Layer]

Lithium hexafluorophosphate ($LiPF_6$) as electrolyte salt was dissolved in a nonaqueous solvent mixed with ethylene carbon (EC) and propylene carbonate (PC). In this manner, a nonaqueous electrolyte solution was prepared.

Using polyvinylidene fluoride (PVdF) as a matrix polymer compound (resin) for holding the nonaqueous electrolyte solution, the nonaqueous electrolyte solution, the polyvinylidene fluoride, dimethyl carbonate (DMC) as a diluent solvent, and boehmite particles (particle size D50: 1 μm) as solid particles were mixed together to prepare a coating solution in a sol form.

Then, the coating solution was, in a heated state, applied to both surfaces of each of the positive and negative electrodes, and was dried such that the diluent solvent (DMC) is removed. In this manner, an electrolyte layer in a gel form was formed on each surface of the positive and negative electrodes. Since the coating solution is applied in the heated state, the recess among adjacent active material particles positioned in an outermost surface portion of each active material layer and the inside of each active material layer can be impregnated with the electrolyte containing the borhmite as the solid particles. At this point, the solid particles are filtered by the recess among adjacent particles, and therefore, there is a concentration difference between a recess impregnation region A and a deep region C. In Example 1-1, a solid particle concentration is higher in a negative electrode side recess impregnation region A than in a negative electrode side deep region C, and is higher in a positive electrode side recess impregnation region A than in a positive electrode side deep region C. Note that the composition of the electrolyte layer in the gel form contains, in terms of mass percentage to the total amount of the electrolyte layer in the gel form, 10 mass % of the solid particles, 5 mass % of the resin (PVdF), 25 mass % of EC, 50 mass % of PC, and 10 mass % of $LiPF_6$. Moreover, the solid particle concentration is 10 volume %.

[Assembly of Laminated Film Type Battery]

The positive electrode formed with the electrolyte layers on both surfaces thereof, the negative electrode formed with the electrolyte layers on both surfaces thereof, and the separators were stacked on each other in the order of the positive electrode, the separator, the negative electrode, and the separator. Then, such a stack was, in the longitudinal direction thereof, wound several times in a flat shape. Subsequently, a winding end portion of the resultant was fixed with an adhesive tape. In this manner, a winding electrode body was formed.

Next, the winding electrode body was wrapped with the laminated film having a soft aluminum layer. Of the sides of the laminated film around the winding electrode body, the sides from which positive and negative terminals protrude was thermally fused under reduced pressure, and two remaining sides were thermally fused under reduced pressure. As a result, the winding electrode body was sealed. In this manner, a laminated film type battery in a battery shape with a thickness of 4.5 mm, a width of 30 mm, and a height of 50 mm as illustrated in FIG. 1 was produced.

<Example 1-2> to <Example 1-10> and <Comparative Example 1-1> to <Comparative Example 1-2>

In production of a negative electrode, the amount of a negative electrode active material was changed without changing a press density such that the capacity area density ($mAh/cm^2$) of a negative electrode active material layer is adjusted as shown in Table 1 below. Note that in the case of a smaller thickness, the electrode was extended such that the outer dimensions of a battery are identical to those of Example 1-1. Moreover, in the case of a greater thickness, the electrode was shortened such that the outer dimensions of the battery are identical to those of Example 1-1. Each example is similar to Example 1-1, except for the above. For each example, the laminated film type battery was produced.

<Example 1-11> to <Example 1-20> and <Comparative Example 1-3> to <Comparative Example 1-4>

In production of a negative electrode, the amount of an active material of a negative electrode active material layer and the press density of the negative electrode active material layer were changed such that the capacity area density ($mAh/cm^2$) of a gap in the negative electrode active material layer is adjusted as shown in Table 1 below. Note that in the case of a smaller thickness, the electrode was extended such that the outer dimensions of a battery are identical to those of Example 1-1. Moreover, in the case of a greater thickness, the electrode was shortened such that the outer dimensions of the battery are identical to those of Example 1-1. Each example is similar to Example 1-1, except for the above. For each example, the laminated film type battery was produced.

<Example 1-21> to <Example 1-28>

The composition (the mass ratio) of an electrolyte other than solid particles was fixed at $PVdF:EC:PC:LiPF_6=5:25:45:15$, and the particle concentration of the solid particles was changed as shown in Table 1 below without changing the total volume of the electrolyte. Each example is similar to Example 1-1, except for the above. For each example, a laminated film type battery was produced.

<Comparative Example 1-5>

Comparative Example 1-5 is similar to Example 1-1, except that an electrolyte contains no solid particles. For such a comparative example, a laminated film type battery was produced.

<Comparative Example 1-6>

An electrolyte contained no solid particles. In production of a negative electrode, the amount of an active material of the negative electrode and the press density of the negative electrode were changed such that the capacity area density ($mAh/cm^2$) of a gap in a negative electrode active material layer is adjusted as shown in Table 1 below. Note that in the case of a smaller thickness, the electrode was extended such that the outer dimensions of a battery are identical to those of Example 1-1. Moreover, in the case of a greater thickness, the electrode was shortened such that the outer dimensions of the battery are identical to those of Example 1-1. Comparative Example 1-6 is similar to Example 1-1, except for the above. For such an example, the laminated film type battery was produced.

(Measurement of Size of Particle, Measurement of BET Specific Surface Area)

In the above-described examples and comparative examples, a particle size and a BET specific surface area were measured or evaluated as follows (the same applies to examples and comparative examples described later).

(Measurement of Particle Size)

The following particle size was taken as a particle size D50: the particle size corresponding to 50% in the volume-based cumulative particle size distribution measured from a smaller particle size side, the particle size distribution being obtained in such a manner that solid particles are measured by laser diffraction after electrolyte components etc. have been removed from an electrolyte layer. Note that if necessary, the value of a particle size D95 corresponding to 95% in the above-described volume-based cumulative particle size distribution was also obtained. Similar measurement was performed for the active material particles obtained after other components than the active material have been removed from the active material layer.

(Measurement of BET Specific Surface Area)

For the solid particles obtained after the electrolyte components etc. have been removed from the electrolyte layer, the BET specific surface area ($m^2/g$) was obtained using a BET specific surface area measurement device.

(Measurement of Solid Particle Concentration)

Using an SEM, four points were observed within an observation field range of 50 µm. In each observation field, the particle concentration between the electrode and the separator was measured. For an observation field of 2 µm×2 µm, the particle concentration was obtained by the area percentage of the total particle cross-sectional area ("Total Particle Cross-Sectional Area"/"Area in Observation Field"×1000). The average of the particle concentrations obtained for four points was taken as the solid particle concentration.

(Measurement of Capacity Area Density ($mAh/cm^2$) of Negative Electrode Active Material Layer)

The capacity area density ($mAh/cm^2$) of the negative electrode active material layer is defined by the negative electrode active material layer on one surface of the electrode, the negative electrode active material layer being formed on one or both surfaces of the negative electrode current collector. The negative electrode obtained by disassembly of the fully-charged battery before cycle repetition was punch out to a circular shape, and then, Li metal was disposed opposing to such a negative electrode with a separator being interposed therebetween. Then, a coin cell was produced using an electrolyte (typically, e.g., EC: 20 mass %/DEC: 65 mass %/LiPF$_6$: 15 mass %). Next, a capacity (mAh) was measured when Li ions have been dedoped from the negative electrode at a constant current of 0.2 mA until 1.5 V, and a value was obtained by dividing the capacity by the area (cm$^2$) of the negative electrode. The electrode configured such that the active material layer is disposed only on one side was used, and the value per side of the electrode was obtained.

(Measurement of Capacity Area Density (mAh/cm$^2$) of Gap in Negative Electrode Active Material Layer)

For the capacity area density (mAh/cm$^2$) of the gap in the negative electrode active material layer, the porosity of the above-described electrode was measured using a mercury porosimeter. The capacity area density (mAh/cm$^2$) of the gap in the negative electrode active material layer was obtained by dividing the above-described capacity area density (mAh/cm$^2$) of the negative electrode active material layer by the porosity (Negative Electrode Active Material Layer Capacity Area Density (mAh/cm$^2$)/Porosity).

(Battery Evaluation: Battery Performance Evaluation using Volume Energy Density as Index)

For the produced battery, constant current/constant voltage charging at 5 A/4.2 V was performed for one hour in total, and then, constant current discharging was performed at 0.5 A until 3 V. Such a cycle was repeated 300 times. The electric energy obtained from a discharge capacity (mAh) and an average discharge voltage (V) at the 300th cycle was divided by a battery volume (liters), and as a result, a volume energy density was obtained. Note that using the volume energy density as the index for battery performance evaluation, not only superiority or inferiority in battery performance becomes clear, but also a required index for electrode design is clearly set even in the case of batteries with different sizes. Note that an initial volume energy density (an initial capacity) (Wh/L) was obtained as follows: an electric energy was obtained from a discharge capacity (mAh) and an average discharge voltage (V) at the 1st cycle, and then, was divided by a battery volume (liters).

Determination criteria in battery evaluation are as follows:

(Determination Criteria in Initial Volume Energy Density (Wh/L))

Successful: equal to or higher than 490 (Wh/L)
Not Successful: less than 490 (Wh/L)

(Determination Criteria in Volume Energy Density (Wh/L) after 300 Cycles)

Excellent: exceeding 510 (Wh/L)
Good: exceeding 480 (Wh/L) and equal to or lower than 510 (Wh/L)
Acceptable: exceeding 450 (Wh/L) and equal to or lower than 480 (Wh/L)
Not Successful: lower than 450 (Wh/L)

Table 1 shows evaluation results.

TABLE 1

| | Solid Particle | | | | Capacity Area Density of Negative Electrode Active Material Layer [mAh/cm$^2$] | Capacity Area Density of Gap in Negative Electrode Active Material Layer [mAh/cm$^2$] | Evaluation | | | |
|---|---|---|---|---|---|---|---|---|---|---|
| | | | | | | | Initial | | Quick Charging (After 300 Cycles) | |
| | Material Type | Concentration [Volume %] | Particle Size (D50) [μm] | BET Specific Surface Area [m$^2$/g] | | | Volume Energy Density [Wh/L] | Result | Volume Energy Density [Wh/L] | Result |
| Example 1-2 | Boehmite | 10 | 1 | 6 | 2.2 | 7.3 | 526 | Successful | 463 | Acceptable |
| Example 1-3 | Boehmite | 10 | 1 | 6 | 2.5 | 8.3 | 547 | Successful | 481 | Good |
| Example 1-4 | Boehmite | 10 | 1 | 6 | 3.0 | 10.0 | 574 | Successful | 505 | Good |
| Example 1-1 | Boehmite | 10 | 1 | 6 | 4.0 | 13.3 | 612 | Successful | 527 | Excellent |
| Example 1-5 | Boehmite | 10 | 1 | 6 | 5.0 | 16.7 | 638 | Successful | 529 | Excellent |
| Example 1-6 | Boehmite | 10 | 1 | 6 | 6.0 | 20.0 | 656 | Successful | 525 | Excellent |
| Example 1-7 | Boehmite | 10 | 1 | 6 | 7.0 | 23.3 | 670 | Successful | 516 | Excellent |
| Example 1-8 | Boehmite | 10 | 1 | 6 | 8.0 | 26.7 | 680 | Successful | 503 | Good |
| Example 1-9 | Boehmite | 10 | 1 | 6 | 9.0 | 30.0 | 689 | Successful | 482 | Good |
| Example 1-10 | Boehmite | 10 | 1 | 6 | 10.0 | 33.3 | 696 | Successful | 452 | Acceptable |
| Comparative Example 1-1 | Boehmite | 10 | 1 | 6 | 2.0 | 6.7 | 510 | Not Successful | 449 | Not Successful |
| Comparative Example 1-2 | Boehmite | 10 | 1 | 6 | 10.5 | 35.0 | 699 | Successful | 384 | Not Successful |
| Example 1-11 | Boehmite | 10 | 1 | 6 | 2.2 | 5.9 | 490 | Successful | 451 | Acceptable |
| Example 1-12 | Boehmite | 10 | 1 | 6 | 2.2 | 7.3 | 526 | Successful | 463 | Acceptable |
| Example 1-13 | Boehmite | 10 | 1 | 6 | 2.5 | 8.3 | 547 | Successful | 481 | Good |
| Example 1-14 | Boehmite | 10 | 1 | 6 | 3.0 | 10.0 | 574 | Successful | 505 | Good |
| Example 1-1 | Boehmite | 10 | 1 | 6 | 4.0 | 13.3 | 612 | Successful | 527 | Excellent |
| Example 1-15 | Boehmite | 10 | 1 | 6 | 5.0 | 16.7 | 638 | Successful | 529 | Excellent |
| Example 1-16 | Boehmite | 10 | 1 | 6 | 6.0 | 20.0 | 656 | Successful | 525 | Excellent |
| Example 1-17 | Boehmite | 10 | 1 | 6 | 7.0 | 23.3 | 670 | Successful | 516 | Excellent |
| Example 1-18 | Boehmite | 10 | 1 | 6 | 8.0 | 32.0 | 680 | Successful | 503 | Good |
| Example 1-19 | Boehmite | 10 | 1 | 6 | 9.0 | 45.0 | 689 | Successful | 482 | Good |
| Example 1-20 | Boehmite | 10 | 1 | 6 | 10.0 | 66.7 | 696 | Successful | 466 | Acceptable |
| Comparative Example 1-3 | Boehmite | 10 | 1 | 6 | 2.2 | 5.4 | 433 | Not Successful | 399 | Not Successful |
| Comparative Example 1-4 | Boehmite | 10 | 1 | 6 | 10.0 | 71.4 | 696 | Successful | 397 | Not Successful |
| Example 1-21 | Boehmite | 1 | 1 | 6 | 4.0 | 13.3 | 612 | Successful | 459 | Acceptable |
| Example 1-22 | Boehmite | 2 | 1 | 6 | 4.0 | 13.3 | 612 | Successful | 502 | Good |

TABLE 1-continued

| | Solid Particle | | | | Capacity Area Density of Negative Electrode Active Material Layer [mAh/cm²] | Capacity Area Density of Gap in Negative Electrode Active Material Layer [mAh/cm²] | Evaluation | | | |
|---|---|---|---|---|---|---|---|---|---|---|
| | | | | | | | Initial | | Quick Charging (After 300 Cycles) | |
| | Material Type | Concentration [Volume %] | Particle Size (D50) [μm] | BET Specific Surface Area [m²/g] | | | Volume Energy Density [Wh/L] | Result | Volume Energy Density [Wh/L] | Result |
| Example 1-23 | Boehmite | 3 | 1 | 6 | 4.0 | 13.3 | 612 | Successful | 514 | Excellent |
| Example 1-24 | Boehmite | 5 | 1 | 6 | 4.0 | 13.3 | 612 | Successful | 520 | Excellent |
| Example 1-1 | Boehmite | 10 | 1 | 6 | 4.0 | 13.3 | 612 | Successful | 527 | Excellent |
| Example 1-25 | Boehmite | 20 | 1 | 6 | 4.0 | 13.3 | 612 | Successful | 520 | Excellent |
| Example 1-26 | Boehmite | 30 | 1 | 6 | 4.0 | 13.3 | 612 | Successful | 514 | Excellent |
| Example 1-27 | Boehmite | 40 | 1 | 6 | 4.0 | 13.3 | 612 | Successful | 502 | Good |
| Example 1-28 | Boehmite | 50 | 1 | 6 | 4.0 | 13.3 | 612 | Successful | 459 | Acceptable |
| Comparative Example 1-5 | Additive-Free | — | — | — | 4.0 | 13.3 | 612 | Successful | 306 | Not Successful |
| Comparative Example 1-6 | Additive-Free | — | — | — | 1.5 | 5.0 | 459 | Not Successful | 413 | Not Successful |

As shown in Table 1, in Examples 1-1 to Examples 1-28, proper electrode design was made, and the solid particles were contained in the electrolyte. Thus, the initial volume energy density was high, and a high volume energy density can be maintained even after repeated quick charging.

<Example 2-1>

As in Example 1-1, a laminated film type battery was produced.

<Example 2-2> to <Example 2-36>

These examples are similar to Example 2-1, except that a solid particle material type was changed as shown in Table 2 below. For each example, a laminated film type battery was produced.

(Battery Evaluation)

For the produced battery of each example, battery performance was, as in Example 1-1, evaluated using a volume energy density as an index.

Table 2 shows evaluation results.

TABLE 2

| | Solid Particle | | Evaluation Quick Charging (After 300 Cycles) | |
|---|---|---|---|---|
| | Material Type | Concentration [Volume %] | Volume Energy Density [Wh/L] | Result |
| Example 2-1 | Boehmite | 10 | 527 | Excellent |
| Example 2-2 | Talc | | 520 | Excellent |
| Example 2-3 | Aluminum Oxide | | 453 | Acceptable |
| Example 2-4 | Barium Titanate | | 453 | Acceptable |
| Example 2-5 | Magnesium Sulfate | | 490 | Good |
| Example 2-6 | Calcium Sulfate | | 484 | Good |
| Example 2-7 | Barium Sulfate | | 490 | Good |
| Example 2-8 | Strontium Sulfate | | 496 | Good |
| Example 2-9 | Magnesium Hydroxide | | 520 | Excellent |
| Example 2-10 | Aluminum Hydroxide | | 514 | Excellent |
| Example 2-11 | Zinc Hydroxide | | 514 | Excellent |
| Example 2-12 | Lithium Fluoride | | 484 | Good |
| Example 2-13 | Aluminum Fluoride | | 490 | Good |
| Example 2-14 | Calcium Fluoride | | 496 | Good |
| Example 2-15 | Barium Fluoride | | 490 | Good |
| Example 2-16 | Magnesium Fluoride | | 496 | Good |
| Example 2-17 | Diamond | | 484 | Good |
| Example 2-18 | Trilithium Phosphate | | 490 | Good |
| Example 2-19 | Magnesium Phosphate | | 496 | Good |
| Example 2-20 | Magnesium Hydrogenphosphate | | 490 | Good |
| Example 2-21 | Calcium Silicate | | 484 | Good |
| Example 2-22 | Hydrotalcite | | 520 | Excellent |
| Example 2-23 | Kaolinite | | 502 | Good |
| Example 2-24 | Sepiolite | | 502 | Good |
| Example 2-25 | Imogolite | | 508 | Good |
| Example 2-26 | Sericite | | 520 | Excellent |
| Example 2-27 | Pyrophyllite | | 520 | Excellent |
| Example 2-28 | Mica | | 520 | Excellent |
| Example 2-29 | Zeolite | | 520 | Excellent |
| Example 2-30 | Saponite | | 502 | Good |
| Example 2-31 | Attapulgite | | 508 | Good |
| Example 2-32 | Montmorillonite | | 502 | Good |
| Example 2-33 | Ammonium Polyphosphate | | 484 | Good |
| Example 2-34 | Melamine Cyanurate | | 490 | Good |
| Example 2-35 | Melamine Polyphosphate | | 484 | Good |
| Example 2-36 | Polyolefin Beads | | 490 | Good |

Capacity Area Density of Negative Electrode Active Material Layer: 4.0 mAh/cm²
Capacity Area Density of Gap in Negative Electrode Active Material Layer: 13.3 mAh/cm²
Initial Capacity: 612 Wh/L As shown in Table 2, in Examples 2-1 to Examples 2-36, proper electrode design was made, and the solid particles were contained in the electrolyte. Thus, the initial volume energy density was high, and a high volume energy density can be maintained even after repeated quick charging.

<Example 3-1>

As in Example 3-1, a laminated film type battery was produced.

<Example 3-2> to <Example 3-6>

The composition (the mass ratio) of the electrolyte other than electrolyte salt ($LIPF_6$) was fixed at PVdF:EC:PC=10:5:25:45, and the concentration (the mass ratio) of $LIPF_6$ was changed as shown in Table 1 below without changing the total volume of the electrolyte. Each example is similar to Example 1-1, except for the above. For each example, a laminated film type battery was produced.

(Battery Evaluation)

For the produced battery of each example, battery performance was, as in Example 1-1, evaluated using a volume energy density as an index.

Table 3 shows evaluation results.

<Example 4-2>

Example 4-2 is similar to Example 4-1, except that electrolyte layers in a gel form were only formed respectively on both surfaces of a negative electrode. For Example 4-2, a laminated film type battery was produced.

<Example 4-3>

Example 4-3 is similar to Example 4-1, except that electrolyte layers in a gel form were only formed respectively on both surfaces of a positive electrode. For Example 4-3, a laminated film type battery was produced.

<Example 4-4>

Example 4-4 is similar to Example 1-1, except that electrolyte layers in a gel form were formed respectively on both principal surfaces of a separator instead of forming electrolyte layers in a gel form on electrodes. For Example 4-4, a laminated film type battery was produced. Note that in this example, a majority of the solid particles contained in the electrolyte layers formed on the surfaces of the separator do not enter the recess among adjacent active material particles positioned in an outermost active material layer

TABLE 3

| | Solid Particle | | | | Capacity Area Density of Negative Electrode Active Material Layer [mAh/cm$^2$] | Capacity Area Density of Gap in Negative Electrode Active Material Layer [mAh/cm$^2$] | Salt Concentration [Mass %] | Evaluation | | | |
|---|---|---|---|---|---|---|---|---|---|---|---|
| | | | | | | | | Initial | | Quick Charging (After 300 Cycles) | |
| | Material Type | Concentration [Volume %] | Particle Size (D50) [μm] | BET Specific Surface Area [m$^2$/g] | | | | Volume Energy Density [Wh/L] | Result | Volume Energy Density [Wh/L] | Result |
| Example 3-2 | Boehmite | 11 | 1 | 6 | 4.0 | 13.3 | 10.0 | 612 | Successful | 484 | Good |
| Example 3-3 | Boehmite | 10 | 1 | 6 | 4.0 | 13.3 | 12.0 | 612 | Successful | 514 | Excellent |
| Example 3-1 | Boehmite | 10 | 1 | 6 | 4.0 | 13.3 | 15.0 | 612 | Successful | 527 | Excellent |
| Example 3-4 | Boehmite | 9 | 1 | 6 | 4.0 | 13.3 | 20.0 | 612 | Successful | 539 | Excellent |
| Example 3-5 | Boehmite | 8 | 1 | 6 | 4.0 | 13.3 | 30.0 | 612 | Successful | 502 | Good |
| Example 3-6 | Boehmite | 7 | 1 | 6 | 4.0 | 13.3 | 40.0 | 612 | Successful | 471 | Acceptable |

As shown in Table 3, in Examples 3-2 to Examples 3-6, proper electrode design was made, and the solid particles were contained in the electrolyte. Thus, the initial volume energy density was high, and a high volume energy density can be maintained even after repeated quick charging.

<Example 4-1>

As in Example 1-1, a laminated film type battery was produced.

surface portion, and therefore, a solid particle concentration in a recess impregnation region A is low.

(Battery Evaluation)

For the produced battery of each example, battery performance was, as in Example 1-1, evaluated using a volume energy density as an index.

Table 4 shows evaluation results.

TABLE 4

| | Solid Particle | | | Evaluation Quick Charging (After 300 Cycles) | |
|---|---|---|---|---|---|
| | | | | Volume Energy | |
| | Material Type | Concentration [Volume %] | Arrangement | Density [Wh/L] | Result |
| Example 4-1 | Boehmite | 10 | Between Separator and Positive Electrode (Arrangement in which Particle Concentration is Higher in Positive Electrode Side Recess Region than in Positive Electrode Side Deep Region) Between Separator and Negative Electrode (Arrangement in which Particle Concentration is Higher in Negative Electrode Side Recess Region than in Negative Electrode Side Deep Region) | 527 | Excellent |

TABLE 4-continued

|  | Solid Particle | | | Evaluation Quick Charging (After 300 Cycles) | |
|---|---|---|---|---|---|
|  | Material Type | Concentration [Volume %] | Arrangement | Volume Energy Density [Wh/L] | Result |
| Example 4-2 |  | 10 | Between Separator and Negative Electrode (Arrangement in which Particle Concentration is Higher in Negative Electrode Side Recess Region than in Negative Electrode Side Deep Region) | 484 | Good |
| Example 4-3 |  | 10 | Between Separator and Positive Electrode (Arrangement in which Particle Concentration is Higher in Positive Electrode Side Recess Region than in Positive Electrode Side Deep Region) | 490 | Good |
| Example 4-4 |  | 10 | Between Separator and Positive Electrode Between Separator and Negative Electrode | 496 | Good |

Capacity Area Density of Negative Electrode Active Material Layer: 4.0 mAh/cm$^2$
Capacity Area Density of Gap in Negative Electrode Active Material Layer: 13.3 mAh/cm$^2$
Initial Capacity: 612 Wh/L As shown in Table 4, in Examples 4-1 to Examples 4-4, proper electrode design was made, and the solid particles were contained in the electrolyte. Thus, the initial volume energy density was high, and a high volume energy density can be maintained even after repeated quick charging.

<Example 5-1>

As in Example 1-1, a laminated film type battery was produced.

<Example 5-2 to Example 5-11>

These examples are similar to Example 5-1, except that the particle size and the BET specific surface area of solid particles were changed as shown in Table 5 below. For each example, a laminated film type battery was produced. Note that in Example 5-2, the solid particles adjusted as follows were used: solid particles with a particle size of a 2/√3−1 fold (0.15 μm) of a negative electrode active material particle size D50 were added as some solid particles such that a solid particle size D95 is adjusted to a 2/√3−1 fold (0.15 μm) of the negative electrode active material particle size D50. Thus, the clearance among particles in a recess bottom portion was filled with some solid particles with a larger particle size, and therefore, the solid particles can be easily filtered.

(Battery Evaluation)

For the produced battery of each example, battery performance was, as in Example 1-1, evaluated using a volume energy density as an index.

Table 5 shows evaluation results.

TABLE 5

|  | Solid Particle | | | | Evaluation Quick Charging (After 300 Cycles) | |
|---|---|---|---|---|---|---|
|  | Material Type | Concentration [Volume %] | Particle Size (D50) [μm] | BET Specific Surface Area [m$^2$/g] | Volume Energy Density [Wh/L] | Result |
| Example 5-1 | Boehmite | 10 | 1 | 6 | 527 | Excellent |
| Example 5-2 | Boehmite |  | 0.1 | 60 | 470 | Acceptable |
| Example 5-3 | Boehmite |  | 0.2 | 40 | 490 | Good |
| Example 5-4 | Boehmite |  | 0.3 | 20 | 510 | Excellent |
| Example 5-5 | Boehmite |  | 0.5 | 15 | 516 | Excellent |
| Example 5-6 | Boehmite |  | 0.7 | 12 | 522 | Excellent |
| Example 5-7 | Boehmite |  | 2 | 3 | 522 | Excellent |
| Example 5-8 | Boehmite |  | 3 | 2 | 516 | Excellent |
| Example 5-9 | Boehmite |  | 5 | 1.5 | 510 | Excellent |
| Example 5-10 | Boehmite |  | 7 | 1.2 | 490 | Good |
| Example 5-11 | Boehmite |  | 10 | 1.0 | 470 | Acceptable |

Capacity Area Density of Negative Electrode Active Material Layer: 4.0 mAh/cm$^2$
Capacity Area Density of Gap in Negative Electrode Active Material Layer: 13.3 mAh/cm$^2$
Initial Capacity: 612 Wh/L As shown in Table 5, in Examples 5-1 to Examples 5-11, proper electrode design was made, and the solid particles were contained in the electrolyte. Thus, the initial volume energy density was high, and a high volume energy density can be maintained even after repeated quick charging.

<Example 6-1>

As in Example 1-1, a laminated film type battery was produced.

<Example 6-2>

Example 6-2 is similar to Example 6-1, except that the electrolyte layers containing solid particles and formed in a gel form were only formed respectively on both surfaces of a positive electrode. For Example 6-2, a laminated film type battery was produced.

<Example 6-3>

Example 6-3 is similar to Example 6-1, except that the electrolyte layers containing solid particles and formed in a gel form were only formed respectively on both surfaces of a negative electrode. For Example 6-3, a laminated film type battery was produced.

<Example 6-4>

Example 6-4 is similar to Example 6-1, except that the electrolyte layers containing solid particles and formed in a gel form were formed respectively on both surfaces of a separator instead of forming, on electrodes, the electrolyte layers containing solid particles and formed in a gel form. For Example 6-4, a laminated film type battery was produced.

<Example 6-5>

As in Example 6-1, positive and negative electrodes were first produced, and then, separators were prepared.

(Formation of Solid Particle Layer)

Next, 22 mass % of solid particles, 3 mass of PVdF as a binder polymer compound, and 75 mass % of NMP as a solvent were mixed together to prepare paint, and then, the paint was applied to both surfaces of each separator. Then, the solvent was removed by drying.

Next, the positive and negative electrodes and the separators formed with the solid particle layers on both surfaces thereof were stacked on each other in the order of the positive electrode, the separator, the negative electrode, and the separator. Then, such a stack was, in the longitudinal direction thereof, wound several times in a flat shape. Subsequently, a winding end portion of the resultant was fixed with an adhesive tape. In this manner, a winding body was formed.

Next, the winding body was sandwiched in the laminated film having a soft aluminum layer. The laminated film was thermally fused in a bag shape at other outer peripheral edge portion than one side. Thus, the winding body was housed in the laminated film. Next, a nonaqueous electrolyte solution was injected into the exterior member, and the winding body was impregnated with the nonaqueous electrolyte solution. Then, the opening of the laminated film was thermally fused and sealed under vacuum atmosphere. In this manner, a laminated film type battery in a battery shape with a thickness of 4.5 mm, a width of 30 mm, and a height of 50 mm as illustrated in FIG. 1 was produced.

<Example 6-6>

After a winding body has been formed, the packed winding body was inserted into heated oil, and then, isostatic pressing was performed. Accordingly, solid particles were pushed into the recess among adjacent positive electrode active material particles positioned in an outermost surface portion of a positive electrode active material layer and the recess among adjacent negative electrode active material particles positioned in an outermost surface portion of a negative electrode active material layer. Example 6-6 is similar to Example 6-5, except for the above. For Example 6-6, a laminated film type battery was produced.

<Example 6-7>

As in Example 6-1, positive and negative electrodes were produced, and then, separators were prepared.

After a coating solution was applied to both surfaces of each separator as described below, such a solution was dried to form matrix resin layers.

First, the coating solution was prepared in such a manner that boehmite particles and polyvinylidene fluoride (PVdF) as a matrix polymer compound are dispersed in N-methyl-2-pyrrolidone (NMP). At this point, the content of the boehmite particles was 10 mass % with respect to the total amount of the paint, the content of the PVdF was 10 mass % with respect to the total amount of the paint, and the content of the NMP was 80 mass % with respect to the total amount of the paint.

Next, after this coating solution has been applied to both surfaces of each separator, the separator passed through a dryer such that the NMP is removed. In this manner, the separators formed with the matrix resin layers were obtained.

[Assembly of Laminated Film Type Battery]

Next, the positive and negative electrodes and the separators each formed with the matrix resin layers on both surfaces thereof were stacked on each other in the order of the positive electrode, the separator, the negative electrode, and the separator. Then, such a stack was, in the longitudinal direction thereof, wound several times in a flat shape. Subsequently, a winding end portion of the resultant was fixed with an adhesive tape. In this manner, a winding electrode body was formed.

Next, the packed winding electrode body was inserted into heated oil, and then, isostatic pressing was performed. Accordingly, solid particles were pushed into a recess in an outermost surface portion of a positive electrode active material layer and a recess in an outermost surface portion of a negative electrode active material layer.

Next, the winding electrode body was sandwiched in an exterior member, and then, the exterior member was thermally fused at three sides thereof. Note that the laminated film having a soft aluminum layer was used as the exterior member.

Thereafter, an electrolyte solution was injected into the exterior member. Subsequently, the exterior member was, under reduced pressure, thermally fused at the remaining one side thereof, and then, was sealed. At this point, the particle-containing resin layers were impregnated with the electrolyte solution to expand the matrix polymer compound. In this manner, electrolyte gel (electrolyte gel layers) was formed. Note that the electrolyte solution similar to that of Example 1-1 was used as the electrolyte solution. In the above-described manner, a laminated film type battery in a battery shape with a thickness of 4.5 mm, a width of 30 mm, and a height of 50 mm as illustrated in FIG. 1 was produced.

<Example 6-8>

As in Example 6-1, positive and negative electrodes were first produced, and then, separators were prepared.

(Formation of Solid Particle Layer)

Next, 22 mass % of boehmite particles as solid particles, 3 mass % of PVdF as a binder polymer compound, and 75 mass % of NMP as a solvent were mixed together to prepare paint, and then, the paint was applied to both surfaces of each of the positive and negative electrodes. Then, these surfaces were scraped. Subsequently, the NMP was removed by drying. In this manner, solid particle layers were formed.

Next, the positive electrode formed with the solid particle layers on both surfaces thereof, the negative electrode formed with the solid particle layers on both surfaces thereof, and the separators were stacked on each other in the order of the positive electrode, the separator, the negative electrode, and the separator. Then, such a stack was, in the longitudinal direction thereof, wound several times in a flat shape. Subsequently, a winding end portion of the resultant was fixed with an adhesive tape. In this manner, a winding body was formed.

Next, the winding body was sandwiched in the laminated film having a soft aluminum layer. The laminated film was thermally fused in a bag shape at other outer peripheral edge portion than one side. The winding body was housed in the laminated film. Next, a nonaqueous electrolyte solution was injected into the exterior member, and the winding body was impregnated with the nonaqueous electrolyte solution. Then, the opening of the laminated film was thermally fused and sealed under vacuum atmosphere. In this manner, a laminated film type battery in a battery shape with a thickness of 4.5 mm, a width of 30 mm, and a height of 50 mm as illustrated in FIG. 1 was produced.

<Example 6-9>

Example 6-9 is similar to Example 6-8, except that a solid particle layer was formed only on each surface of a positive electrode. For Example 6-9, a laminated film type battery was produced.

<Example 6-10>

Example 6-10 is similar to Example 6-8, except that a solid particle layer was formed only on each surface of a negative electrode. For Example 6-10, a laminated film type battery was produced.

Example 6-11>

As in Example 6-1, positive and negative electrodes were first produced, and then, separators were prepared. Then, as in Example 6-8, solid particle layers were formed respectively on both surfaces of each of the positive and negative electrodes. Next, as in Example 6-7, matrix resin layers were formed respectively on solid particle layers on both surfaces of each separator.

Next, the positive and negative electrodes and the separators each formed with the matrix resin layers on both surfaces thereof were stacked on each other in the order of the positive electrode, the separator, the negative electrode, and the separator. Then, such a stack was, in the longitudinal direction thereof, wound several times in a flat shape. Subsequently, a winding end portion of the resultant was fixed with an adhesive tape. In this manner, a winding electrode body was formed.

Next, the winding electrode body was sandwiched in an exterior member, and then, the exterior member was thermally fused at three sides thereof. Note that the laminated film having a soft aluminum layer was used as the exterior member.

Thereafter, an electrolyte solution was injected into the exterior member. Subsequently, the exterior member was, under reduced pressure, thermally fused at the remaining one side thereof, and then, was sealed. At this point, the particle-containing resin layers were impregnated with the electrolyte solution to expand the matrix polymer compound. In this manner, electrolyte gel (electrolyte gel layers) was formed. Note that the electrolyte solution similar to that of Example 1-1 was used as the electrolyte solution. In the above-described manner, a laminated film type battery in a battery shape with a thickness of 4.5 mm, a width of 30 mm, and a height of 50 mm as illustrated in FIG. 1 was produced.

<Example 6-12>

As in Example 6-1, positive and negative electrodes were first produced, and then, separators were prepared. Then, matrix resin layers were formed respectively on both surfaces of each of the positive and negative electrodes. Note that the matrix resin layer similar to that of Example 6-7 was formed as the matrix resin layer.

Next, the positive electrode formed with the matrix resin layers on both surfaces thereof, the negative electrode formed with the matrix resin layers on both surface thereof, and the separators were stacked on each other in the order of the positive electrode, the separator, the negative electrode, and the separator. Then, such a stack was, in the longitudinal direction thereof, wound several times in a flat shape. Subsequently, a winding end portion of the resultant was fixed with an adhesive tape. In this manner, a winding electrode body was formed.

Next, the winding electrode body was sandwiched in an exterior member, and then, the exterior member was thermally fused at three sides thereof. Note that the laminated film having a soft aluminum layer was used as the exterior member.

Thereafter, an electrolyte solution was injected into the exterior member. Subsequently, the exterior member was, under reduced pressure, thermally fused at the remaining one side thereof, and then, was sealed. At this point, the particle-containing resin layers were impregnated with the electrolyte solution to expand the matrix polymer compound. In this manner, electrolyte gel (electrolyte gel layers) was formed. Note that the electrolyte solution similar to that of Example 1-1 was used as the electrolyte solution. In the above-described manner, a laminated film type battery in a battery shape with a thickness of 4.5 mm, a width of 30 mm, and a height of 50 mm as illustrated in FIG. 1 was produced.

<Example 6-13>

As in Example 6-5, solid particle layers were formed respectively on both surfaces of each separator.

Next, a positive electrode, the separator, a negative electrode, and the separator were stacked on each other in this order. In this manner, a multilayer electrode body was formed.

Next, a positive electrode terminal was joined to the safety valve joined to a battery lid, and a negative electrode terminal was connected to a negative electrode can. The multilayer electrode body was housed in the battery can with the multilayer electrode being sandwiched between a pair of insulating plates.

Subsequently, a nonaqueous electrolyte solution was injected into the cylindrical battery can from above the insulating plates. Eventually, the battery lid was swaged to an opening of the battery can via an insulating sealing gasket to seal the battery can. In this manner, a cylindrical battery in a battery shape with a diameter of 18 mm and a height of 65 mm (an ICR18650 size) was produced.

<Example 6-14>

As in Example 6-8, solid particle layers were formed respectively on both surfaces of a positive electrode and both surfaces of a negative electrode.

Next, the positive electrode, a separator, the negative electrode, and another separator were stacked on each other in this order. In this manner, a multilayer electrode body was formed.

[Assembly of Rectangular Battery]

Next, the multilayer electrode body was housed in a rectangular battery can. Subsequently, after the electrode pin provided at a battery lid and the positive electrode terminal protruding out of the multilayer electrode body have been connected together, the battery can was sealed with the battery lid. A nonaqueous electrolyte solution was injected through an electrolyte solution injection port, and then, the battery can was sealed with a sealing member. In this manner, a rectangular battery in a battery shape with a thickness of 4.5 mm, a width of 30 mm, and a height of 50 mm (a 453050 size) was produced.

<Example 6-15>
In Example 6-15, the simple battery pack (a soft pack) using the laminated film type battery similar to that of Example 1-1 as illustrated in FIGS. 8 and 9 was produced.

For each produced battery and the battery pack, battery performance was, as in Example 1-1, evaluated using a volume energy density as an index.
Table 6 shows evaluation results.

TABLE 6

| | Solid Particle | | Summary of Method for Arranging Solid Particles | | | | Evaluation Quick Charging (After 300 Cycles) | |
|---|---|---|---|---|---|---|---|---|
| | Material Type | Concentration [Volume %] | Object to be Applied and Formed | Coating Target | *Remarks | Battery Type | Volume Energy Density [Wh/L] | Result |
| Example 6-1 | Boehmite | 10 | Electrolyte Gel Containing Solid Particles | Positive Electrode, Negative Electrode | Apply Electrolyte Gel in Heated State | Laminated Film Type Battery (Gel Polymer (Coating Type), Winding Electrode Body) | 527 | Excellent |
| Example 6-2 | | | Electrolyte Gel Containing Solid Particles | Positive Electrode | Apply Electrolyte Gel in Heated State | Laminated Film Type Battery (Gel Polymer (Coating Type), Winding Electrode Body) | 481 | Good |
| Example 6-3 | | | Electrolyte Gel Containing Solid Particles | Negative Electrode | Apply Electrolyte Gel in Heated State | Laminated Film Type Battery (Gel Polymer (Coating Type), Winding Electrode Body) | 490 | Good |
| Example 6-4 | | | Electrolyte Gel Containing Solid Particles | Separator | Apply Electrolyte Gel | Laminated Film Type Battery (Gel Polymer (Coating Type), Winding Electrode Body) | 471 | Acceptable |
| Example 6-5 | | | Solid Particle Layer | Separator | — | Laminated Film Type Battery (Liquid, Winding Electrode Body) | 471 | Acceptable |
| Example 6-6 | | | Solid Particle Layer | Separator | With Heating and Pressurizing Steps (Hydrostatic Pressing) | Laminated Film Type Battery (Liquid, Winding Electrode Body) | 527 | Excellent |
| Example 6-7 | | | Matrix Resin Layer Containing Solid Particles | Separator | With Heating and Pressurizing Steps (Hydrostatic Pressing) | Laminated Film Type Battery (Gel Polymer (Liquid Injection and Expansion Type), Winding Electrode Body) | 527 | Excellent |
| Example 6-8 | | | Solid Particle Layer | Positive Electrode, Negative Electrode | — | Laminated Film Type Battery (Liquid, Winding Electrode Body) | 527 | Excellent |
| Example 6-9 | | | Solid Particle Layer | Positive Electrode | — | Laminated Film Type Battery (Liquid, Winding Electrode Body) | 481 | Good |
| Example 6-10 | | | Solid Particle Layer | Negative Electrode | — | Laminated Film Type Battery (Liquid, Winding Electrode Body) | 490 | Good |
| Example 6-11 | | | Solid Particle Layer / Matrix Resin Layer | Positive Electrode, Negative Electrode / Separator | With Heating and Pressurizing Steps (Hydrostatic Pressing) | Laminated Film Type Battery (Gel Polymer (Liquid Injection and Expansion Type), Winding Electrode Body) | 527 | Excellent |
| Example 6-12 | | | Matrix Resin Layer Containing Solid Particles | Positive Electrode, Negative Electrode | — | Laminated Film Type Battery (Gel Polymer (Liquid Injection and Expansion Type), Winding Electrode Body) | 527 | Excellent |
| Example 6-13 | | | Solid Particle Layer | Separator | — | Cylindrical Type (Multilayer Electrode Body) | 471 | Acceptable |

TABLE 6-continued

| | Summary of Method for Arranging Solid Particles | | | | | Evaluation Quick Charging (After 300 Cycles) | |
|---|---|---|---|---|---|---|---|
| | Solid Particle | | Object to be | | | Volume Energy | |
| | Material Type | Concentration [Volume %] | Applied and Formed | Coating Target | *Remarks | Battery Type | Density [Wh/L] | Result |
| Example 6-14 | | | Solid Particle Layer | Positive Electrode, Negative Electrode | — | Rectangular Battery (Multilayer Electrode Body) | 527 | Excellent |
| Example 6-15 | | | Electrolyte Gel Containing Solid Particles | Positive Electrode, Negative Electrode | — | Simple Battery Pack | 527 | Excellent |

Capacity Area Density of Negative Electrode Active Material Layer: 4.0 mAh/cm$^2$
Capacity Area Density of Gap in Negative Electrode Active Material Layer: 13.3 mAh/cm$^2$
Initial Capacity: 612 Wh/L As shown in Table 6, in Examples 6-1 to Examples 6-15, proper electrode design was made, and the solid particles were contained in the electrolyte. Thus, the initial volume energy density was high, and a high volume energy density can be maintained even after repeated quick charging.

7. Other Embodiments

The present technology has been described above with reference to the embodiments and the examples. However, the present invention is not limited to these embodiments and examples, and various modifications can be made within the gist of the present technology.

For example, the numerical values, structures, shapes, materials, raw materials, manufacturing processes, etc. described in the embodiments and the examples described above have been merely set forth as examples. If necessary, the numerical values, structures, shapes, materials, raw materials, manufacturing processes, etc. different from the above may be used.

Moreover, the configurations, methods, steps, shapes, materials, numerical values, etc. of the embodiments and the examples described above may be combined together without departing from the gist of the present technology. For example, the nonaqueous electrolyte battery may be a primary battery.

Moreover, the electrolyte layer of the present technology is similarly applicable even to the case of other battery structures such as coin or button batteries. Further, in the second and third embodiments, a multilayer electrode body may be used instead of the winding electrode body.

Note that the present technology may have the following configurations.

[1]
A battery including:
a positive electrode formed with a positive electrode active material layer containing a positive electrode active material at least on one side of a positive electrode current collector;
a negative electrode formed with a negative electrode active material layer containing a negative electrode active material at least on one side of a negative electrode current collector;
a separator; and
an electrolyte,
wherein the electrolyte contains a solid particle, a capacity area density (mAh/cm$^2$) of the negative electrode active material layer is equal to or higher than 2.2 mAh/cm$^2$ and equal to or lower than 10 mAh/cm$^2$, and a capacity area density (mAh/cm$^2$) of a gap in the negative electrode active material layer is equal to or higher than 5.9 mAh/cm$^2$ and equal to or lower than 67 mAh/cm$^2$.

[2]
The battery according to [1], wherein
the electrolyte contains an electrolyte solution containing electrolyte salt and a solvent, and
a content of the electrolyte salt is equal to or higher than 10 mass % and equal to or lower than 40 mass % with respect to a mass of the electrolyte.

[3]
The battery according to [1] or [2], wherein
a concentration of the solid particle is equal to or higher than 1 volume % and equal to or lower than 50 volume %.

[4]
The battery according to any one of [1] to [3], wherein the solid particle is at least any of an inorganic particle or an organic particle.

[5]
The battery according to [4], wherein
the inorganic particle is a particle of at least one selected from a group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogenphosphate, ammonium polyphosphate, silicate mineral, carbonate mineral, and oxide mineral, and the organic particle is a particle of at least one selected from a group consisting of melamine, melamine cyanurate, melamine polyphosphate, crosslinked polymethyl methacrylate, polyolefin, polyethylene, polypropylene, polystyrene, polytetrafluoroethylene, polyvinylidene fluoride, polyamide, polyimide, melamine resin, phenol resin, and epoxy resin.

[6]
The battery according to [5], wherein
the silicate mineral is at least one selected from a group consisting of talc, calcium silicate, zinc silicate, zirconium silicate, aluminum silicate, magnesium silicate, kaolinite, sepiolite, imogolite, sericite, pyrophyllite, mica, zeolite, mullite, saponite, attapulgite, and montmorillonite,
the carbonate mineral is at least one selected from a group consisting of hydrotalcite and dolomite, and
the oxide mineral is spinel.

[7]
The battery according to any one of [1] to [6], wherein
a particle size D95 of the solid particle is equal to or greater than a $2/\sqrt{3}-1$ fold of a particle size D50 of an active material particle.

[8]
The battery according to any one of [1] to [7], wherein
a particle size D50 of the solid particle is equal to or greater than 0.1 μm and equal to or smaller than μm of a particle size D50 of an active material particle.

[9]
The battery according to any one of [1] to [8], wherein
a BET specific surface area of the solid particle is equal to or greater than 1 $m^2/g$ and equal to or smaller than 60 $m^2/g$.

[10]
The battery according to any one of [1] to [9], wherein
the electrolyte contains an electrolyte solution containing electrolyte salt and a solvent, and a polymer compound holding the electrolyte solution.

[11]
The battery according to any one of [1] to [10], wherein
there is a solid particle concentration difference between
a negative electrode side recess impregnation region containing the electrolyte and the solid particle and including a recess among adjacent negative electrode active material particles positioned in an outermost surface portion of the negative electrode active material layer, and
a negative electrode side deep region containing the electrolyte or the electrolyte and the solid particle and positioned deeper than the negative electrode side recess impregnation region in the negative electrode active material layer, and
a concentration of the solid particle in the negative electrode side recess impregnation region is higher than a concentration of the solid particle in the negative electrode side deep region.

[12]
The battery according to [11], wherein
there is a solid particle concentration difference between
a positive electrode side recess impregnation region containing the electrolyte and the solid particle and including a recess among adjacent positive electrode active material particles positioned in an outermost surface portion of the positive electrode active material layer, and
a positive electrode side deep region containing the electrolyte or the electrolyte and the solid particle and positioned deeper than the positive electrode side recess impregnation region in the positive electrode active material layer, and
a concentration of the solid particle in the positive electrode side recess impregnation region is higher than a concentration of the solid particle in the positive electrode side deep region.

[13]
The battery according to any one of [1] to [10], wherein
there is a solid particle concentration difference between
a positive electrode side recess impregnation region containing the electrolyte and the solid particle and including a recess among adjacent positive electrode active material particles positioned in an outermost surface portion of the positive electrode active material layer, and
a positive electrode side deep region containing the electrolyte or the electrolyte and the solid particle and positioned deeper than the positive electrode side recess impregnation region in the positive electrode active material layer, and
a concentration of the solid particle in the positive electrode side recess impregnation region is higher than a concentration of the solid particle in the positive electrode side deep region.

[14]
The battery according to any one of [1] to [13], wherein
the solid particle is applied to at least any of the separator, the positive electrode, and the negative electrode, and is contained in the electrolyte.

[15]
The battery according to claim 1, wherein
the separator includes a porous film or non-woven fabric made of resin.

[16]
A battery pack including:
the battery according to any one of [1] to [15];
a controller configured to control the battery; and
an exterior containing the battery.

[17]
Electronic equipment including:
the battery according to any one of [1] to [15],
wherein the electronic equipment is configured to receive power supplied from the battery.

[18]
An electric vehicle including:
the battery according to any one of [1] to [15];
a conversion device configured to receive power supplied from the battery to convert the power into drive force for the vehicle; and
a control device configured to process information on vehicle control on the basis of information on the battery.

[19]
A power storage device including:
the battery according to any one of [1] to [15],
wherein the power storage device is configured to supply power to electronic equipment connected to the battery.

[20]
The power storage device according to [19] includes a power information control device configured to transmit/receive a signal by other equipment via a network. Charging/discharging control of the battery is performed on the basis of the information received by the power information control device.

[21]
A power system configured to receive power supplied from the battery according to any one of [1] to [15] or configured such that power is supplied from a power generation device or a power network to the battery.

REFERENCE SIGNS LIST

50 Winding electrode body
51 Positive electrode lead
52 Negative electrode lead

53 Positive electrode
53A Positive electrode current collector
53B Positive electrode active material layer
54 Negative electrode
54A Negative electrode current collector
54B Negative electrode active material layer
55 Separator
56 Electrolyte layer
57 Protective tape
60 Exterior member
61 Adhesive film
70 Multilayer electrode body
71 Positive electrode lead
72 Negative electrode lead
73 Positive electrode
74 Negative electrode
75 Separator
76 Fixing member
81 Battery can
82a, 82b Insulating plate
83 Battery lid
84 Safety valve
84a Protrusion
85 Disc holder
86 Shut-off disc
86a Hole
87 Heat sensitive resistor element
88 Gasket
89 Sub disc
90 Winding electrode body
91 Positive electrode
91A Positive electrode current collector
91B Positive electrode active material layer
92 Negative electrode
92A Negative electrode current collector
92B Negative electrode active material layer
93 Separator
94 Center pin
95 Positive electrode lead
96 Negative electrode lead
111 Exterior can
112 Battery lid
113 Electrode pin
114 Insulating body
115 Through-hole
116 Internal pressure releasing mechanism
116a First opening groove
116b Second opening groove
117 Electrolyte solution injection port
118 Sealing member
120 Winding electrode body
101 Battery cell
101a Terrace
102a, 102b Lead
103a to 103c Insulating tape
104 Insulating plate
105 Circuit board
106 Connector
211 Power source
212 Positive electrode lead
213 Negative electrode lead
214, 215 Tab
216 Circuit board
217 Connector lead wire
218, 219 Adhesive tape
220 Label
221 Controller
222 Switch
224 Temperature detector
225 Positive electrode terminal
227 Negative electrode terminal
231 Insulating sheet
301 Battery set
301a Secondary battery
302a Charge control switch
302b Diode
303a Discharge control switch
303b Diode
304 Switch
307 Current detection resistor
308 Temperature detection element
310 Controller
311 Voltage detector
313 Current measurer
314 Switch controller
317 Memory
318 Temperature detector
321 Positive electrode terminal
322 Negative electrode terminal
400 Power storage system
401 Residence
402 Centralized power system
402a Thermal power generation
402b Nuclear power generation
402c Hydroelectric power generation
403 Power storage device
404 Power generation device
405 Power consuming device
405a Refrigerator
405b Air-conditioner
405c Television set
405d Bath
406 Electric vehicle
406a Electric car
406b Hybrid car
406c Electric motorcycle
407 Smart meter
408 Power hub
409 Power network
410 Control device
411 Sensors
412 Information network
413 Server
500 Hybrid vehicle
501 Engine
502 Power generator
503 Power-to-drive-force conversion device
504a Drive wheel
504b Drive wheel
505a Wheel
505b Wheel
508 Battery
509 Vehicle control device
510 Sensors
511 Charge inlet

The invention claimed is:
1. A battery comprising:
a positive electrode formed with a positive electrode active material layer containing a positive electrode active material at least on one side of a positive electrode current collector;

a negative electrode formed with a negative electrode active material layer containing a negative electrode active material at least on one side of a negative electrode current collector;

a separator; and an electrolyte, wherein the electrolyte contains a solid particle, a capacity area density (mAh/cm$^2$) of the negative electrode active material layer is equal to or higher than 2.2 mAh/cm$^2$ and equal to or lower than 10 mAh/cm$^2$, and a capacity area density (mAh/cm$^2$) of a gap in the negative electrode active material layer is equal to or higher than 5.9 mAh/cm$^2$ and equal to or lower than 67 mAh/cm$^2$, wherein there is a solid particle concentration difference between
- a negative electrode side recess impregnation region containing the electrolyte and the solid particle and including a recess among adjacent negative electrode active material particles positioned in an outermost surface portion of the negative electrode active material layer, and
- a negative electrode side deep region containing the electrolyte or the electrolyte and the solid particle and positioned deeper than the negative electrode side recess impregnation region in the negative electrode active material layer, and a concentration of the solid particle in the negative electrode side recess impregnation region is higher than a concentration of the solid particle in the negative electrode side deep region.

2. The battery according to claim 1, wherein the electrolyte contains an electrolyte solution containing electrolyte salt and a solvent, and a content of the electrolyte salt is equal to or higher than 10 mass % and equal to or lower than 40 mass % with respect to a mass of the electrolyte.

3. The battery according to claim 1, wherein a concentration of the solid particle is equal to or higher than 1 volume % and equal to or lower than 50 volume %.

4. The battery according to claim 1, wherein the solid particle is at least any of an inorganic particle or an organic particle.

5. The battery according to claim 4, wherein the inorganic particle is a particle of at least one selected from a group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogenphosphate, ammonium polyphosphate, silicate mineral, carbonate mineral, and oxide mineral, and the organic particle is a particle of at least one selected from a group consisting of melamine, melamine cyanurate, melamine polyphosphate, crosslinked polymethyl methacrylate, polyolefin, polyethylene, polypropylene, polystyrene, polytetrafluoroethylene, polyvinylidene fluoride, polyamide, polyimide, melamine resin, phenol resin, and epoxy resin.

6. The battery according to claim 5, wherein the silicate mineral is at least one selected from a group consisting of talc, calcium silicate, zinc silicate, zirconium silicate, aluminum silicate, magnesium silicate, kaolinite, sepiolite, imogolite, sericite, pyrophylite, mica, zeolite, mullite, saponite, attapulgite, and montmorillonite, the carbonate mineral is at least one selected from a group consisting of hydrotalcite and dolomite, and the oxide mineral is spinel.

7. The battery according to claim 1, wherein a particle size D95 of the solid particle is equal to or greater than a 2/√3−1 fold of a particle size D50 of an active material particle.

8. The battery according to claim 1, wherein a particle size D50 of the solid particle is equal to or greater than 0.1 μm and equal to or smaller than μm of a particle size D50 of an active material particle.

9. The battery according to claim 1, wherein a BET specific surface area of the solid particle is equal to or greater than 1 m$^2$/g and equal to or smaller than 60 m$^2$/g.

10. The battery according to claim 1, wherein the electrolyte contains an electrolyte solution containing electrolyte salt and a solvent, and a polymer compound holding the electrolyte solution.

11. The battery according to claim 1, wherein there is a solid particle concentration difference between
- a positive electrode side recess impregnation region containing the electrolyte and the solid particle and including a recess among adjacent positive electrode active material particles positioned in an outermost surface portion of the positive electrode active material layer, and
- a positive electrode side deep region containing the electrolyte or the electrolyte and the solid particle and positioned deeper than the positive electrode side recess impregnation region in the positive electrode active material layer, and a concentration of the solid particle in the positive electrode side recess impregnation region is higher than a concentration of the solid particle in the positive electrode side deep region.

12. The battery according to claim 1, wherein the solid particle is applied to at least any of the separator, the positive electrode, and the negative electrode, and is contained in the electrolyte.

13. The battery according to claim 1, wherein the separator includes a porous film or non-woven fabric made of resin.

14. A battery pack comprising:

the battery according to claim 1;

a controller configured to control the battery; and an exterior containing the battery.

15. Electronic equipment comprising:

the battery according to claim 1, wherein the electronic equipment is configured to receive power supplied from the battery.

16. An electric vehicle comprising:

the battery according to claim 1;

a conversion device configured to receive power supplied from the battery to convert the power into drive force for the vehicle; and a control device configured to process information on vehicle control on the basis of information on the battery.

17. A power storage device comprising:
the battery according to claim 1,
wherein the power storage device is configured to supply power to electronic equipment connected to the battery.

18. A power system configured to receive power supplied from the battery according to claim 1 or configured such that power is supplied from a power generation device or a power network to the battery.

19. A battery comprising:
a positive electrode formed with a positive electrode active material layer containing a positive electrode active material at least on one side of a positive electrode current collector;
a negative electrode formed with a negative electrode active material layer containing a negative electrode active material at least on one side of a negative electrode current collector;
a separator; and
an electrolyte,
wherein the electrolyte contains a solid particle,
a capacity area density (mAh/cm$^2$) of the negative electrode active material layer is equal to or higher than 2.2 mAh/cm$^2$ and equal to or lower than 10 mAh/cm$^2$, and
a capacity area density (mAh/cm$^2$) of a gap in the negative electrode active material layer is equal to or higher than 5.9 mAh/cm$^2$ and equal to or lower than 67 mAh/cm$^2$, wherein
there is a solid particle concentration difference between
a positive electrode side recess impregnation region containing the electrolyte and the solid particle and including a recess among adjacent positive electrode active material particles positioned in an outermost surface portion of the positive electrode active material layer, and
a positive electrode side deep region containing the electrolyte or the electrolyte and the solid particle and positioned deeper than the positive electrode side recess impregnation region in the positive electrode active material layer, and
a concentration of the solid particle in the positive electrode side recess impregnation region is higher than a concentration of the solid particle in the positive electrode side deep region.

20. The battery according to claim 19, wherein
the electrolyte contains an electrolyte solution containing electrolyte salt and a solvent, and
a content of the electrolyte salt is equal to or higher than 10 mass % and equal to or lower than 40 mass % with respect to a mass of the electrolyte.

21. The battery according to claim 19, wherein
a concentration of the solid particle is equal to or higher than 1 volume % and equal to or lower than 50 volume %.

22. The battery according to claim 19, wherein
the solid particle is at least any of an inorganic particle or an organic particle.

23. The battery according to claim 22, wherein
the inorganic particle is a particle of at least one selected from a group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogenphosphate, ammonium polyphosphate, silicate mineral, carbonate mineral, and oxide mineral, and
the organic particle is a particle of at least one selected from a group consisting of melamine, melamine cyanurate, melamine polyphosphate, crosslinked polymethyl methacrylate, polyolefin, polyethylene, polypropylene, polystyrene, polytetrafluoroethylene, polyvinylidene fluoride, polyamide, polyimide, melamine resin, phenol resin, and epoxy resin.

24. The battery according to claim 23, wherein
the silicate mineral is at least one selected from a group consisting of talc, calcium silicate, zinc silicate, zirconium silicate, aluminum silicate, magnesium silicate, kaolinite, sepiolite, imogolite, sericite, pyrophylite, mica, zeolite, mullite, saponite, attapulgite, and montmorillonite,
the carbonate mineral is at least one selected from a group consisting of hydrotalcite and dolomite, and
the oxide mineral is spinel.

25. The battery according to claim 19, wherein
a particle size D95 of the solid particle is equal to or greater than a $2/\sqrt{3}-1$ fold of a particle size D50 of an active material particle.

26. The battery according to claim 19, wherein
a particle size D50 of the solid particle is equal to or greater than 0.1 μm and equal to or smaller than μm of a particle size D50 of an active material particle.

27. The battery according to claim 19, wherein
a BET specific surface area of the solid particle is equal to or greater than 1 m$^2$/g and equal to or smaller than 60 m$^2$/g.

28. The battery according to claim 19, wherein
the electrolyte contains an electrolyte solution containing electrolyte salt and a solvent, and a polymer compound holding the electrolyte solution.

29. The battery according to claim 19, wherein
the solid particle is applied to at least any of the separator, the positive electrode, and the negative electrode, and is contained in the electrolyte.

30. The battery according to claim 19, wherein
the separator includes a porous film or non-woven fabric made of resin.

31. A battery pack comprising:
the battery according to claim 19;
a controller configured to control the battery; and
an exterior containing the battery.

32. Electronic equipment comprising:
the battery according to claim 19,
wherein the electronic equipment is configured to receive power supplied from the battery.

33. An electric vehicle comprising:
the battery according to claim 19;
a conversion device configured to receive power supplied from the battery to convert the power into drive force for the vehicle; and
a control device configured to process information on vehicle control on the basis of information on the battery.

34. A power storage device comprising:
the battery according to claim 19,
wherein the power storage device is configured to supply power to electronic equipment connected to the battery.

35. A power system configured to receive power supplied from the battery according to claim 19 or configured such that power is supplied from a power generation device or a power network to the battery.

* * * * *